US006708205B2

(12) United States Patent  
Sheldon et al.

(10) Patent No.: US 6,708,205 B2
(45) Date of Patent: Mar. 16, 2004

(54) E-MAIL MESSAGING SYSTEM

(75) Inventors: Valentine D'Arcy Sheldon, New York, NY (US); Jeremy Kagan, New York, NY (US); Nancy Palmarini, New York, NY (US)

(73) Assignee: Suffix Mail, Inc., New York, NY (US)

( * ) Notice: Subject to any disclaimer, the term of this patent is extended or adjusted under 35 U.S.C. 154(b) by 45 days.

(21) Appl. No.: 10/076,107

(22) Filed: Feb. 14, 2002

(65) Prior Publication Data

US 2002/0169840 A1 Nov. 14, 2002

Related U.S. Application Data

(60) Provisional application No. 60/269,284, filed on Feb. 15, 2001.

(51) Int. Cl.[7] .................. G06F 15/173; G06F 17/30
(52) U.S. Cl. ........................ 709/206; 345/752
(58) Field of Search .............. 709/206; 345/752, 345/751, 853, 854, 855

(56) References Cited

U.S. PATENT DOCUMENTS

| 5,801,702 | A |   | 9/1998 | Dolan et al. ............ 345/854 |
| 5,822,526 | A | * | 10/1998 | Waskiewicz ............ 709/206 |
| 5,930,479 | A | * | 7/1999 | Hall .................... 709/238 |
| 5,995,098 | A | * | 11/1999 | Okada et al. ........... 345/752 |
| 5,999,967 | A | * | 12/1999 | Sundsted ............... 709/206 |
| 6,023,723 | A | * | 2/2000 | McCormick et al. ..... 709/206 |
| 6,073,137 | A | * | 6/2000 | Brown et al. .......... 707/104.1 |
| 6,092,101 | A | * | 7/2000 | Birrell et al. .......... 709/206 |
| 6,212,552 | B1 |  | 4/2001 | Biliris et al. .......... 709/206 |
| 6,341,280 | B1 | * | 1/2002 | Glass et al. ........... 707/3 |
| 6,356,935 | B1 | * | 3/2002 | Gibbs ................. 709/206 |
| 6,396,513 | B1 | * | 5/2002 | Helfman et al. ........ 345/752 |
| 2002/0095464 | A1 | * | 7/2002 | Meek ................. 709/206 |

FOREIGN PATENT DOCUMENTS

WO    WO 9904344 A1 *  1/1999

OTHER PUBLICATIONS

"Defining of Auto Actions into Separate Classes", IBM TDB NA9209103 v.35 n.5a Sept. 1992, pp. 103–104.*
"Alternate Method of X.400 Autofile", IBM TDB NN920859 v.35 n.3 Aug. 1992, p. 59.*

* cited by examiner

Primary Examiner—Dung C. Dinh
(74) Attorney, Agent, or Firm—Pillsbury Winthrop LLP

(57) ABSTRACT

A method for providing e-mail communication is provided in which an e-mail user interface is generated on a display device. The e-mail user interface implements e-mail messaging for a root e-mail address that includes a domain name and a username. Upon receiving a request from a user, the method generates a first suffix e-mail address, and creates a first directory on the e-mail user interface for the first suffix e-mail address. The first suffix e-mail address includes the domain name, the username, and a first suffix name. Upon receiving an e-mail message having a destination address including the domain name and the username, the method stores the e-mail message in the first directory if the destination address includes the first suffix. In accordance with further aspects of this embodiment, a plurality of suffix e-mail addresses can be created, each having a corresponding directory on the e-mail user interface.

74 Claims, 40 Drawing Sheets

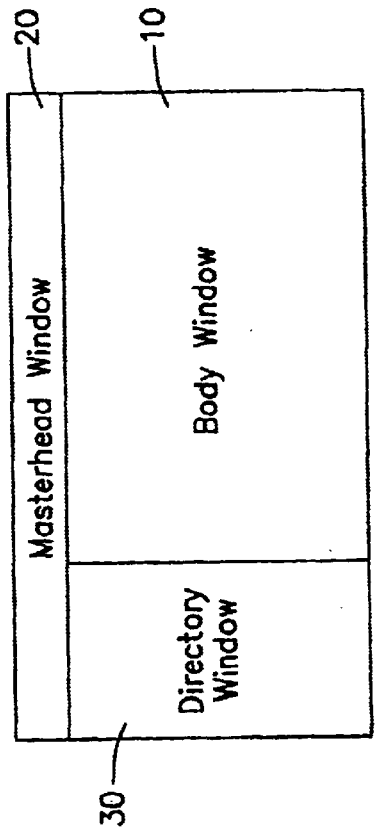

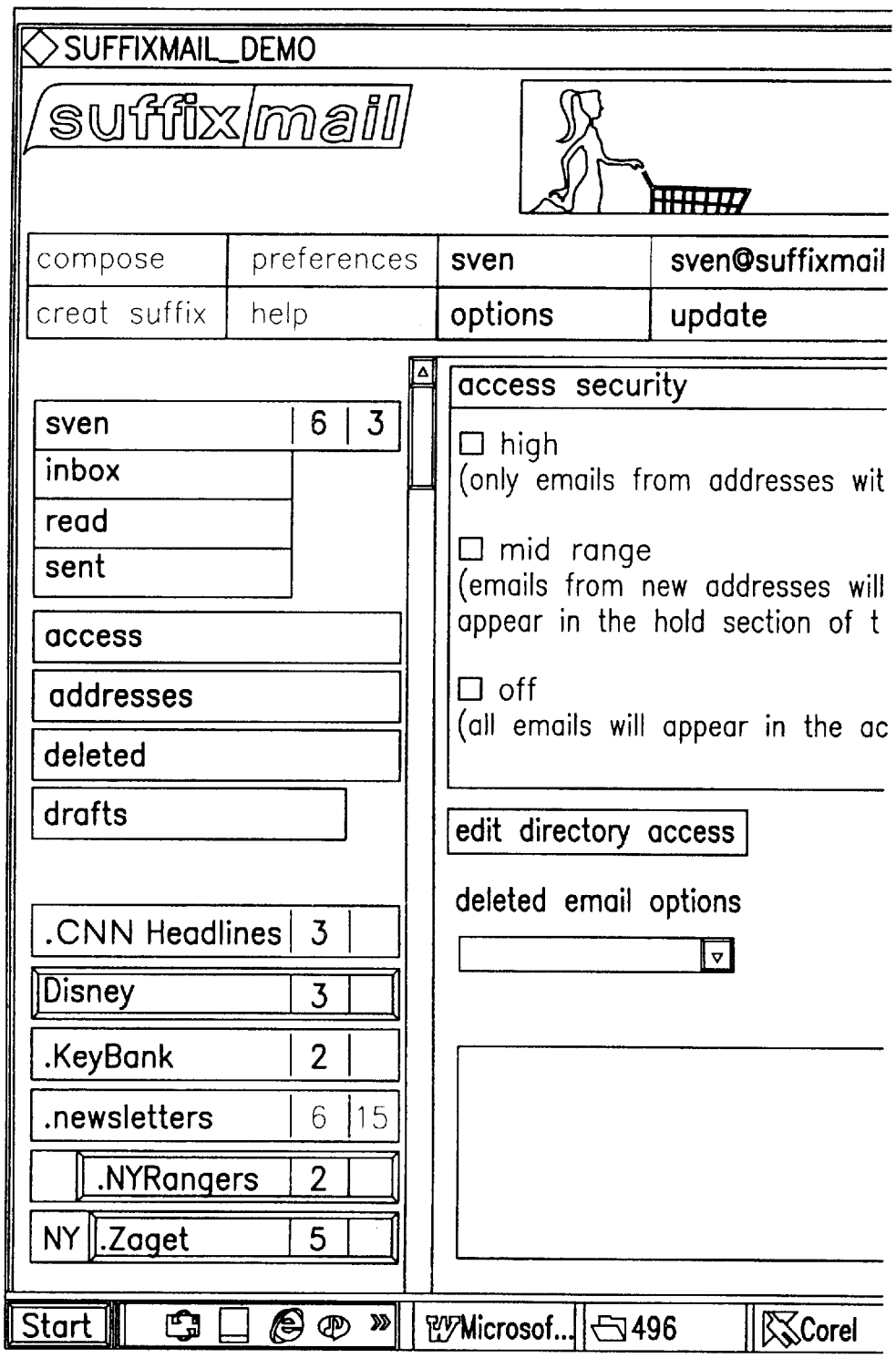
Fig. 1b.1

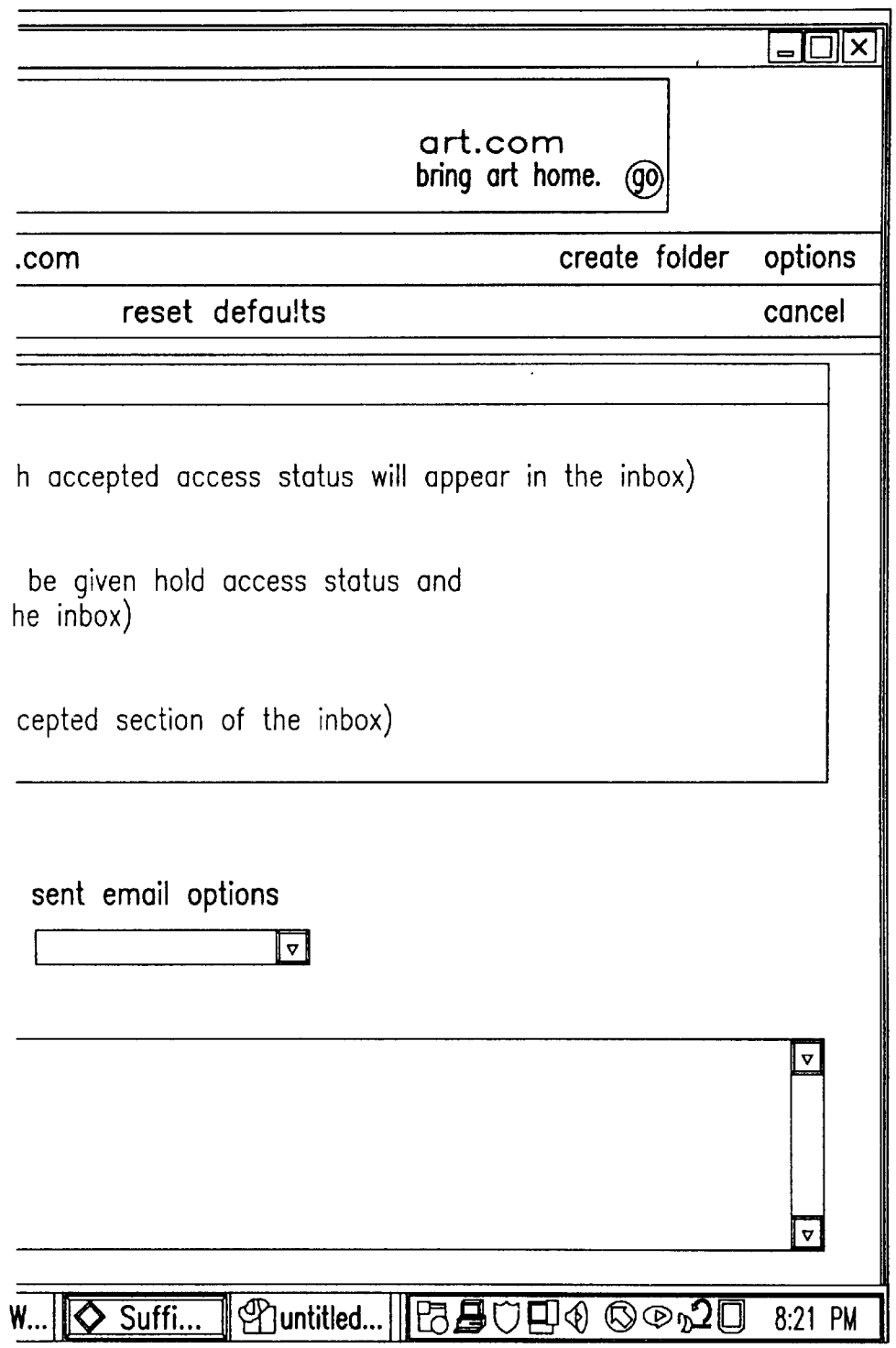
Fig. 1b.2

E-MAIL MESSAGING SYSTEM

This application claims priority from U.S. Provisional Application Ser. No. 60/269,284, filed on Feb. 15, 2001, and entitled "Method and System of Creating Personal Electronic Messaging Domain", the entire disclosure of which is hereby incorporated by reference.

BACKGROUND INFORMATION

The use of electronic mail and/or messaging ("e-mail") is an increasingly popular form of communication for individuals and business alike. The popularity of this communication form is due to it's relatively inexpensive cost and ease of use as well as several other distinct advantages it has over other forms of communication such as mail and telephone communication, including:

1) Asynchronous communication where messages can be sent, received, and stored for later use;
2) Roaming access, where messages are sent, received and stored on a network and may be retrieved from various devices at various locations;
3) The capacity to attach various files to messages;
4) The capacity to send and receive messages in various formats such as text, audio, video, and various multimedia forms including hypertext markup language; and
5) The capacity to filter in-coming messages based on particular criteria set by the receiving system.

A problem with the popularity of electronic messaging is the vast volume of messages that are sent and received daily and the growing amount of time individuals spend each day sorting through their electronic message "in-box". Two existing solutions to this problem are: 1) setting up numerous e-mail accounts with selectively distributed addresses and 2) employing the use of client-side filters, that sort incoming e-mails based on pre-defined criteria.

The first solution is the simplest and most common response. Many Internet users today maintain upwards of 4 e-mail accounts as a way to organize their senders and different types of e-mail. After creating several e-mail accounts to suit specific needs, individuals then give out their various electronic e-mail addresses based on the sender. However, maintaining numerous accounts is an unfriendly, awkward and time-consuming method of managing communications for the end user, and costly for the providers. The user must create, and in some instances pay, for the various accounts. They must also remember several addresses and passwords for each account, and must spend valuable time to check the various accounts on a regular basis for new messages. This multiplicity of accounts further complicates the creation of client-side filters that primarily use the sender's address as the criteria to accept, block or sort. For example, the receiver must create different filters for every account the sender maintains in order to accurately filter mail from that person. Additionally, senders do not know if the address to which they are sending their message is an account the receiver regularly maintains. In cases where the information contained in the message is time sensitive, the probability their message may not be read in a timely manner dramatically increases.

The second approach requires that a user specify a plurality of filters for use in sorting electronic messages. Current filtering methods employ some form of content-based analysis of electronic mail. Content-based filters analyze the address of the sender, the subject, or the body of the body of the electronic messages, and perform predetermined, user-defined actions based on this analysis.

The majority of filtering methods put the burden of differentiating electronic messages on the receiver and are supplied on the premise that not all received messages are of equal interest or importance to the receiver.

A significant irritation associated with existing electronic mail is "spam" or "junk mail". Junk mail is predominantly unsolicited in nature, and by definition, of little or no interest to its recipient. Once an individual's electronic mail address has been included in various "junk mail" senders contact lists, it is sometimes very burdensome and difficult for the individual to be removed from the list. Additionally, lists of electronic mail addresses are very often sold to various organizations and entities without the consent of the address owners. These organizations and entities in turn send unsolicited electronic mail to the addresses on the list, further cluttering the recipient's in-box and making it increasing problematic to be permanently removed from the lists.

Electronic mail filters are applied to detect and reject in-coming junk mail, both on the individual client level and on the larger "provider" level. Existing filters, however, have achieved only moderate success and have severe limitations. Content-based filtering is difficult to implement accurately for several reasons. First, because filters have static criteria, the junk mail sender can readily re-word certain common phrases to by-pass filters, thus allowing the electronic mail to be accepted by the receiver. Moreover, senders of unsolicited mail regularly change their return addresses and/or domain of origin.

SUMMARY OF THE INVENTION

In accordance with a first embodiment of the present invention, a method for providing e-mail communication is provided. The e-mail user interface implements e-mail messaging for a root e-mail address that includes a domain name and a username. Upon receiving a request from a user, the method generates a first suffix e-mail address, and creates a first directory on the e-mail user interface for the first suffix e-mail address. The first suffix e-mail address includes the domain name, the username, and a first suffix name. Upon receiving an e-mail message having a destination address including the domain name and the username, the method stores the e-mail message in the first directory if the destination address includes the first suffix. In accordance with further aspects of this embodiment, a plurality of suffix e-mail addresses can be created, each having a corresponding directory on the e-mail user interface for storing mail addressed to its respective address. Such an emboidment may employ a display screen of any known type or architecture, including, for example, a computer display screen for a desktop computer, a computer display screen for a laptop computer, a display screen for a PDA, a television, or a display screen for a telephone.

In accordance with another aspect of this embodiment, the method, upon receiving a request from a user, designates a sender's address from a received e-mail as one of an accepted address designation and a rejected address designation. Then, upon receiving an e-mail message from the sender's address, the method stores the e-mail message in an inbox if the sender's address has the accepted address designation, and deletes (or stores the message in a directory designated for deleted messages) the e-mail message if the sender's address has the rejected address designation.

In accordance with yet another aspect of this embodiment, the method comprises the step of maintaining a list of accepted e-mail addresses and a list of rejected e-mail addresses. Moreover, upon receiving an e-mail message having a destination address including the domain name and username, the method further comprises the step of storing the e-mail message in an accepted section of the first directory if the destination address includes the first suffix and the sender's e-mail address corresponds to an e-mail address on the list of accepted e-mail addresses, and storing the e-mail message in a hold/new sender section of the first directory if the destination address includes the first suffix and the sender's e-mail address does not correspond to an e-mail address on the list of accepted e-mail addresses and does not correspond to an e-mail address on the list of rejected e-mail addresses. In accordance with still further aspects of this embodiment, each e-mail address on the list of accepted e-mail addresses, and each e-mail address on the list of rejected e-mail addresses, can be associated with one, some, or all of the suffix e-mail addresses.

In accordance with a further aspect of this embodiment, upon receiving an e-mail message having a destination address including the domain name and username, the method further comprises the step of storing the e-mail message in a directory designated for deleted mail messages if the destination address includes the first suffix and the sender's e-mail address corresponds to an e-mail address on the list of rejected e-mail addresses. Alternatively, upon receiving the e-mail message having a destination address including the domain name and username, the method deletes the e-mail message if the destination address includes the first suffix and the sender's e-mail address corresponds to an e-mail address on the list of rejected e-mail addresses.

In accordance with another aspect of the first embodiment, the method comprises the steps of associating the first suffix name with a device; and upon receiving an e-mail message having a destination address including the domain name and username, sending the e-mail message to the device if the destination address includes the first suffix name. In this regard, the device can be of a variety of types, including, for example, a printer, a telephone, a PDA (personal data assistant), a televison, a set top box, an MP3 player, an appliance, or a pager.

In accordance with still other aspects of the above embodiment, the first suffix name is a commercial suffix name, the commercial suffix name is associated with a third party e-mail address, and the commercial suffix name is used by a plurality of users having a plurality of username and domain name combinations. It should be appreciated that the term "commercial", as used herein, is not meant to imply that the third party is a business. Rather, the term "commercial" is meant to encompass businesses, organizations, associations, charities, not-for-profit companies and corporations, governmental agencies, and other entities.

In addition, the methods described above may provide for authenticated and/or encrypted communication between the first suffix e-mail address and the third party e-mail address. Most preferably, this communication supports credit card transactions, banking transactions, and the like.

BRIEF DESCRIPTION OF THE DRAWINGS

FIG. 1(a) schematically illustrates an exemplary user interface for use with the present invention.

FIG. 1(b) shows an illustrative screen display for the user interface of FIG. 1(a).

FIG. 21 illustrates alternative sections of a sub-directory.

DETAILED DESCRIPTION OF THE PREFERRED EMBODIMENTS

Figure 2:
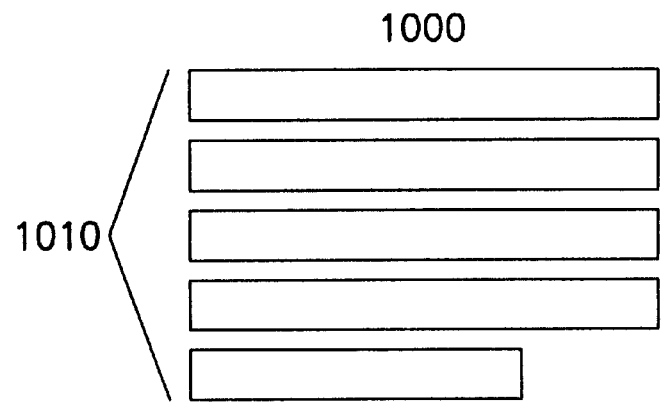
FIG. 2 schematically illustrates a masthead section for the user interface of FIG. 1(a).

The system in accordance with a preferred embodiment of the present invention provides a flexible and customizable electronic mail management system for consumers and businesses. The system allows users to create multiple inboxes, read boxes, and sent boxes of a root e-mail directory to easily sort and control their electronic mail flow. Moreover, the system allows users to control electronic mail delivery on a per-folder, per-sender basis.

As discussed in the Background Information section, many Internet users have several e-mail accounts as a way to manage the amount of e-mail they receive. This is an awkward and time-consuming method of managing e-mail. In accordance with the preferred embodiment of the present invention, users can dynamically create multiple e-mail addresses and access mail from all of the addresses from a single user interface. In this regard, the system in accordance with the preferred embodiment of the present invention allows a user to dynamically generate "suffix" mail accounts with corresponding suffix mail folders for their root e-mail account. In the context of the present invention, the term "root" e-mail account refers to an e-mail account which includes a username and a domain name; e.g. username@ (domainname.com. The term "suffix" is meant, in accordance with the present invention, to refer to an additional term which is separated from the username by a delimiter such as ".", "_", "-", and the like. In accordance with the present invention, the "suffix" can be located before or after the username, e.g. suffix.username@domainname.com or username.suffix@domainname.com. Moreover, multiple suffixes can be combined with a user name: e.g. suffixone.username_suffixtwo-suffixthree@domainname.com.

By providing a third party with an e-mail address including a suffix name, username and domain name, the user is, in essence, telling the third party to place the mail they send in the directory (e.g., folder) corresponding to the suffix name on the e-mail user interface of the user. This "front-loaded sorting" removes the burden of filtering and sorting from the user and creates a more dynamic e-mail management system. It should be appreciated that the system may be configured to accept e-mail for a plurality of "suffix" mail addresses, and preferably, will also accept e-mail sent merely to the "root" address. Messages addressed to the "root" address can simply be stored in a "root" address directory.

Additional functionality can be provided by creating custom sub-directories within each of the suffixes to make further sorting and managing of the mails easier. In this regard, e-mails received from certain e-mail addresses can be automatically moved to a particular sub-directory within a suffix directory.

In accordance with further aspects of the preferred embodiment, a user can control the acceptance of e-mail from a particular e-mail address or a particular domain name. For example, the system preferably allows a user to designate a list of "accepted" e-mail addresses or domain names from which the user wishes to accept e-mails. The system may also allow the user to designate a list of "unaccepted" e-mail addresses or domain names from which the user does not wish to receive e-mails. Messages received from "unaccepted" e-mail addresses are deleted (or simply stored in a "deleted" directory). In a particularly preferred embodiment, the root directory and the suffix directories can each be configured to include an "accepted" section into which e-mail messages from the "acceptable" e-mail addresses can be stored.

Most preferably, the root and suffix directories also include a "Hold/New Sender" section for storing messages from e-mail addresses which are not on the list of "accepted" e-mail addresses or on the list of "unaccepted" e-mail addresses. In this regard, the "accepted" and "hold/new sender" sections can be implemented in a variety of ways. For example, the system could provide separate accepted and hold/new sender sub-directories. Alternatively, the inbox sub-directory could be partitioned into an accepted section and a hold/new sender section. Combinations of these approaches could also be implemented.

With this architecture, a user can review e-mails received from new sources, and decide whether to place these sources on the list of accepted or unaccepted e-mail addresses. Most preferably, when an e-mail from the "Hold/New Sender" section is opened, the system prompts the user (e.g., via a dialog or a toolbar button) to choose whether to place the source of the e-mail message in the "accepted" list or the "unaccepted" list. The system may also allow the user leave the status of the source undesignated, in which case further e-mails from that source would continue to be placed in the "Hold/New Sender" section. If the user chooses to place the source in the "accepted" list, then the e-mail message will be placed in the "accepted" section and any future e-mails received from that source will be stored directly in the "accepted" section. If the user chooses to place the source in the "unaccepted" list, then the message is deleted and any further e-mails received from that source will also be deleted (e.g., stored in a "deleted" directory or deleted). The system may further be configured to return any messages received from an "unaccepted" source to that source via a reply e-mail. In addition, the system can be configured to include a user-defined message with the reply e-mail (e.g., informing the unaccepted source not to send further e-mails).

In certain embodiments, access can be granted (or denied) either on a global basis or on a local basis. For example, the system can be configured 1) to block (or accept) messages from jsmith@aol.com in the root directory and all suffix directories, and 2) to block (or accept) messages from jmurphy@hotmail.com in the sven.newsletters suffix directory.

In accordance with further embodiments of the present invention, a set of specialized "suffixes" can be provided by the system. In this regard, the suffix can be used by the system to trigger further processing of the message. For example, a variety of products are available for receiving facsimiles in electronic form. As an example, E-Fax, available from efax.com, allows a user to associate a telephone number with an e-mail address. If a third party sends a facsimile to the telephone number, E-Fax delivers the facsimile to the user via the associated e-mail account. A specialized suffix, such as username.fax@domainname.com, could be used in accordance with an embodiment of the present invention to receive facsimile e-mails from E-Fax. In this manner, whenever a facsimile e-mail is received, it will automatically be delivered to a Fax sub-directory.

Additional functionality could also be provided. For example, the system could be configured to automatically print any received fax, or to notify the user when a fax is received. In a similar manner, an e-mail sent to pager.username@domainname.com could be automatically sent to a user's pager. The system could also perform automatic processing of an e-mail message. For example, when an e-mail sent to username.wireless@domainname.com, the system could convert the text of the e-mail into an audio message with a speech recognition program, dial the telephone number of the user's wireless telephone, and play the audio message to the user (or the answering service or device associated with the telephone).

The automatic processing could alternatively include translating the message from one language to another. The languages could include: Afrikaans, Albanian, Algerian Dardja, Amharic, Anishinaabe, Arabic, Armenian, Avestan, Azerbaijani, Balinese, Bashkir, Basque, Belarusan, Bengali, Bisayan, Brahui, Breton, Buhi Bicol, Bulgarian, Burmese, Catalan, Cebuano, Chechen, Cherokee-Tsalagi, Cheyenne, Chinese, Czech, Danish, Dutch, English, Esperanto, Estonian, Etruscan, Farsi, Finnish, French, Frisian, Gaelic, Galician, German, Gilbertese, Greek, Guarani, Hakka, Hawaiian, Hebrew, Hindi, Hmong, Hungarian, Icelandic, Igbo, Indonesian, Ingush, Inuktitut, Italian, Japanese, Kamilaroi, Kapampangan, Kendô, Khowar, Korean, Kurdish, Kyrgyz, Lakhota, Latin, Latvian, Lithuanian, Malay, Maltese, Maori, Mapudungun, Marathi, Mayan, Mayangna, Miskitu, Mohawk, Mongolian, Nauruan, Norwegian, Occitan, Ojibwe, Oriya, Pahlavi, Pali, Panamahka, Pashto, Passamaquoddy-Maliseet, Pirahã, Polish, Portuguese, Potawatomi, Prussian, Punjabi, Rasta Patois, Romanian, Romany, Russian, Sami, Sanskrit, Sardinian, Serbo-Croatian, Sioux, Slovak, Slovene, Somali, Sorbian, Spanish, Sranan, Sudovian, Sumerian, Swabian, Swahili, Swedish, Tagalog, Taino, Taiwanese, Tamil, Tarahumara, Tatar, Thai, Tibetan, Tok Pisin, Tongan, Tsalagi, Turkish, Turkmen, Ukrainian, Ulwa, Urdu, Uyghur, Uzbek, Vietnamese, Visayan, Votic, Warlpiri, Welsh, Wolof, Xhosa, Yiddish, and Yotvingian.

In accordance with other aspects of the preferred embodiment, the system allows users to color code e-mail messages in accordance with user-specified criteria. For example, unread messages from an accepted source could be displayed in green, read messages from an accepted source could be displayed in grey, unread messages from a "Hold/New Sender" source could be displayed in blinking yellow, and read messages from a "Hold/New Sender" source could be displayed in non-blinking yellow.

In accordance with other aspects of the preferred embodiment, the system can include "commercial" suffixes which allow a user to transact business with a third party such as a bank. In this regard, a third party may sponsor a "commercial" suffix such as Citigroup.username@domainname.com or abc.username@domainname.org. A commercial suffix address could be used, for example, to provide monthly bank statements to users. Alternatively, the suffix address could be used to provide advertizing targeted to the user. In a preferred embodiment of the present invention, the third party pays for the inclusion of the commercial suffixes in a library of available commercial suffixes that are provided with the system. Further aspects of this embodiment are discussed below.

In accordance with further aspects of the present invention, the e-mail messaging system can utilize conventional authentication and/or encryption techniques to ensure the security of messages sent. For example, username/password combinations can be used to authenticate the user of the system, and encryption techniques can be used to ensure that only the intended recipient is able to view the message.

By providing authentication of users and encryption of messages, the system can be used to conduct secure transactions, via, for example, the commercial suffixes described above. For example, a user could conduct banking transactions by e-mail via a bank's commercial suffix, or purchase goods or services via credit card by sending/receiving e-mails via a vendor's commercial suffix. Conventionally, such transactions are accomplished by logging on to the third-party's website (e.g., a bank or vendor), providing the required information for the transaction, and remaining on the web site until the transaction is complete. This process can be time consuming, and may be completely unsuitable for transactions that cannot be completed within one or two minutes. Through the use of commercial suffixes, these transactions can be conducted via e-mail, without requiring the user to log on to a web site, or to await the completion of the transaction. This allows a user to transact with multiple third parties via a single log-in procedure.

In accordance with still other embodiments of the present invention, delimiters, such as !,#,$,%,^,*,?,>,<,},{,],[ and the like, can be used to assist in the processing of e-mails. The delimiter can be included, for example, in the e-mail address, in the subject field, or in the body of the message. These delimiters could be used for example, to indicate priority, mood, physical location, or time. They could also be used to trigger further processing. For example, the presence of "%" in a subject field or e-mail address could be used to indicate that the message is to be forwarded to a particular device such as a pager, printer, etc. Delimeters can also be used to trigger display characteristics, e.g. a message sent with a "☺" delimeter may be displayed in a particular color sheme or in a particular template.

In accordance with other embodiments of the present invention, a suffix can include time parameters. For example, a suffix might be created that will only accept messages delivered between 9 AM and 5 PM. An automated rejection message can be transmitted to the sender of any message received outside of this time period. Expiration dates and times can also be set for a suffix such that any messages received after a predetermined date and time will be rejected.

The system in accordance with the present invention can be implemented in a variety of environments. For example, it can be implemented over a Wide Area Network (WAN) with users logging into a central server (or set of central servers) located on the WAN. Examples of such environments are web-based e-mail services such as Microsoft® Hotmail, AOL®, and the like. Alternatively, it can be implemented in in a client-server configuration, wherein users log into to a client device which communicates with a e-mail server over a Local Area Network (LAN), and the e-mail server communicates with remote devices over a WAN. An example of such an environment is Microsoft® Exchange Server. The system can also be implemented using a stand-alone e-mail program (similar, for example, to Microsoft's Outlook and Outlook Express programs). In general, the embodiments according to the present invention can be implemented using conventional e-mail messaging protocols for sending and receiving an e-mail message using an e-mail address. Therefore, these protocols will not be discussed in detail herein.

A particularly preferred e-mail messaging system will now be described with respect to FIGS. 1a through 22b. Referring to FIG. 1(a), a preferred graphical user interface 1 is shown, which includes a masthead window section 20, a body window section 10 and a directory window section 30. An exemplary full graphical display of the interface 1 is shown in FIG. 1(b).

The masthead window section 20 includes a "compose" button 100, a "create suffix" button 200, a "preferences" button 300, and a "help" button 400. When selected, the "compose" button 100 opens a new compose window in the body section 20. The "create suffix" button 200, when selected, prompts the user to create a new mail suffix. The "preferences" button 300, when selected, allows the user to change the "preferences" for his or her mail account. The "help" button 400, when selected, opens the help menu into the body section 20. Also included is a "log out" button 450 for logging out of the system at any time.

The masthead window 20 also includes a Directory Masthead section 500, which displays a number of items. The layout of the directory masthead section 500 is shown schematically in FIG. 2, with the corresponding full graphical image shown in FIG. 1b. Referring to FIG. 2, when the current directory is the root directory or a suffix directory, the directory masthead section 500 displays the root/username or suffix name that is currently being displayed on the interface, and the full e-mail address of the root/username or suffix name that is currently being displayed on the interface. In the exemplary display of FIG. 1b, the suffix name "Sven" is shown, along with the e-mail address sven@suffixmail.com. The Directory Masthead section also includes an "options" button. The "options" button allows the user to set various options for the root/username or suffix name that is currently being displayed on the interface. For example, the "options" button, when selected, allows users to delete the suffix, to edit directory access, to add a unique suffix signature and to determine how deleted and sent e-mails from the suffix will be handled. In FIG. 1b, the interface 1 is shown with the "options" button selected, and the various options described above are shown in the body window 10.

Beneath the directory masthead section 500 is a first action masthead section 600. This section may contain any number of functionality buttons unique to each page being displayed in the body window 20. A number of these functionality buttons will be discussed in detail below in conjunction with their underlying environments. However, in the exemplary display of FIG. 1(b), the first masthead section 600 is shown including options, update, reset default, and cancel buttons. The masthead window 10 may also include a second action masthead section 700 located just under the first action masthead 600. This section may not appear on all screens, but when present, may contain any number of functionality buttons unique to each page. In the exemplary screen of FIG. 1(b), no second action masthead 700 is present.

Figure 3:
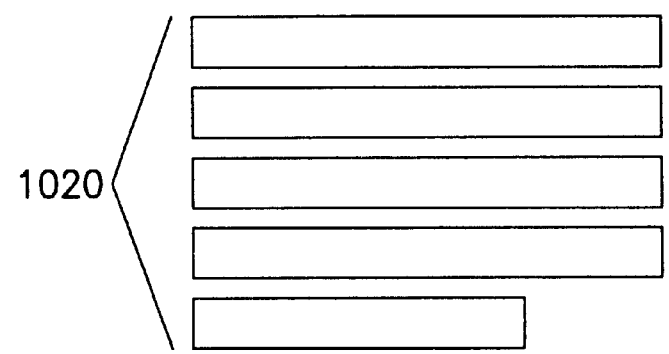
FIG. 3 schematically illustrates a directory section for the user interface of FIG. 1(a).

FIG. 3 illustrates the structure of the directory window 30 of FIG. 1(a). An exemplary screen display including the directory window is shown in FIG. 1(b). Referring to FIG. 3, the directory window 30 includes a directory title bar 1000, a set of default directories 1010, and a set of suffix directories 1020. The directory title bar includes the following fields: directory list, new, and hold. As explained below, the individual directory names for the directories 1010 and 1020 are listed below the "directory list" field. Below the "new" field, and next to each of the directories 1010, 1020 is the number of messages in the directory which are unread. Similarly, below the "hold" field, and next to each of the directories 1010, 1020 is the number of messages in the directory which are on hold. The number of e-mails beneath the "new" and "hold" fields are displayed in white if the directory is not active and in black if the directory is active.

Referring to FIG. 1(b), five default directory buttons 1010 are shown, named "sven" (the root/username), "access", "addresses", "deleted", and "draft". The "sven" directory is shown as active, with 6 "new" e-mail messages and 3 "hold" messages. Since the "sven" directory is shown as active, the sub-directories of "sven" are also shown: inbox (containing received messages that have not been read), a sent box (containing messages that have been sent), and a read box (containing messages that have been received and read). Various navigational buttons are also provided that open up various directories within the current directory.

Figure 4A:
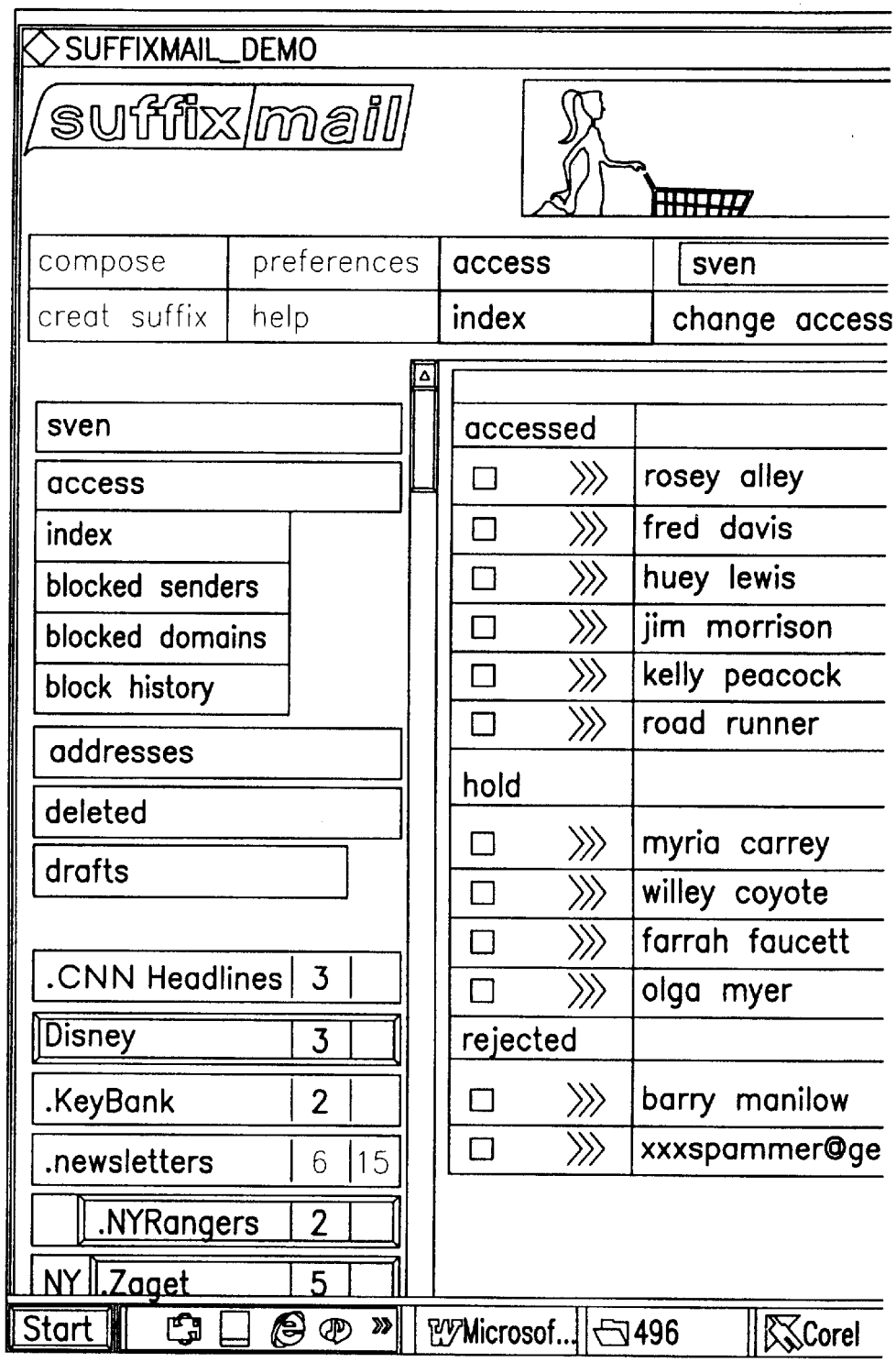
FIG. 4 shows an exemplary screen display with the "access" directory button selected.
Figure 4B:
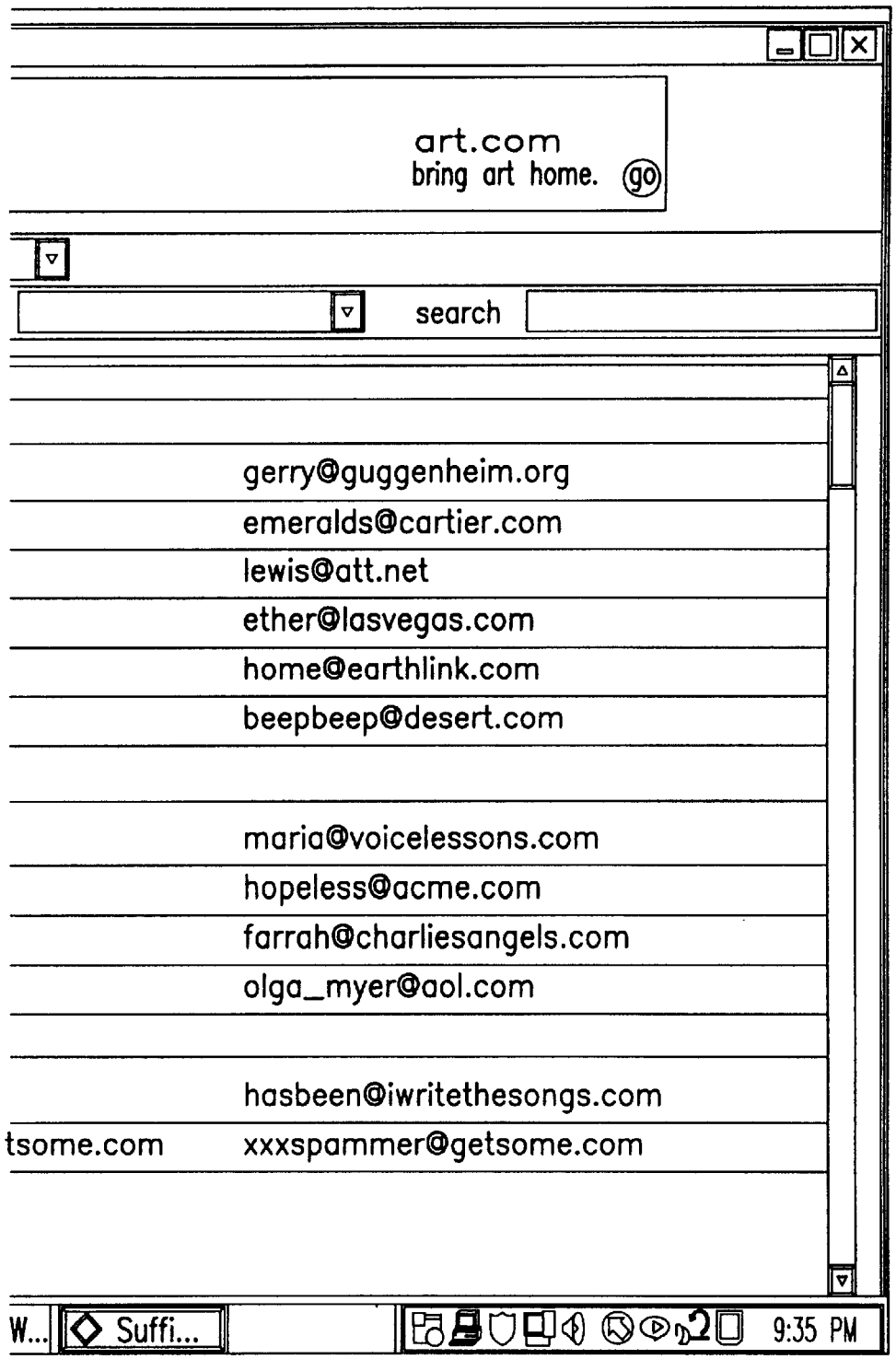

The "access" directory button is used to access on access book (e.g., database) as shown in FIG. 4. As will be discussed in more detail below, with the "access" directory button selected, the body window 20 displays a list of all e-mail sources and their permissions for the root/username or suffix directory displayed in the directory drop down box in the first action masthead 600 (in this case, "sven"). If an e-mail address is designated as "accepted", then messages received from that e-mail address will be placed into the appropriate inbox for the destination address (which can be the root/username or a suffix address). If an e-mail address is designated as "rejected", then messages received from that e-mail address will be blocked. Finally, if an e-mail address is designated as "hold", then messages received from that e-mail address will be placed in the "Hold/New Sender" folder of the inbox for the destination address.

Figure 5A:
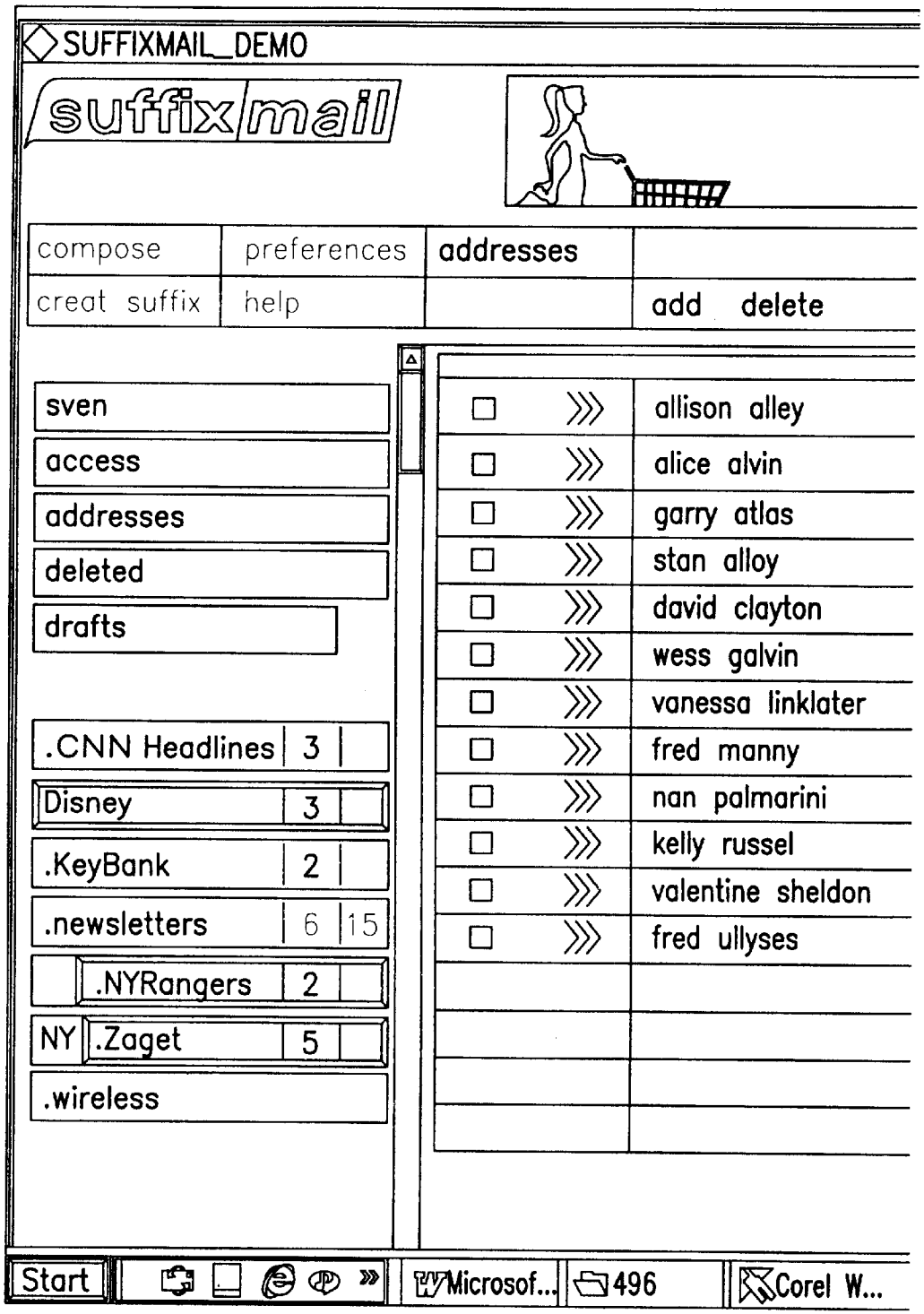
FIG. 5 shows an exemplary screen display with the "addresses" directory button selected.
Figure 5B:

The "addresses" directory button, when selected, displays an e-mail address book in the body window 10 as shown in FIG. 5. The "deleted" directory button, when selected, displays in the body window 10, a list of deleted e-mail messages, regardless of their original location. Finally, the "drafts" directory button, when selected, displays in the body window 10 a list of all e-mail messages which have been saved as a draft, regardless of their original location.

Figure 6A:
FIG. 6 shows an exemplary screen display with the commercial suffix "CNN" selected.
Figure 6B:
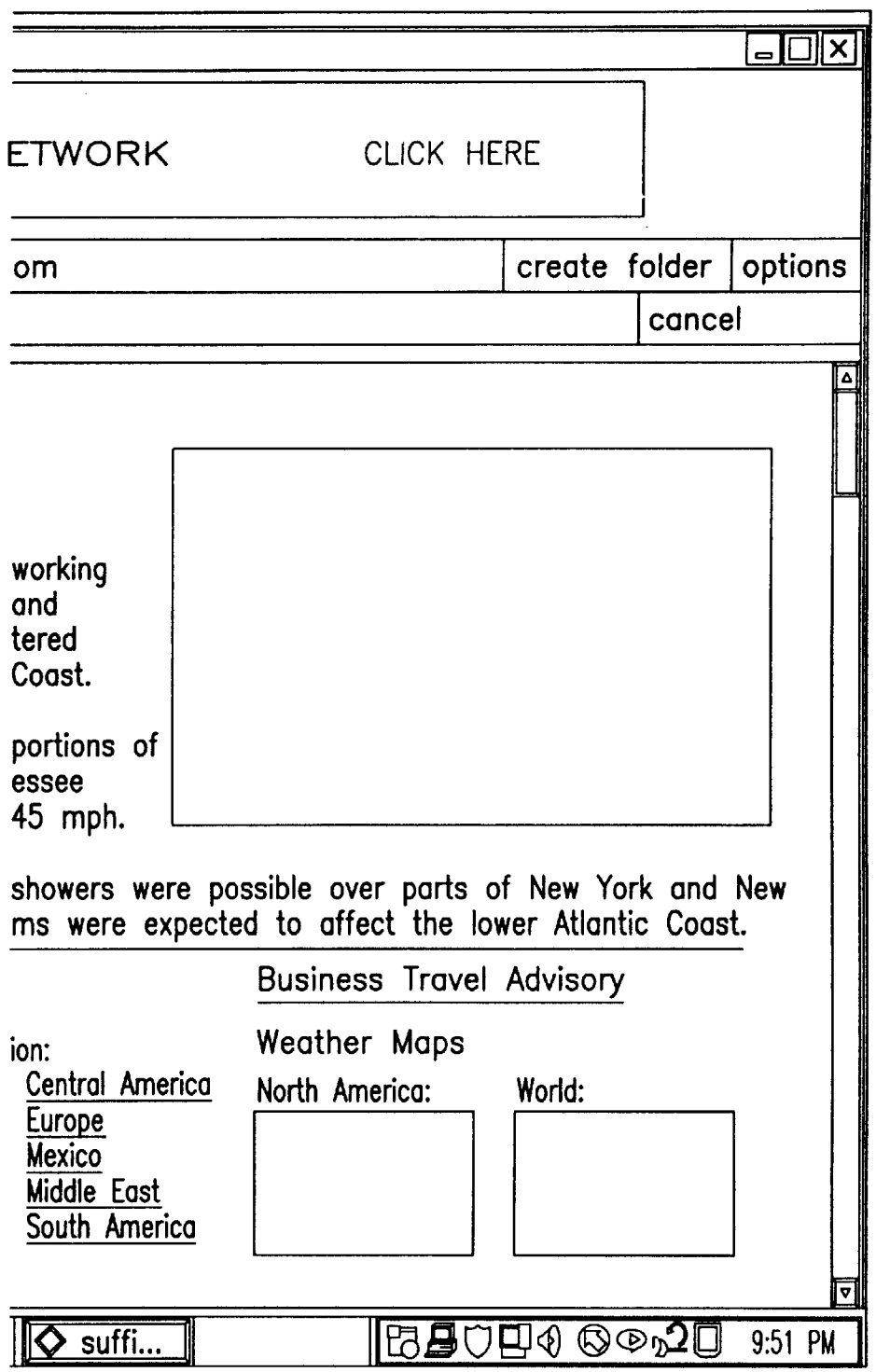

Referring again to FIGS. 1(b) and 3, five suffix directories 1020 are shown: CNN, Disney, Keybank, newsletters, NY Rangers, and Zagats. A user may create any number of suffixes (such as the newsletters suffix of FIG. 1(b)) or may subscribe to commercial suffixes (such as the remaining suffixes of FIG. 1(b)). FIG. 6 shows the interface with the commercial suffix "CNN" selected, and FIG. 7 shows the interface with the user created suffix "newsletters" selected.

Figure 7A:
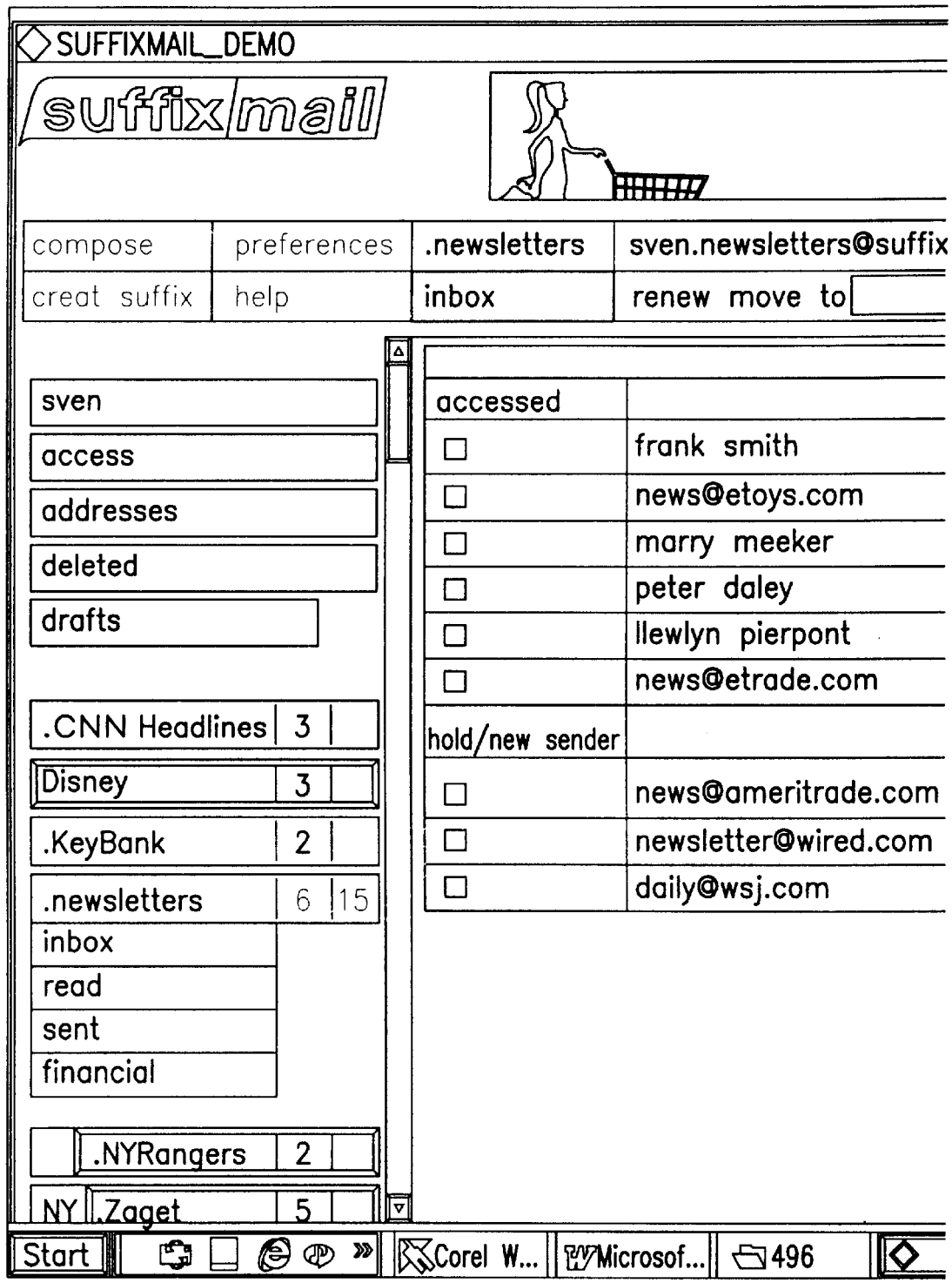
FIG. 7 shows an exemplary screen display with the user created suffix "newsletters" selected.
Figure 7B:
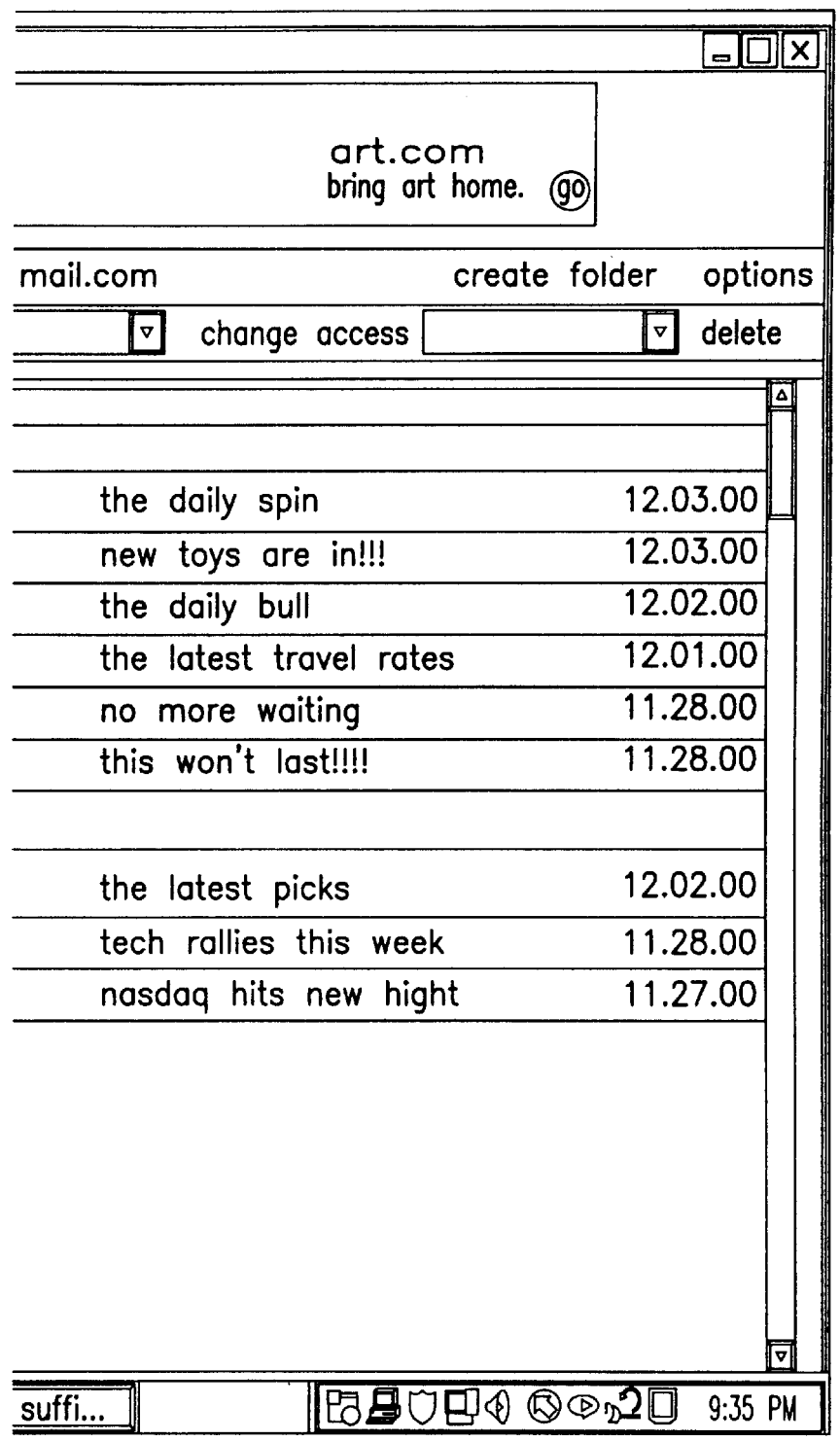

Referring to FIG. 7, each suffix directory includes three default sub-directories: "inbox", "sent" and "read" which are displayed when the suffix directory is selected. The "inbox" directory contains all the e-mails that have been sent to the suffix account and that have not been rejected. The "inbox" directory includes two sections: Accepted and Hold/New Sender. Within each section, e-mails are sorted by date of receipt and by whether they have been read or unread. The accepted section contains all the new e-mails that have been received from senders that are in the address book and have "Accepted" status for the suffix in the access book. The Hold/New Sender section contains all the new e-mails from the senders who are either registered in the address book and have a Hold/New Sender status for the suffix account in the access book, or are not registered in the address book. The read directory contains all the e-mails addressed to the suffix account that were initially in the accepted section of the Inbox (of the suffix) but have been read, and the sent directory stores all the e-mails sent from the suffix account. The suffix directory can also include user-defined sub-directories. The user-defined sub-directories are created within each suffix directory by the user. To move e-mail to a user-defined sub-directory, the user uses the "move to" drop down box in the first action masthead 600. In this regard, the drop down selection box allows the user to select from available user-defined sub-directories. In the illustration of FIG. 7, the newsletters suffix directory includes a user defined sub-directory called "financial." To view a subdirectory, the user selects the appropriate button (e.g., inbox, read, sent, financial) from the directory window 30. In the example of FIG. 7, the default sub-directory is "inbox", and therefore, the "inbox" sub-directory is automatically selected when a user selects the newsletters directory by selecting the "newsletters" button from the directory window. As mentioned above, a pair of fields next to the suffix button (e.g. newsletters) indicates the number of messages in the suffix directory which are new (e.g. 6) and the number of messages in the suffix directory that are on hold (e.g., 15).

The first action masthead 600 of a suffix directory includes the following items: a directory title field, an e-mail address field, a create new folder button, an options button, a sub-directory field, a renew button, a move to drop down box, a change access drop down-box, and a delete button. The directory title field (e.g., ".newsletters" in FIG. 7) identifies the current suffix directory, the e-mail address field includes the full e-mail address of the suffix directory (e.g., sven.newsletters@suffixmail.com in FIG. 7), and the sub-directory field includes the current sub-directory shown in the body window 10 (e.g., inbox in FIG. 7). The "create new folder" button, when selected, allows the user to create a new folder, as a sub directory of a suffix directory, and the "option" button, when selected, allows users to delete the suffix directory, to edit directory access, to add a unique suffix signature, and to determine how deleted and sent e-mails from the suffix will be handled.

Referring to FIG. 7, both sections of the inbox sub-directory include a "select" column, a "from" column, a "subject" column, a "received" column, and a sorted by icon. The "select" column includes, for each message, a check box to select the message. If the check box is checked, the e-mail action button the user clicks will determine how the selected e-mail will be handled. The "from" column contains the senders' address or alias. In addition, the name in the "from" column is hyper linked to a pop-up window which displays the contact details for the sender from the address book. The "subject" column contains the subject of the e-mail, and is hyper linked to the e-mail. Therefore, by clicking on the subject of the e-mail, the page is refreshed to display the e-mail. The "received" column contains the date the e-mail was received. The sorted by icon ("▲") indicates the column that the e-mail is sorted by.

The first action masthead 600 also includes a "renew" button, a "move to" button and drop down box, and a "change access" drop down box. These elements allow users to determine what is to be done with selected e-mails from the Accepted and Hold/New Sender sections of the Inbox. The "renew" button refreshes the page and changes "opened e-mail icons" to "new e-mail icons". The "move to" button and drop down box allows the user to chose an applicable sub-directory to move the selected message to (e.g., Read, New folder(s), Deleted). Preferably, the "move to" button and drop down box does not act on the Hold/New sender's section of the Inbox Window. The "change access" drop down box provides the following selections: Accept Sender, Hold Sender, Reject Sender, Block Sender and Block Domain. The Accept Sender selection refreshes the page and moves the selected e-mails to the Accepted section of the Inbox window. The Hold Sender selection refreshes the page and moves the selected e-mails in the Hold/New sender's section of the Inbox Window. The Reject Sender selection refreshes the page and deletes the selected e-mails from the Inbox window. The respective status of the e-mail addresses will appear as "Reject", Hold, or "Accepted" for the current account in the access book. For all other directories the access status will not change (the default access status is "Hold").

The Block Sender selection refreshes the page and eliminates the selected e-mails from the inbox window. All subsequent e-mails from this address will be blocked and the sender is added to the Blocked Senders Directory. After selecting "block sender", the user will be prompted to choose one of the following options:

1. delete all existing e-mails totally from system; or
2. move all existing e-mails to the "deleted" directory.

The block domain selection refreshes the page and eliminates the selected e-mails from the inbox window. All subsequent e-mails received from these domains will be blocked. The addresses and domains will be added to the blocked domains directory. In addition, if there are any other messages received from addresses with the same domain, they are also added to the blocked domains directory. After selecting "block domain", the user will be prompted to choose one of the following options:

1. delete all existing e-mails totally from system; or
2. move all existing e-mails to the "deleted" directory.

Figure 8A:
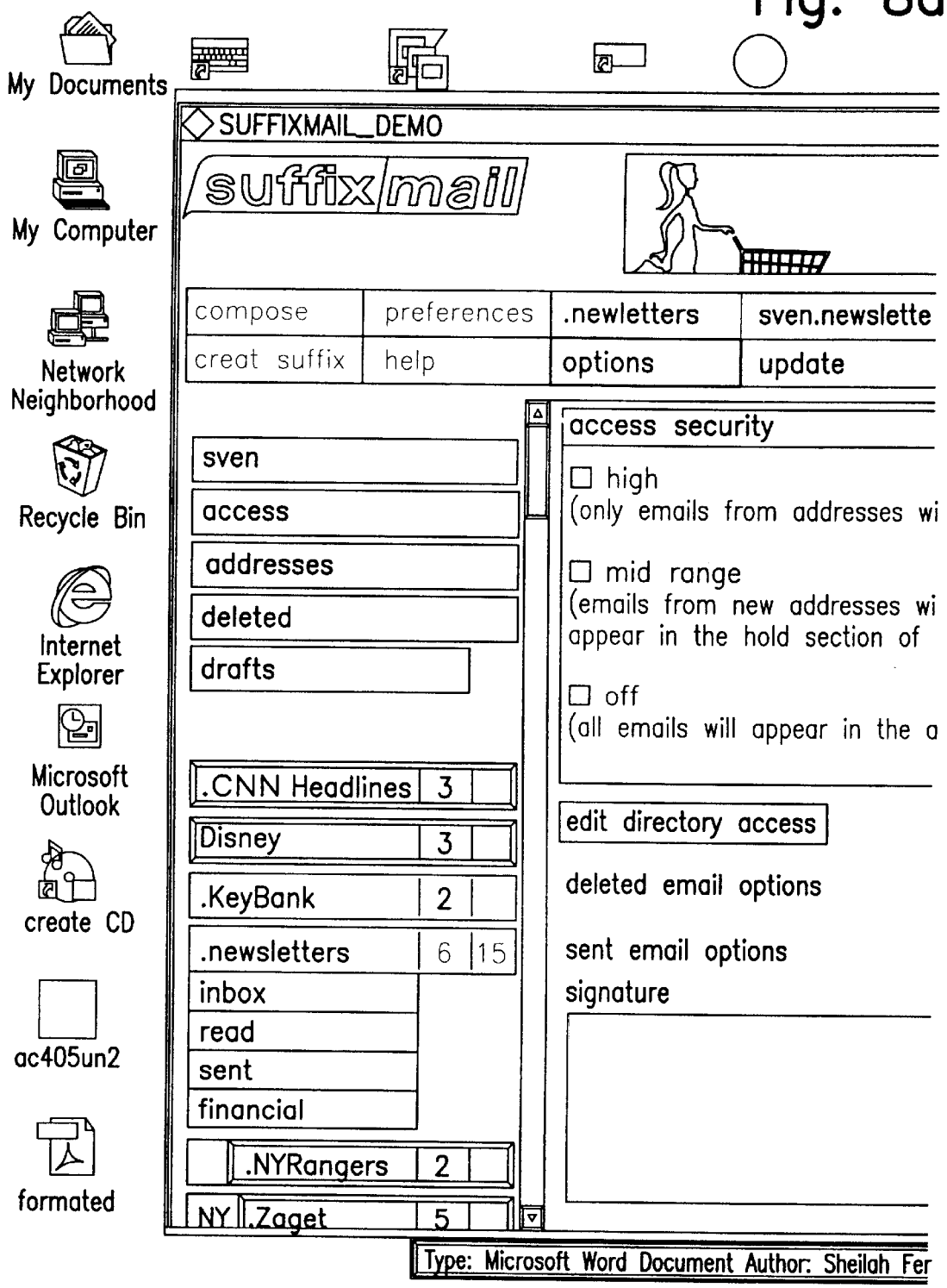
FIG. 8 shows an exemplary screen display with the "options" button selected.
Figure 8B:
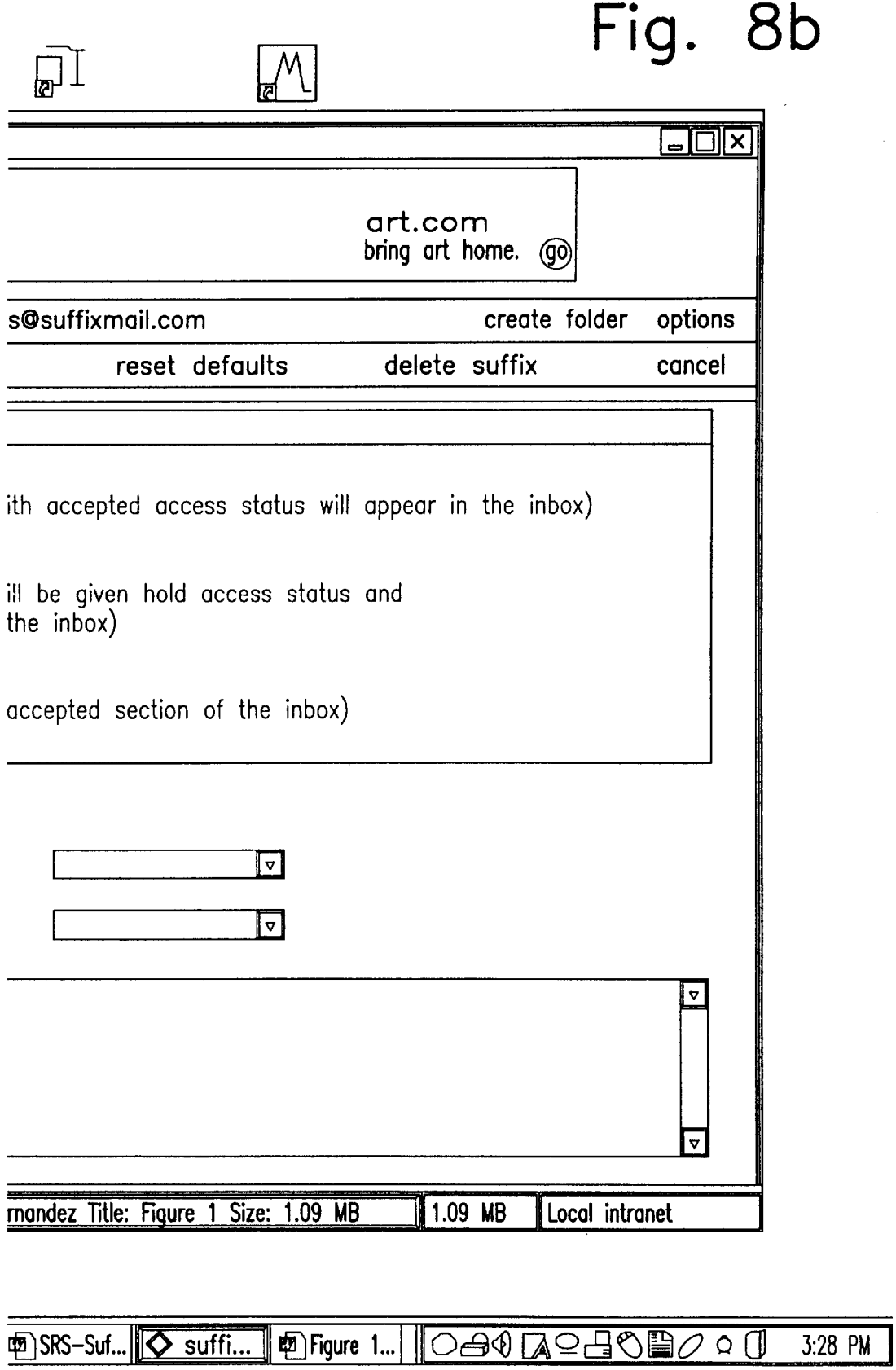

Upon selecting "Options" from the first action masthead 600 of a suffix directory, a suffix options information window is displayed in the body window 10 as shown in FIG. 8. The suffix options information window includes an access security section, an "edit directory access" button, a "deleted e-mail options" drop down box, a "sent e-mail options" drop down box, and a signature field.

The access security section allows the user to determine the access level for incoming messages to the current suffix directory, and includes a "high" check box, a "mid range" check box, and an "off" check box. The "high" check box, when selected, allows only e-mails from addresses with accepted access status to appear in the inbox. The "mid range" checkbox, when selected, allows e-mails from new addresses to be given hold access status and to appear in the Hold/New Sender section of the inbox. The "off" check box, when selected, allows all e-mails to appear in the accepted section of the inbox.

The "edit directory access" Button, when selected, opens the Access Directory page for the current suffix directory and allows the user to edit the access status per e-mail address. The functionality of the access directory page will be discussed in more detail below.

The "deleted e-mail options" drop down box, when selected, allows a user to determine the destination of e-mails being deleted from suffix inbox. The two options available for this section are a.) "move to deleted" (which causes a copy of e-mail deleted from suffix inbox to be stored in the "deleted" directory; and b) "immediately discard" (which causes the system to permanently delete the e-mail deleted from the suffix inbox).

The "sent e-mail options" drop down box, when selected, allows a user to determine the destination of e-mails being sent from the current suffix Inbox. The two options available for this section are a) "keep copy in sent", which causes a copy of e-mail sent from suffix inbox to be stored in the "sent" directory of the current suffix; and b) "do not keep copy", which causes the system to not keep a copy of e-mails sent from the current suffix directory.

The Signature field is a blank field where the user may input a custom signature that may be included in the outgoing e-mail from the current suffix directory.

Upon selecting the "update" button from the first action masthead 600, the page is refreshed, and any new settings for the folder entered in the body window 10 are saved. Upon selecting the "reset defaults" Button, all options for the current suffix directory are reset to the settings before the Options window was opened.

Figure 9A:
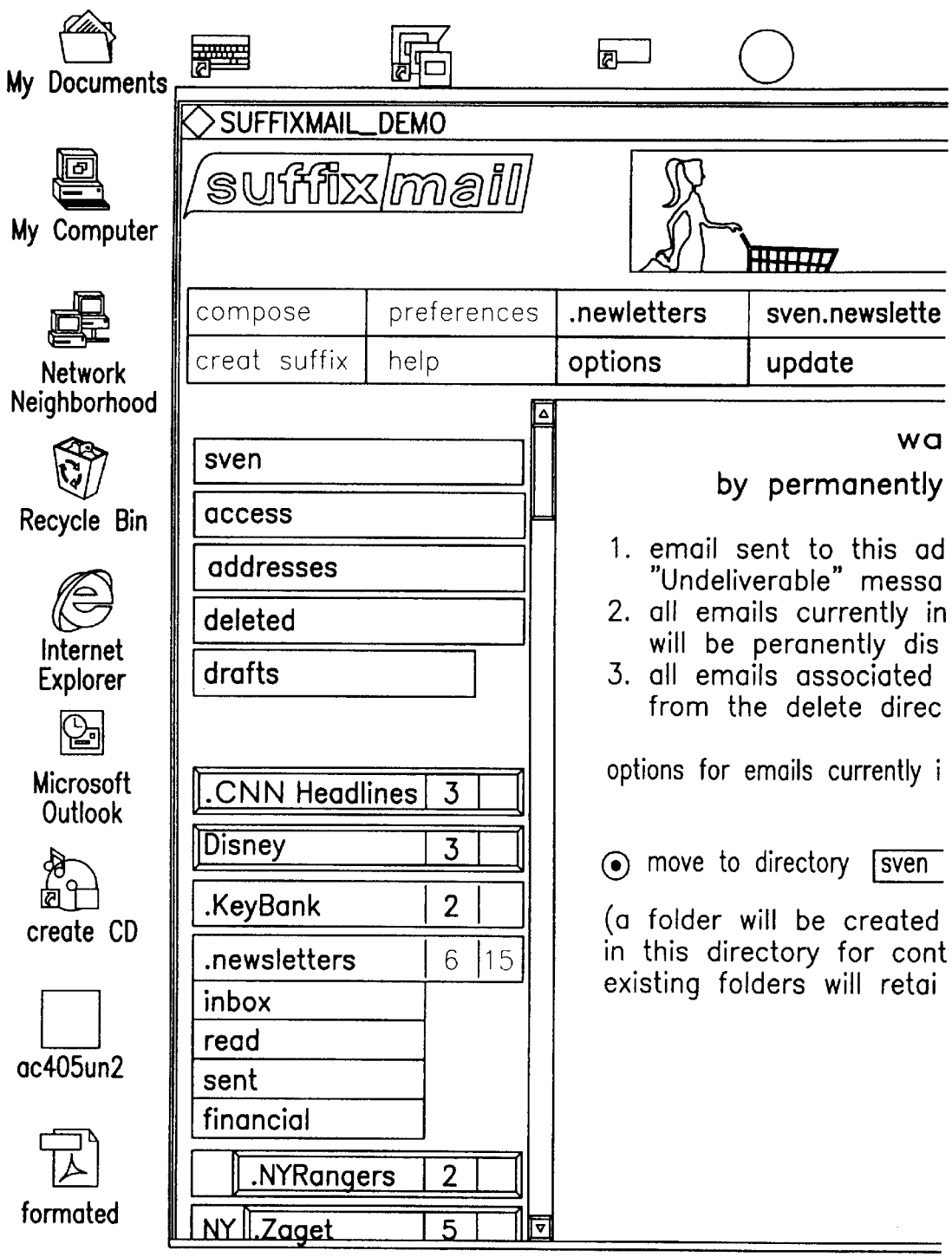
FIG. 9 shows a "Delete Suffix Warning Page".
Figure 9B:
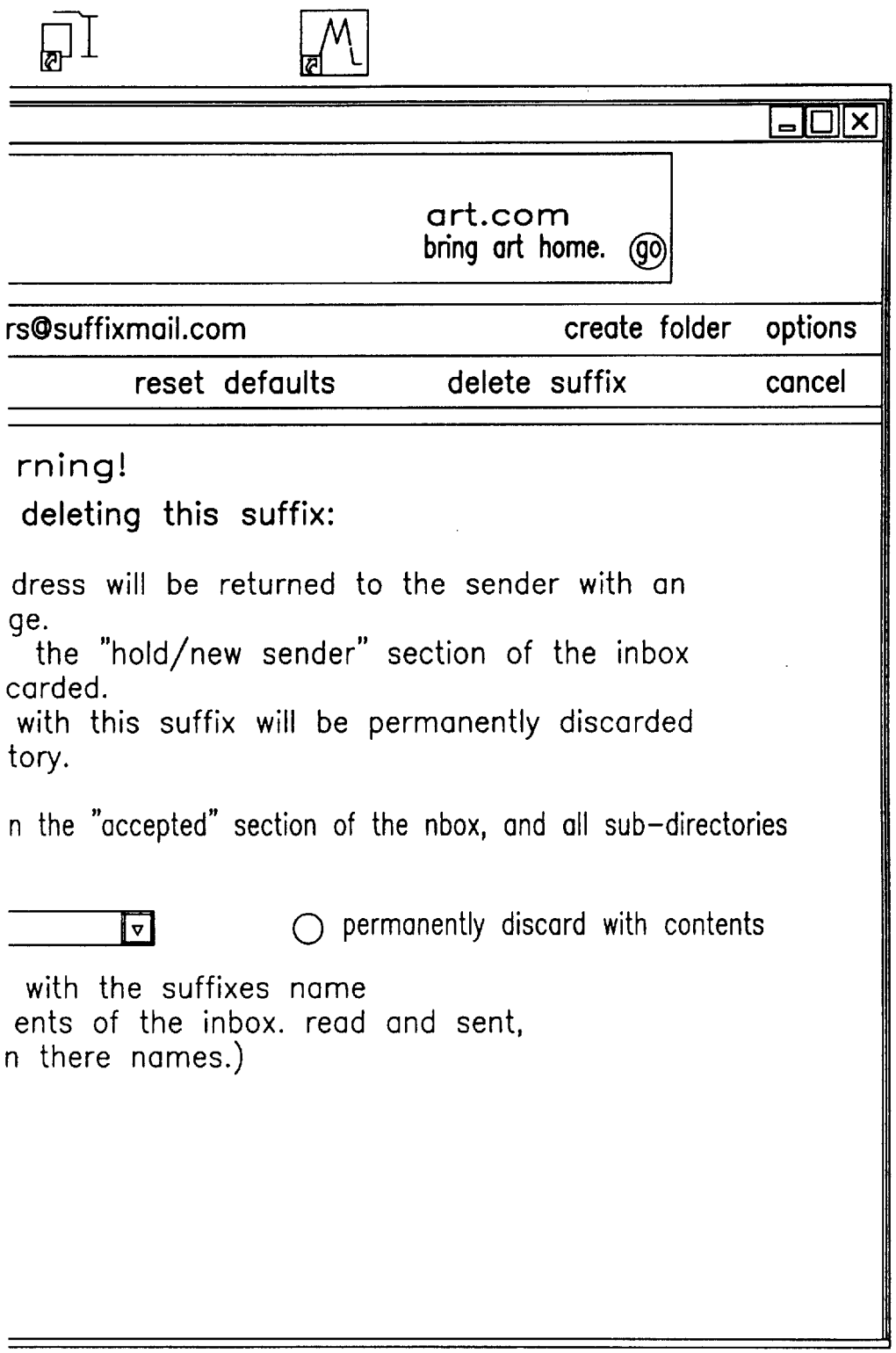

Upon selecting the "delete suffix" button from the first action masthead 600, a "Delete Suffix Warning Page" is opened as shown in FIG. 9. The "Delete Suffix Warning Page" alerts the user to the consequences of deleting the suffix. If deleted, all the e-mails addressed to the suffix will be returned with an "Undeliverable" message. Moreover, all the e-mails that were addressed to the current suffix, in the "Deleted" directory are permanently deleted from the system, and all references to the suffix directory are removed from the "Access" directory. The "Delete Suffix Warning Page" includes a "move to directory" radio button and drop down box, a "permanently discard With contents" Radio Button, a "cancel" button, and a "delete suffix" button. The "cancel" button, when selected, returns the user to the display of FIG. 7 without deleting the current suffix.

The "move to directory" radio button and drop down box includes a radio button for selecting the "move to directory" option, and a drop down box that allows the user to select from the root/username directory and all of the suffix directories. When the radio button is selected, and the "delete suffix" button subsequently selected, a new subdirectory is created in the directory specified in the drop down box that has the name of the suffix directory that is being deleted. All e-mails in the "Accepted" section of the inbox sub-directory of the current suffix directory are moved into the specified directory. All e-mails in the read, sent, and user defined sub-directories of the current suffix directory are also moved into the specified directory.

The "permanently discard with contents" radio button, when selected, causes the current suffix directory, along with all of its contents, to be deleted from the system when the "delete suffix" button is subsequently selected.

Figure 10A:
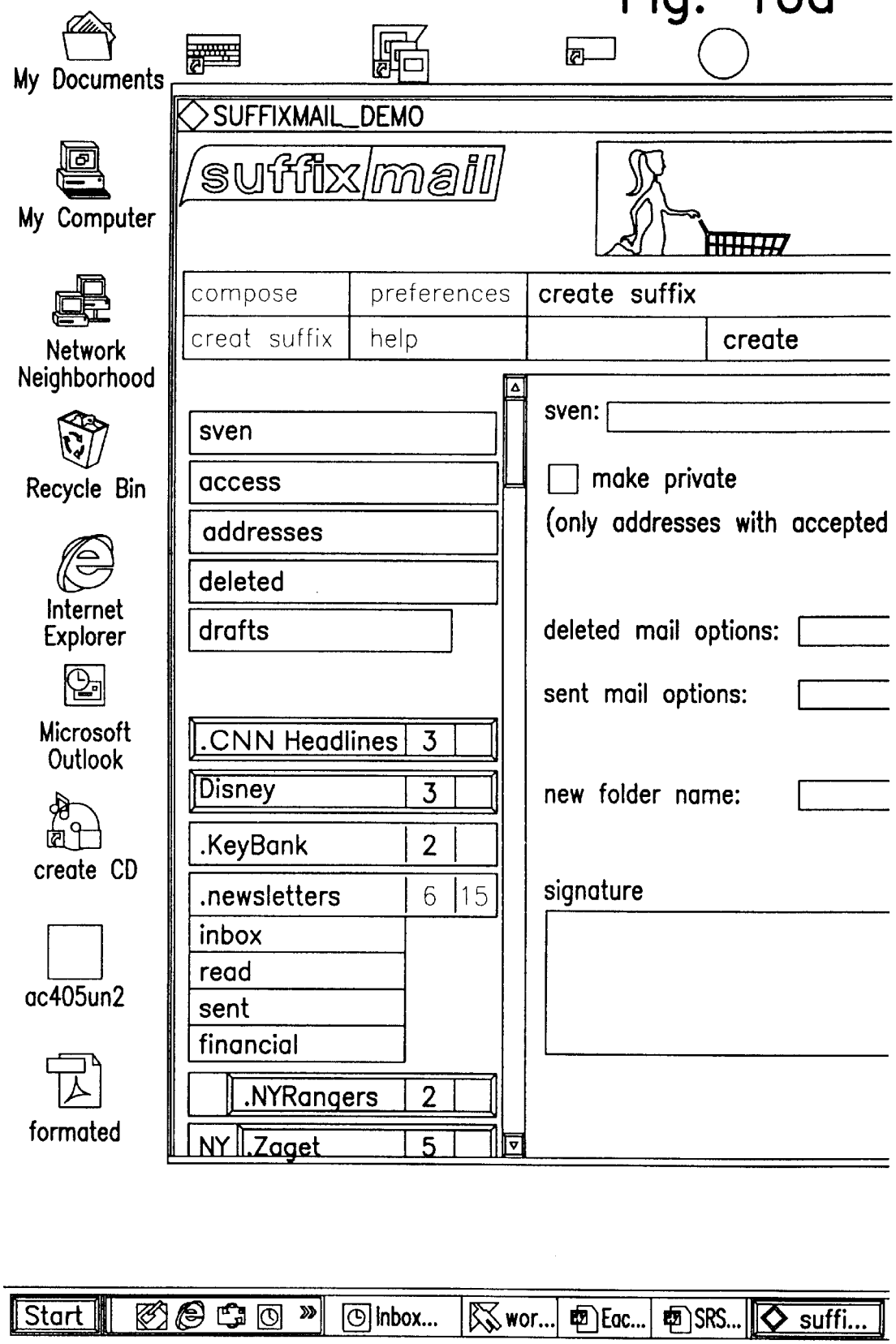
FIG. 10 shows an exemplary screen display with the "create suffix" button selected.
Figure 10B:
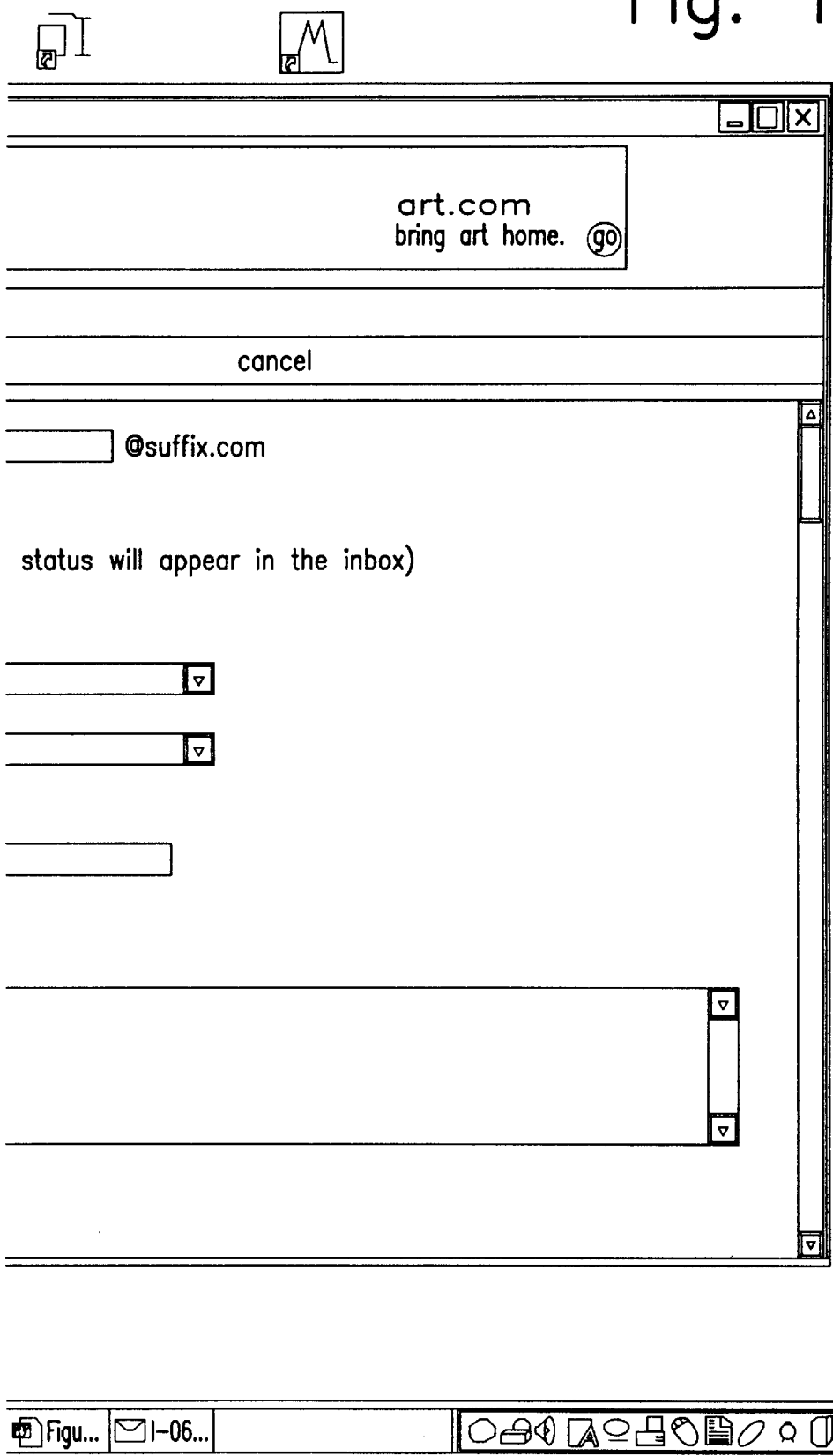

By selecting the "create suffix" button 200 on the masthead window 20, a create suffix screen is displayed as illustrated in FIG. 10. When the create suffix screen in displayed in the body window 10, the first action masthead 600 includes a create suffix title (indicating that the body window is displaying the create suffix screen), a "create" button, and a "cancel" button. The "cancel" button, when selected, returns the user to the screen display that was being viewed prior to selecting the "create suffix" button 200.

The body window 10 includes a new suffix text box for entering the e-mail address for the suffix address being created. Also included in the body window 10 is a "deleted e-mail" drop down box, a "sent e-mail" drop down box, a "new folder name" text box, and a signature text box. The "deleted e-mail" drop down box includes two options: i.) "Move To Deleted", which causes the system to save a copy of e-mails deleted from the Inbox of the created suffix directory in the "deleted" directory, and ii) "Immediately Discard", which causes the system to permanently delete the e-mail deleted from the inbox of the created suffix directory. The "sent e-mail" drop down box includes the options "keep a copy in sent" and "immediately discard." The "keep a copy as sent" option causes the system to store copies of the e-mails sent from the newly created suffix in a sent sub-directory of the suffix directory, whereas the "Immediately Discard" option causes the system to not store copies of the e-mails sent from the newly created suffix in a "sent" sub-directory of the suffix directory.

The "create folder" text box, when populated (i.e. filled in) will cause the system to create a new folder with the entered name as a subdirectory within the newly created suffix. The "create signature" text box, when populated, will specify a suffix specific signature that will be applied to the bottom of every e-mail sent from the newly created suffix.

The "create" button, when selected, causes a suffix address to be created in accordance with the information contained in the body window. If the user has not filled in the "new suffix name" field prior to selecting the "create" button, then the page will refresh with a warning.

Figure 11A:
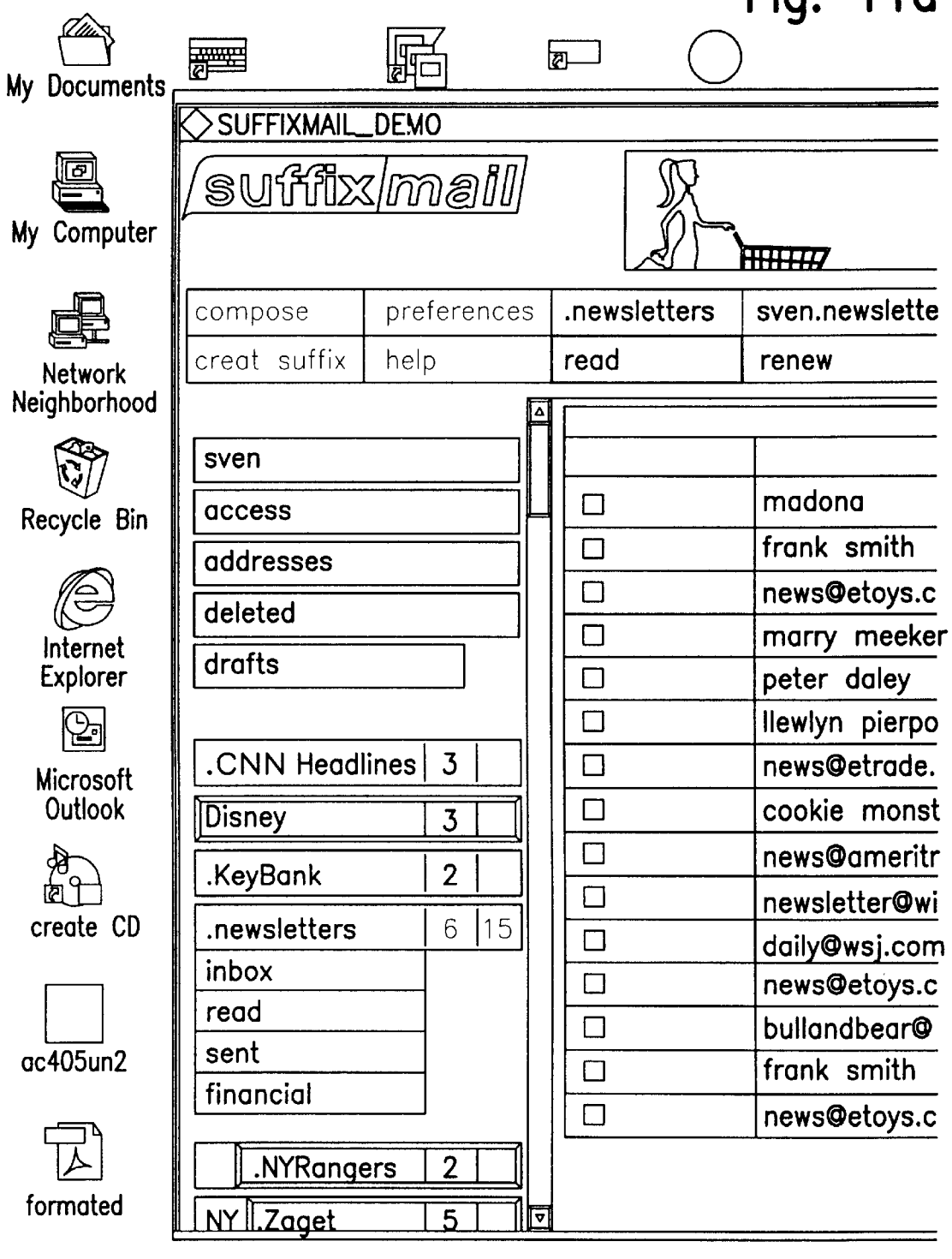
FIG. 11 shows an exemplary screen display of a "read" sub-directory.
Figure 11B:
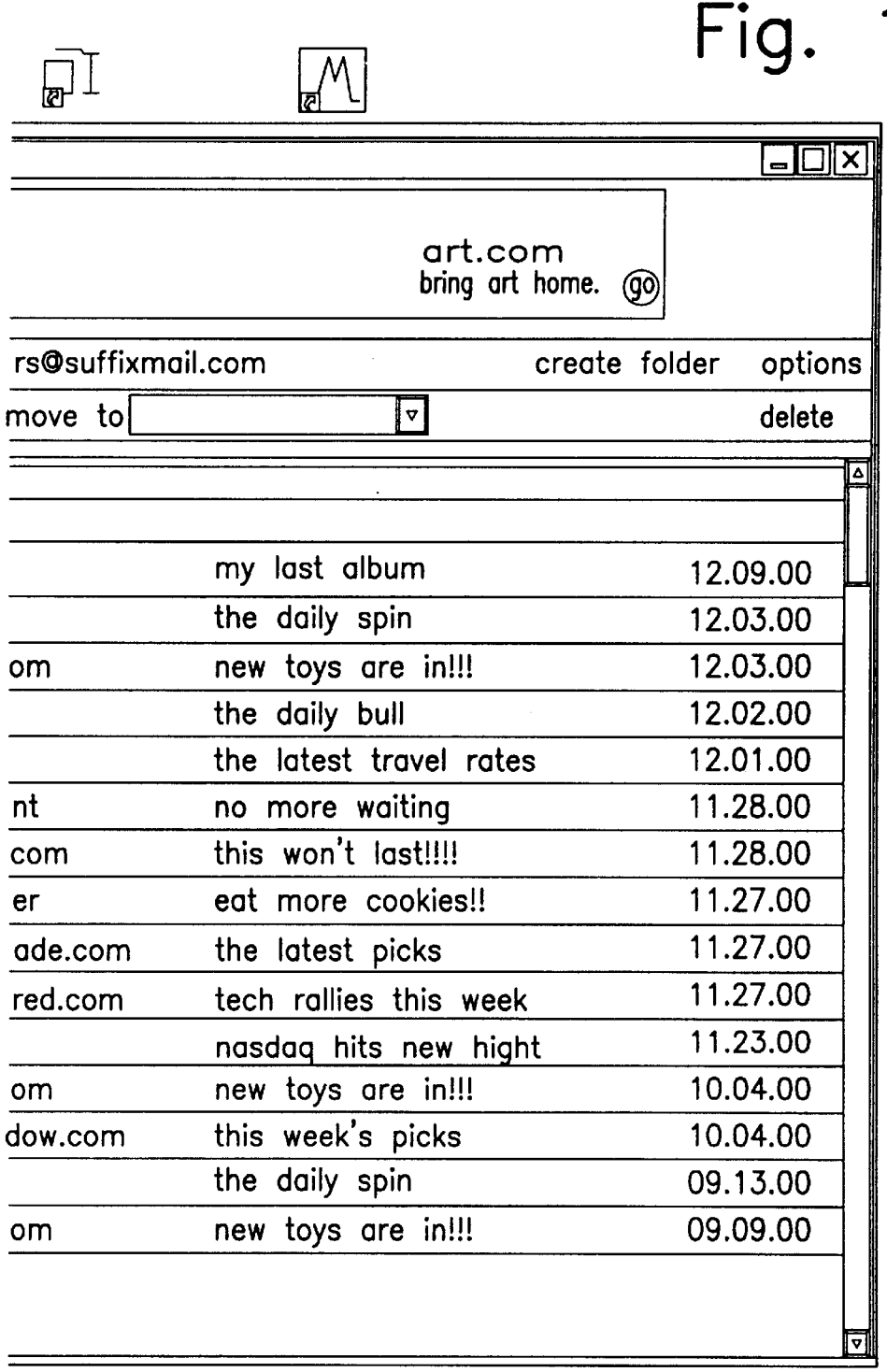

Unless the source of an e-mail sent to the root/username or suffix e-mail has been rejected (or otherwise blocked), the e-mail is placed in the inbox of the root/username or suffix directory corresponding to the destination address of the e-mail. Once a user opens the e-mail, the Read Mail Icon indicates it has been read in the Inbox. When user exits a directory, all "Accepted" e-mails with read mail icon are placed in a "read" sub-directory of the respective root/username or suffix directory. Preferably, e-mails with the read mail icon in the Hold/New Senders section of the Inbox remain in the inbox until a decision on access status in made. An exemplary "read" sub-directory is shown in FIG. 11.

Like FIG. 7, the first action masthead 600 includes the e-mail address of the current root/username or suffix, the current directory (in this case ".newsletters"), and the current sub-directory (in this case "read"). A "create folder" button, when selected, allows a user to create a sub-directory within the current directory. The "options" button allows users to perform options depending on whether they are in a root/username or a suffix directory. In this regard, FIG. 1(*b*) shows the page displayed when the "options" button is selected from the root/username directory and FIG. 8 shows the page displayed when the options button is selected from the root/username directory. The root/username directory options allow a user to specify how deleted and sent e-mails from the root/username will be handled, to modify the access to the directory (as in FIG. 4), to make the root/username private, to add a unique root/username signature, and to allow the user to edit his/her profile information. The suffix directory options allow a user to make the suffix private, to modify the access to the directory (as in FIG. 4), to add a unique suffix signature, and to determine how deleted and sent e-mails from the suffix will be handled.

The first action masthead 600 also includes a "renew" button, a "move to" button and drop-down box, and a "delete" button." The "move to" button and drop-down box and the "delete" button function in the same manner as described above with regard to FIG. 7, except that the options available in the "move to button" and drop down box are those relevant to a "read" sub-directory (e.g. Inbox, New folder(s), deleted) If the renew button is selected, any selected, any selected pages are refreshed and the selected e-mails are moved to the Accepted section of the Inbox. The window body 10 for a "read" sub-directory includes a "select" column, a "from" column, a "subject" column, a "received date" column, a sorted by icon, select check boxes, mail icons, and file attachment icons, each of which function in the same manner as described above with regard to FIG. 7.

Figure 12A:
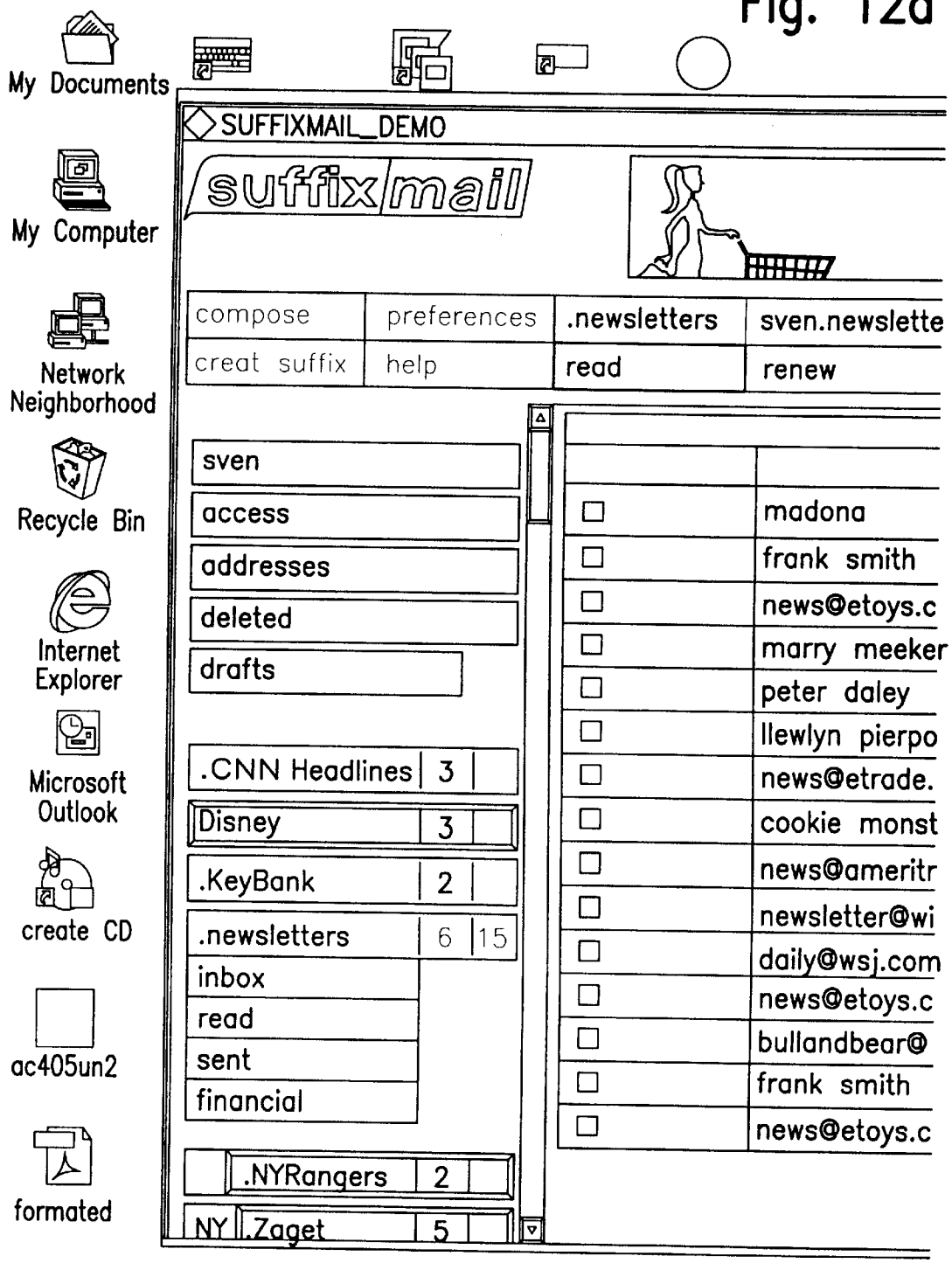
FIG. 12 shows an exemplary screen display of a "sent" sub-directory.
Figure 12B:
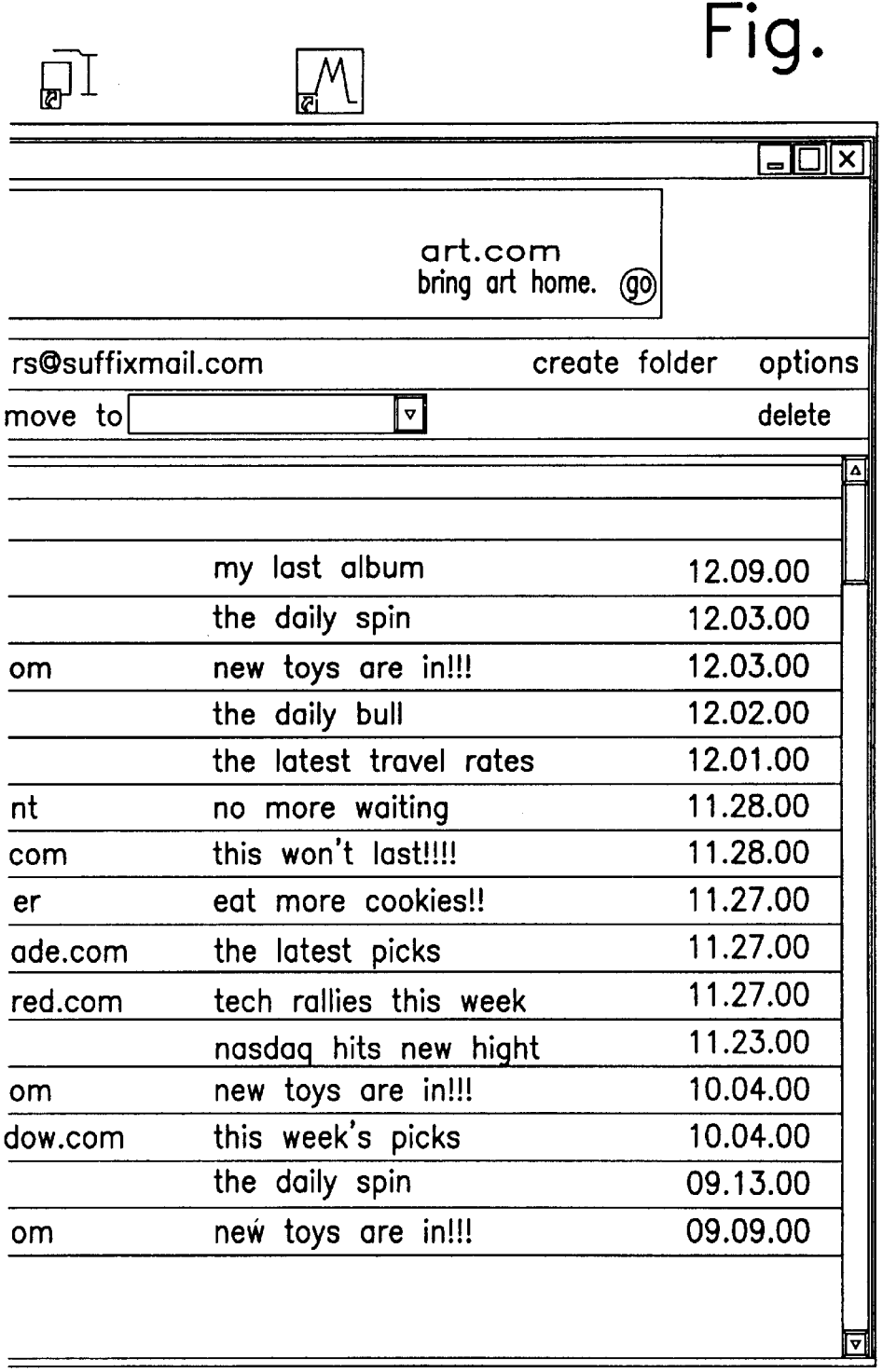

When an e-mail message is sent from a root/username or suffix mail account, it is stored in the respective 'sent' sub-directory of the corresponding root/username or suffix directory. In addition, the system preferably records every recipient of every e-mail sent in the address book with default access of "Hold", if they do not already exist in the address book with an existing access status. As shown in FIG. 12, the first action masthead 600 and body window 10 of a sent sub-directory is similar to the first action masthead and body window 10 of FIG. 11, except that the "renew" button in the first action masthead 600 is replaced by a "resend button", and the "received" column in the body window 10 is replaced with a "sent" column. As its name suggests, the "resend" button, when selected, causes any message having its check box selected to be resent. The "sent" column is sortable and contains the date that each e-mail was sent.

Figure 13A:
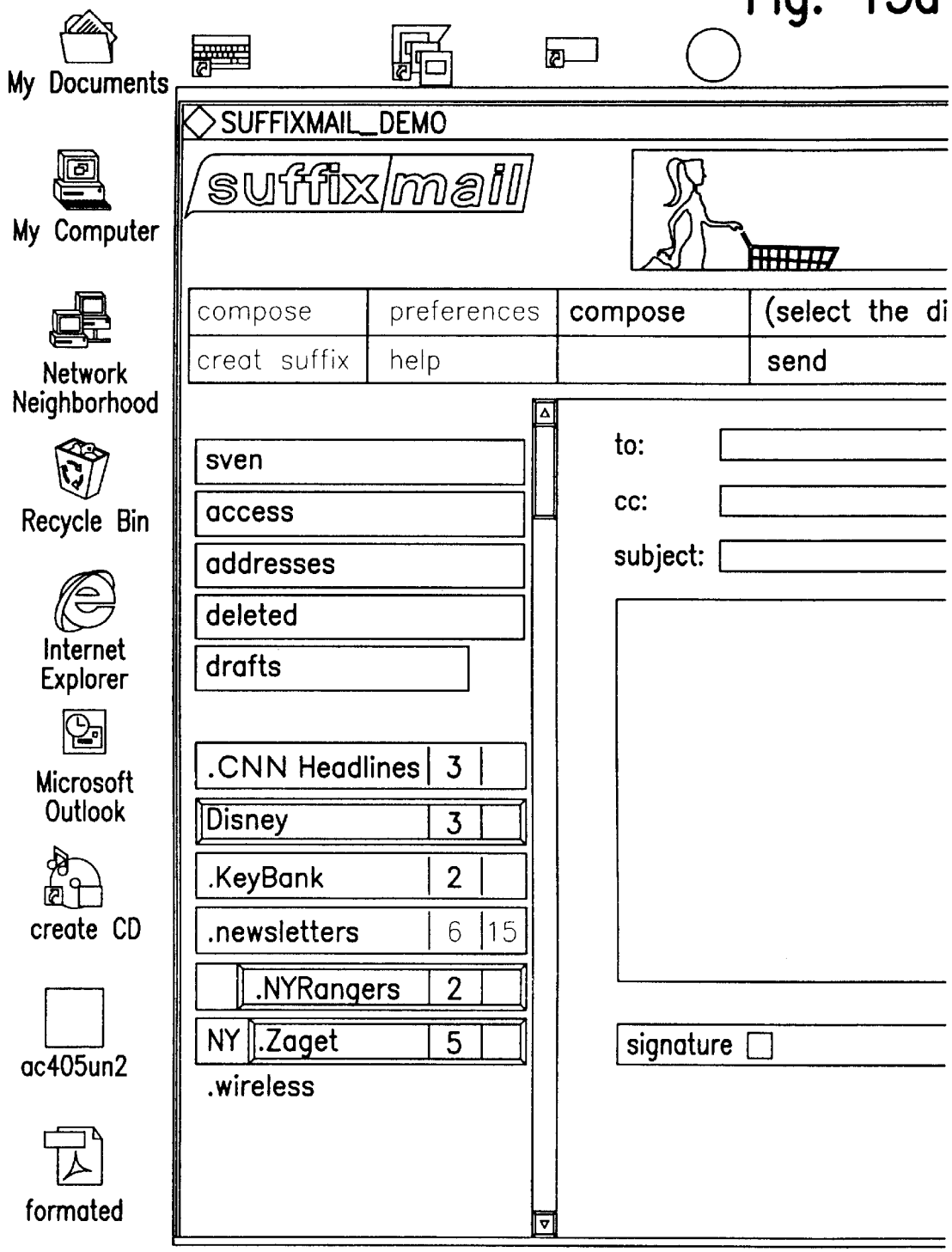
FIG. 13 shows an exemplary compose window.
Figure 13B:
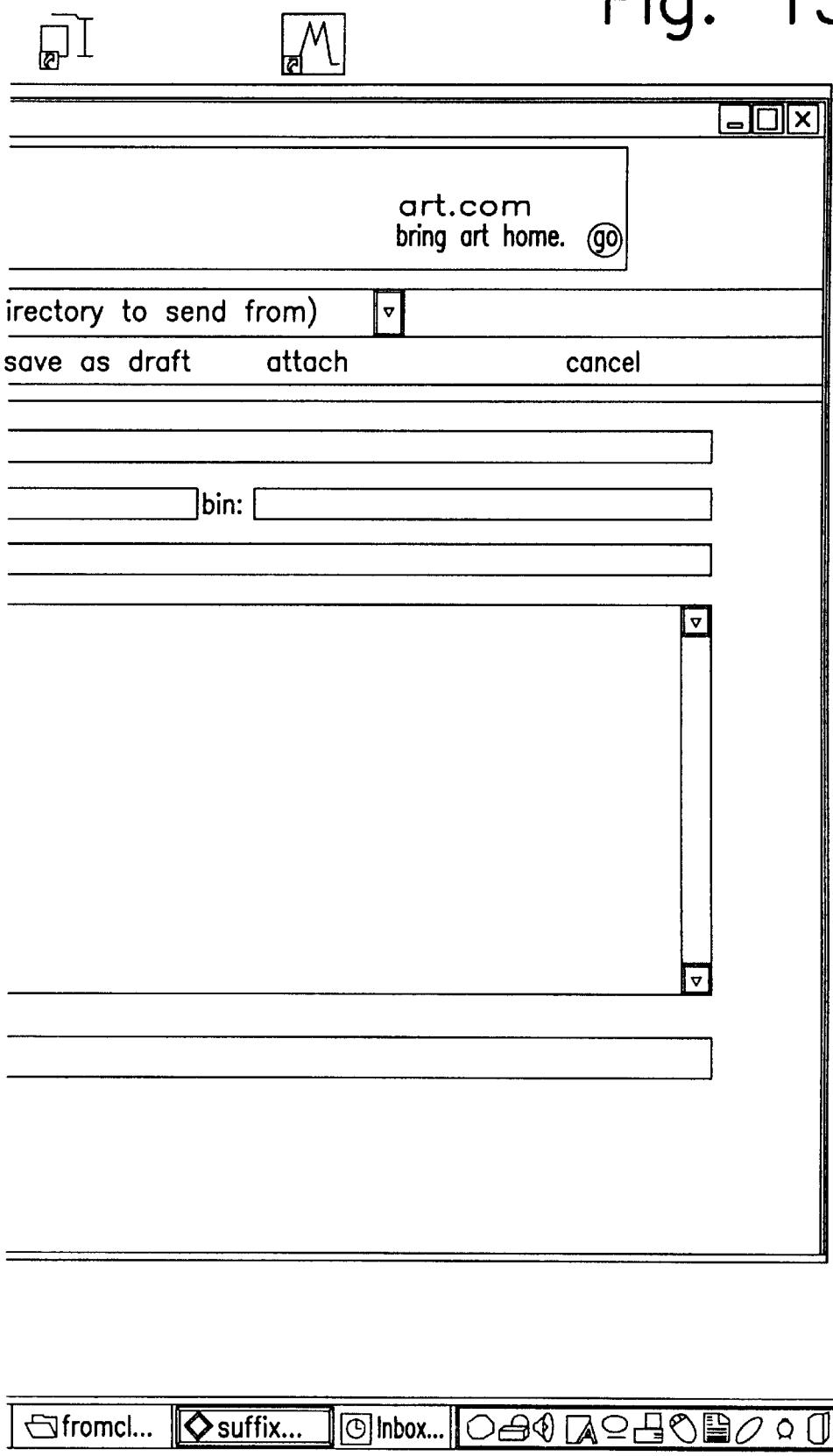

When a user wishes to create an e-mail message, the user selects the "compose" button 100 from the masthead window 20, and the system opens a compose window in the body window 10 of the interface as shown in FIG. 13. The first action masthead 600 in the display of FIG. 13 includes a "compose" title to indicate to the user that the body window 10 is a compose window.

The compose window includes a "to" button and text box, a "cc" button and text box, a "bcc" button and text box, and a "subject" text box, and an e-mail message text box, which each function in a conventional manner. As one of ordinary skill in the art will appreciate, e-mail addresses can either be directly typed into the "to", "cc", and "bcc" text boxes, or the corresponding "to", "cc", and "bcc" buttons can be selected to provide the user with a list of possible addresses from the address book. As this functionality is common to most commercial e-mail applications, including, for example, Microsoft Hotmail, Microsoft Outlook, AOL, and the like, it will not be discussed in detail herein. The compose window also includes a signature check box which, when selected, causes the signature specified for the root/username or suffix account from which the e-mail is to be sent to be included with the message. If no signature has been specified for the account, then the check box is disabled.

The first action masthead 600 of FIG. 13 includes a "send" button, an "attach" button, a "cancel" button, a "save as draft" button, and a "select the directory to send from" drop down box. The "send" button, when selected, causes the system to send the message specified in the compose window to the recipients designated in the compose window. The "attach" button, when selected, allows the user to select a file to attach to the e-mail message. The "select the directory to send from" drop down box allows the user to select the address (e.g., root/username or suffix) to send the message from. The "save as draft" button, when selected, causes the causes the system to save the message specified in the compose window in the draft sub-directory of the directory specified in the "select the directory to send from" drop down box. If the user has not specified what directory the e-mail is being sent from, the page will refresh with a warning telling them that they must specify a directory. The "cancel" button, when selected, refreshes window with a new blank e-mail.

Figure 14A:
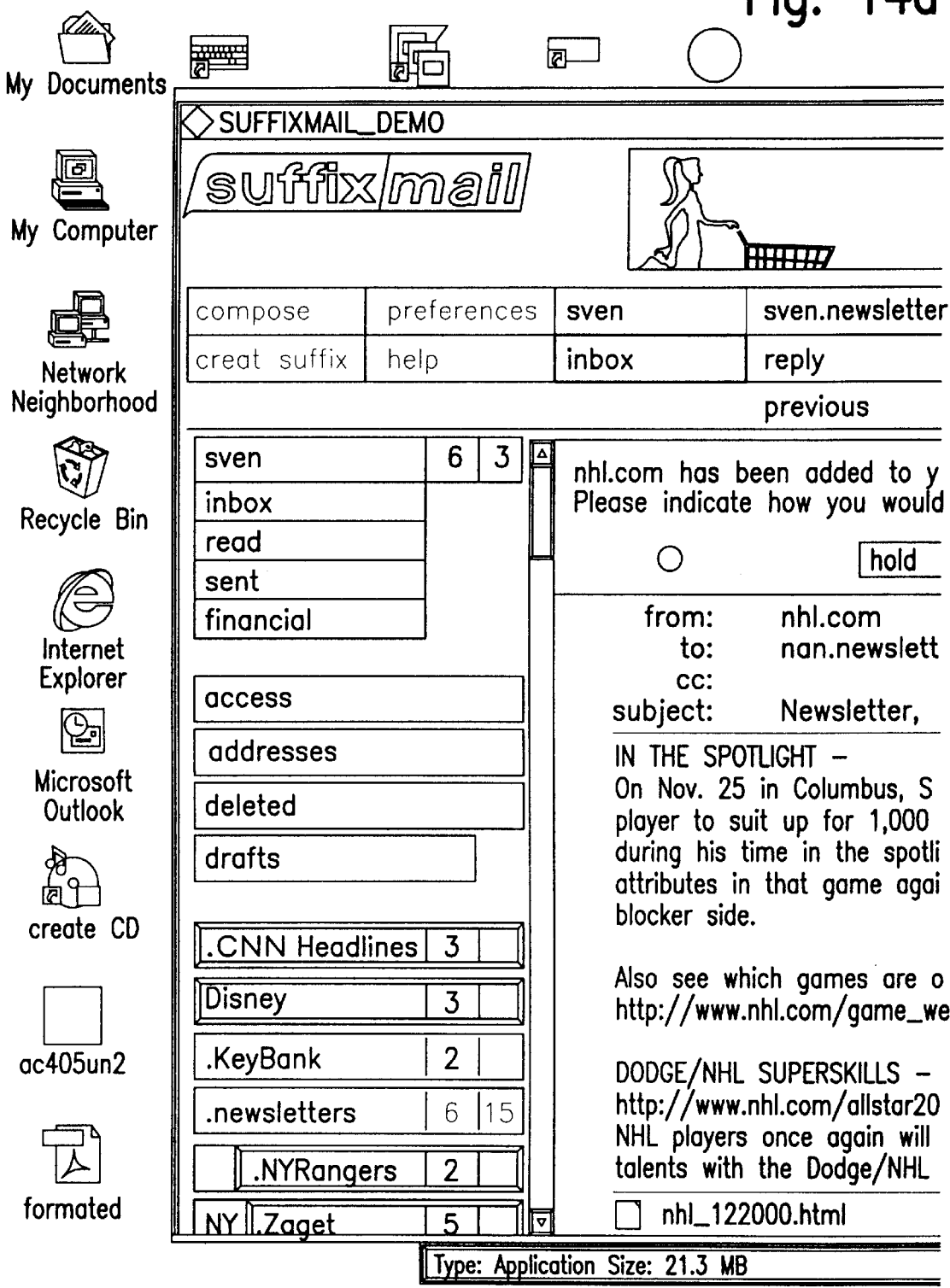
FIG. 14 shows an illustrative display of the interface after a user has selected an e-mail message from the accepted section of an inbox.
Figure 14B:
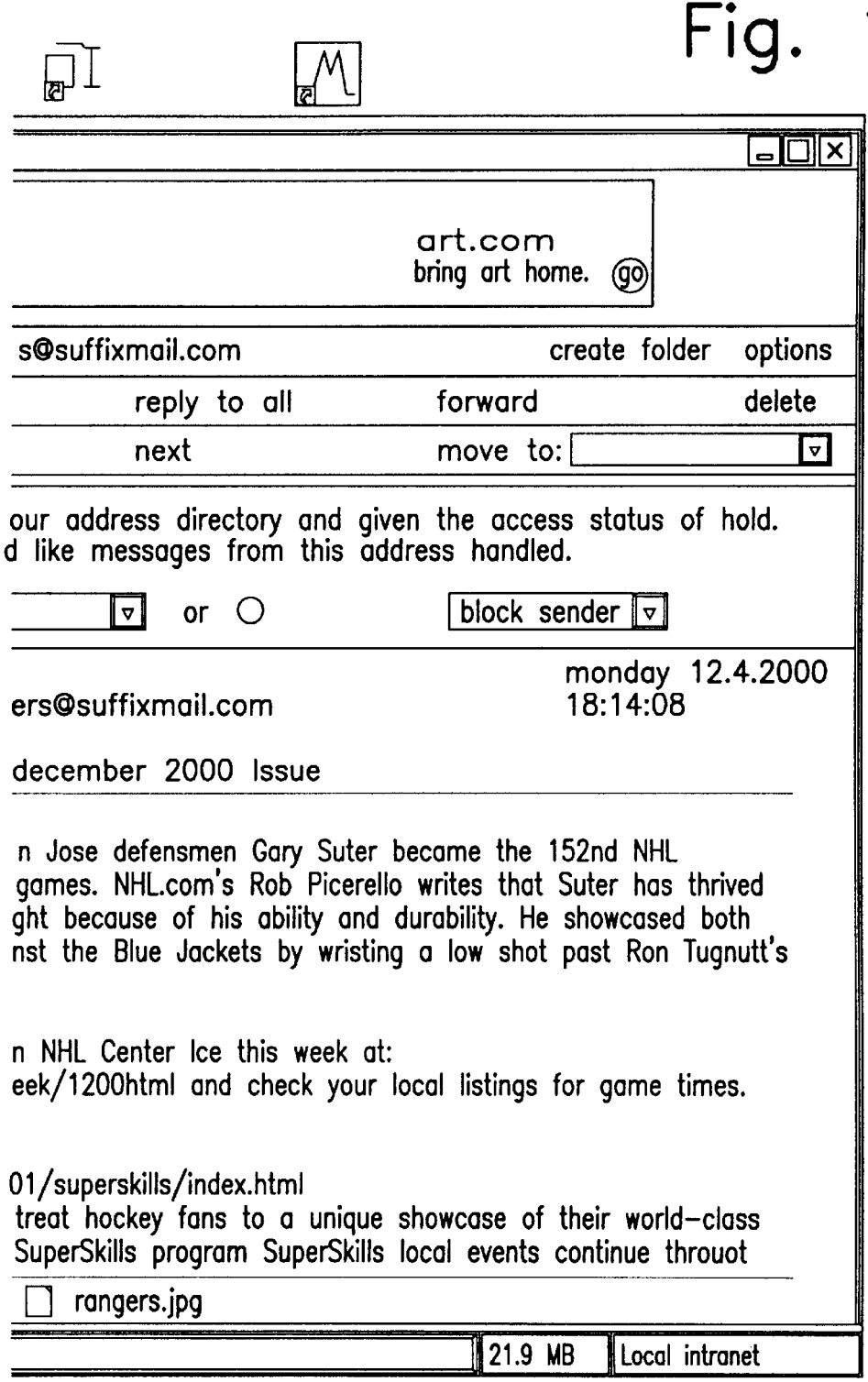
Figure 15A:
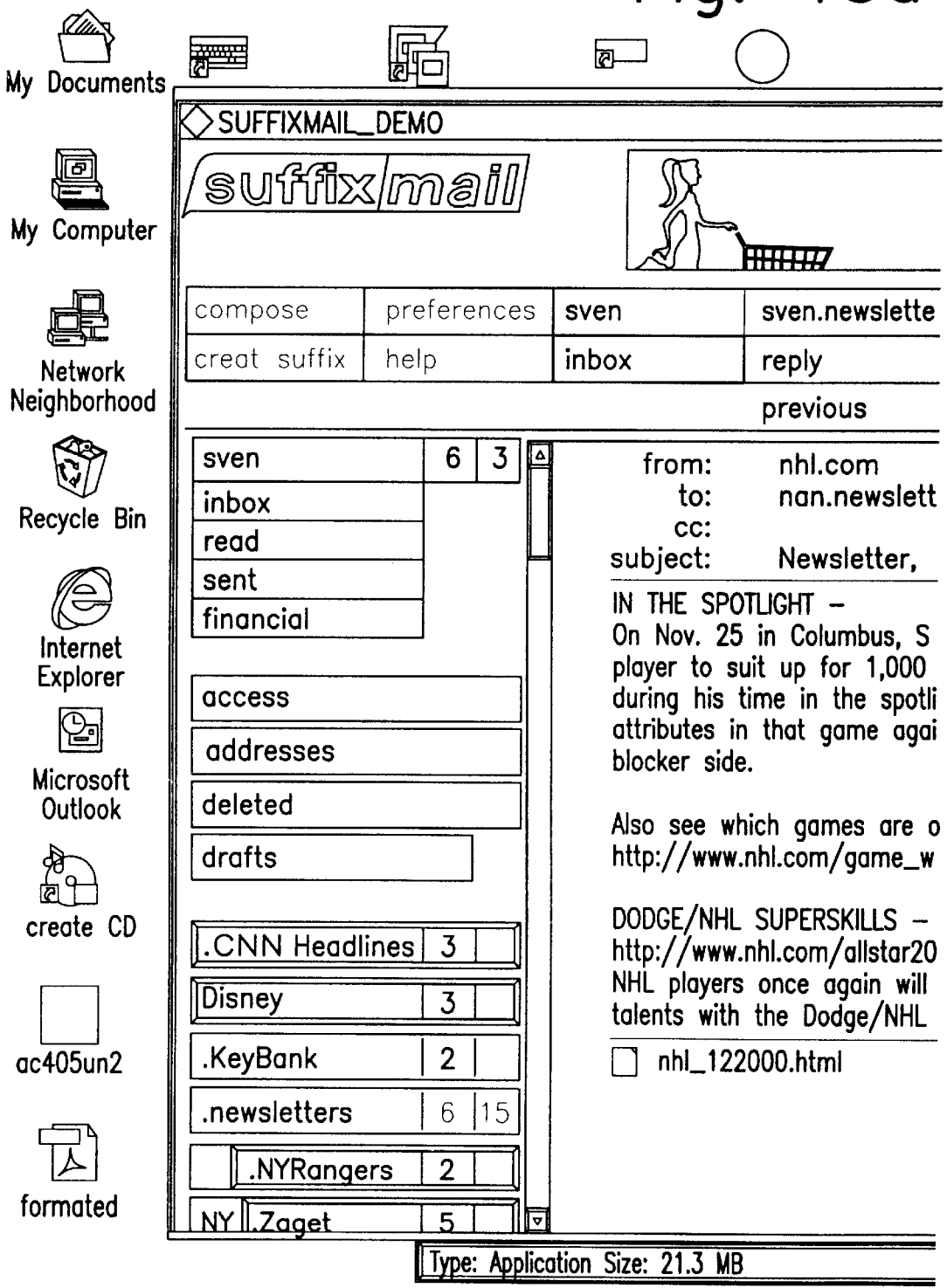
FIG. 15 shows an illustrative display of the interface after a user has selected an e-mail message from the hold/new sender section of an inbox.
Figure 15B:
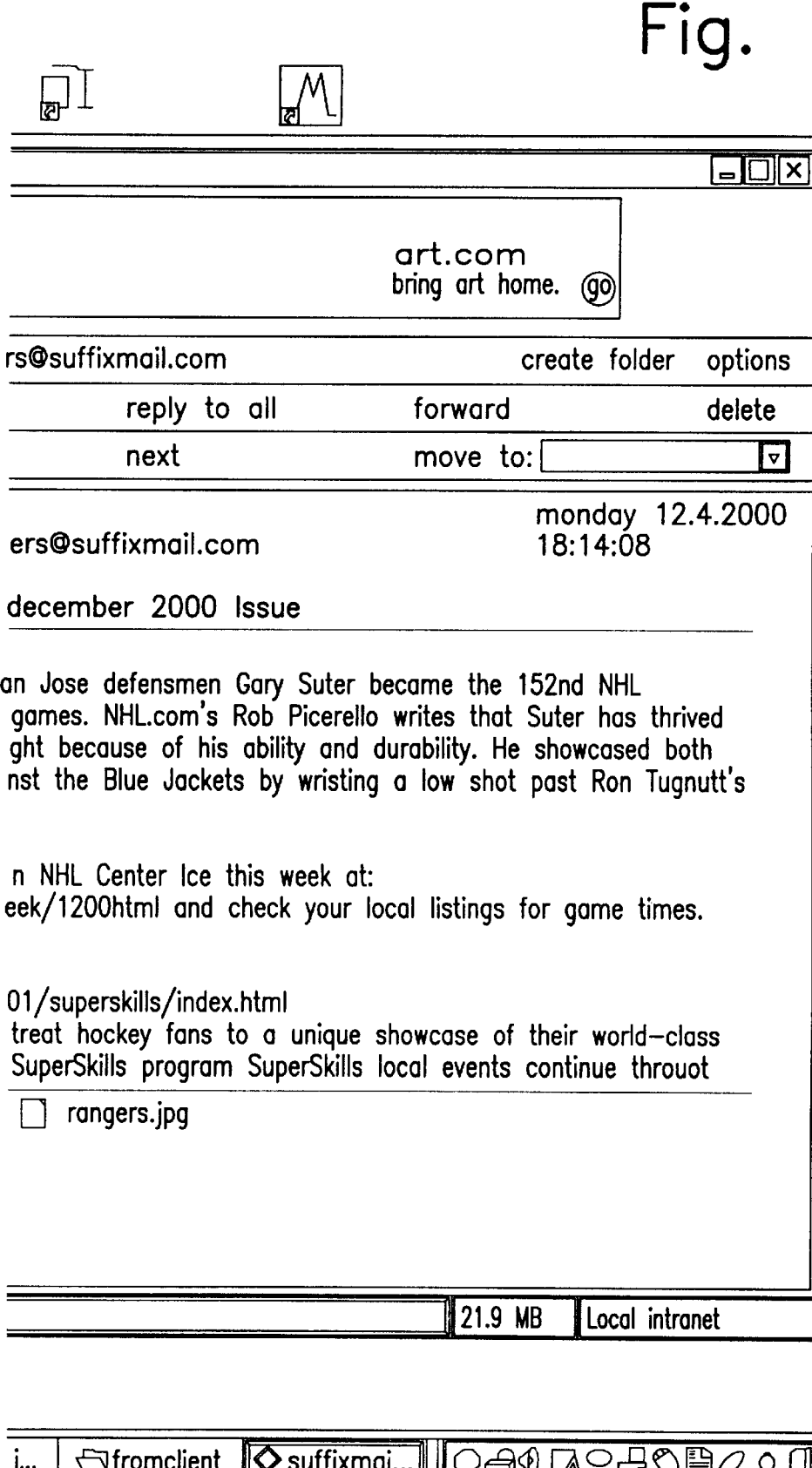

FIG. 14 shows an illustrative display of the interface after a user has selected an e-mail message from the accepted section of an inbox by "clicking" on the mail icon or subject field of an e-mail, and FIG. 15 shows an illustrative display of the interface after a user has selected an e-mail message from the hold/new sender section of an inbox by "clicking" on the mail icon or subject field of an e-mail.

The first action masthead 600 is the same for both FIGS. 14 and 15. Beneath the sub-directory title ("inbox") are an e-mail icon and an attachment icon. The e-mail icon is preferably color coded to indicate whether the e-mail has been accepted or not. The attachment icon indicates whether the e-mail has an attachment. A "reply" button, when selected, opens a compose window (FIG. 13) with the senders address in the "To" field. A "reply all" button, when selected, opens a compose window with the senders address in the "To" field and the "CC" addresses in the new compose windows "CC" field. In both cases, the text of the e-mail along with the header information is placed in the e-mail message text box. A "forward" button, when selected, opens a compose window with the body of the e-mail placed in the e-mail message text box. A "delete" button, when selected, moves the e-mail to the "delete" folder, a "previous e-mail" button, when selected, opens the previous e-mail in the inbox, and a "next e-mail" button, when selected, opens the next e-mail in the inbox. A "move to" drop down box allows the user to select a directory or subdirectory into which the e-mail message is to be moved. The "create folder" and "options" buttons function in the manner described above.

FIG. 14 also includes an Access Control Bar in the body window 10 in order to allow the user to modify the access status of the displayed e-mail message. If the user does not modify the access status of the sender of the e-mail, the e-mail will appear in the "Hold/New Sender" section of the Inbox with the "read hold icon" next to it. As described above, the access status of a sender can be designated on a universal basis (which applies the access status to the root/username directory and all suffix directories) or on a directory specific basis. Referring to FIG. 14, the access control bar includes a directory specific radio button and drop down box ("for newsletters") and a universal radio button and drop down box ("universally").

When the directory specific radio button is selected, the corresponding drop down box includes three options: accept, hold, and reject. If the accept option is selected, the status of the sender will be changed to "accepted" for the current directory, and the sender will appear as "accepted" in the access screen of FIG. 4 for the current directory. If the hold option is selected, the status of the sender will be designated as "hold" for the current directory, and the sender will appear as "hold" in the access screen of FIG. 4 for the current directory. If the reject option is selected, then the status of the sender will be designated as "reject" for the current directory, and the sender will appear as "reject" in the access screen of FIG. 4 for the current directory.

When the universal radio button is selected, the corresponding drop down box includes two options: "block sender" and "block domain". If the "block sender" option is selected, all subsequent e-mails from this address will be blocked and the sender will be added to the Blocked Senders Directory. The user will be prompted to choose one of the following options: 1) delete all existing e-mails from the sender from system; 2) move all existing e-mails from the sender to the "deleted" directory. If the "block domain" option is selected, all subsequent e-mails from these domains will be blocked. The addresses and the domain are added to the blocked domains directory. If there are any more messages received from addresses with same domain, they will also be added to the blocked domains directory. The user will be prompted to choose one of the following options: 1) delete all existing e-mails from addresses corresponding to the domain from the system; and 2) move all existing e-mails from addresses corresponding to the domain to the "deleted" directory.

Figure 16A:
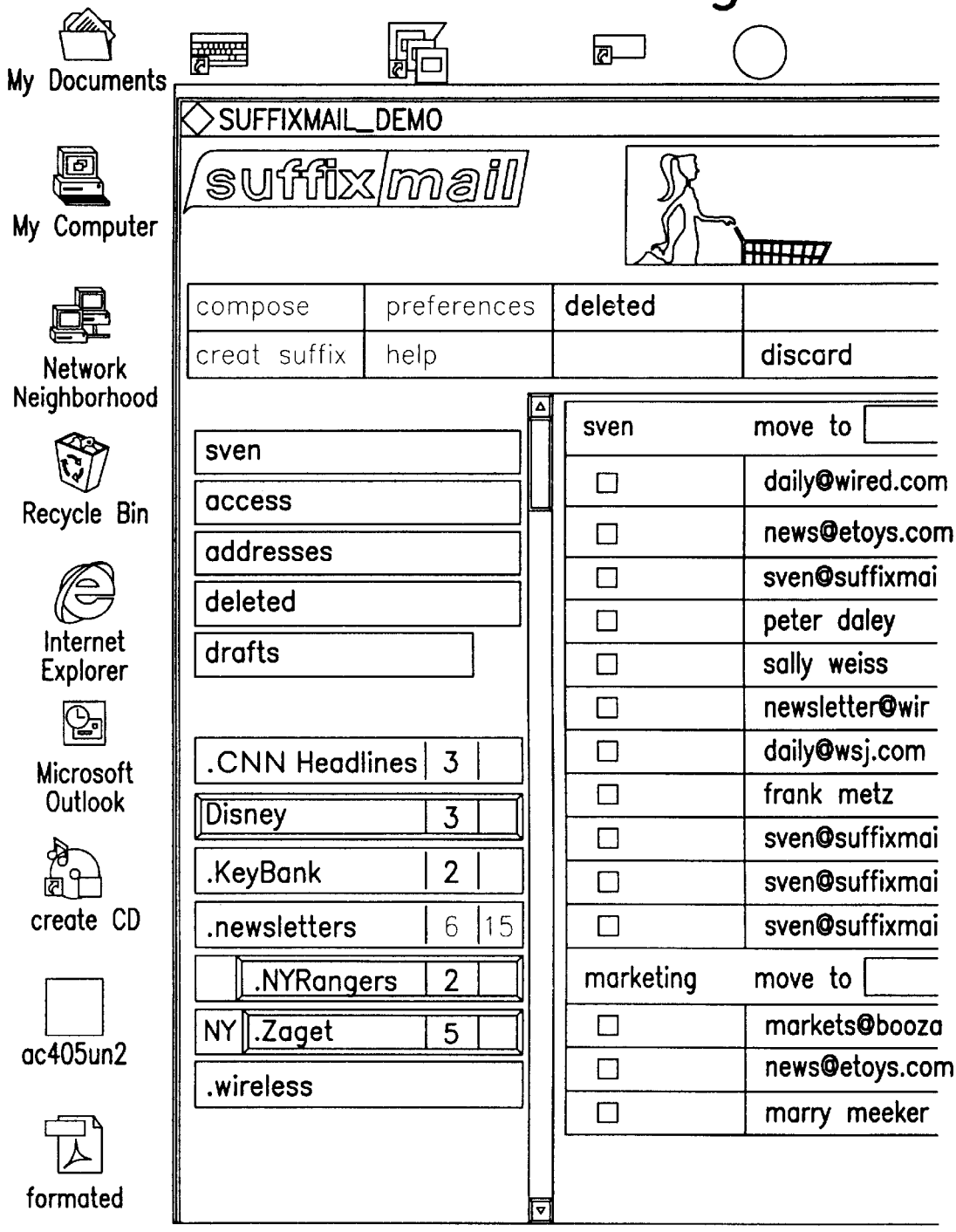
FIG. 16 illustrates the user interface with the "deleted" directory button in the directory window selected.
Figure 16B:
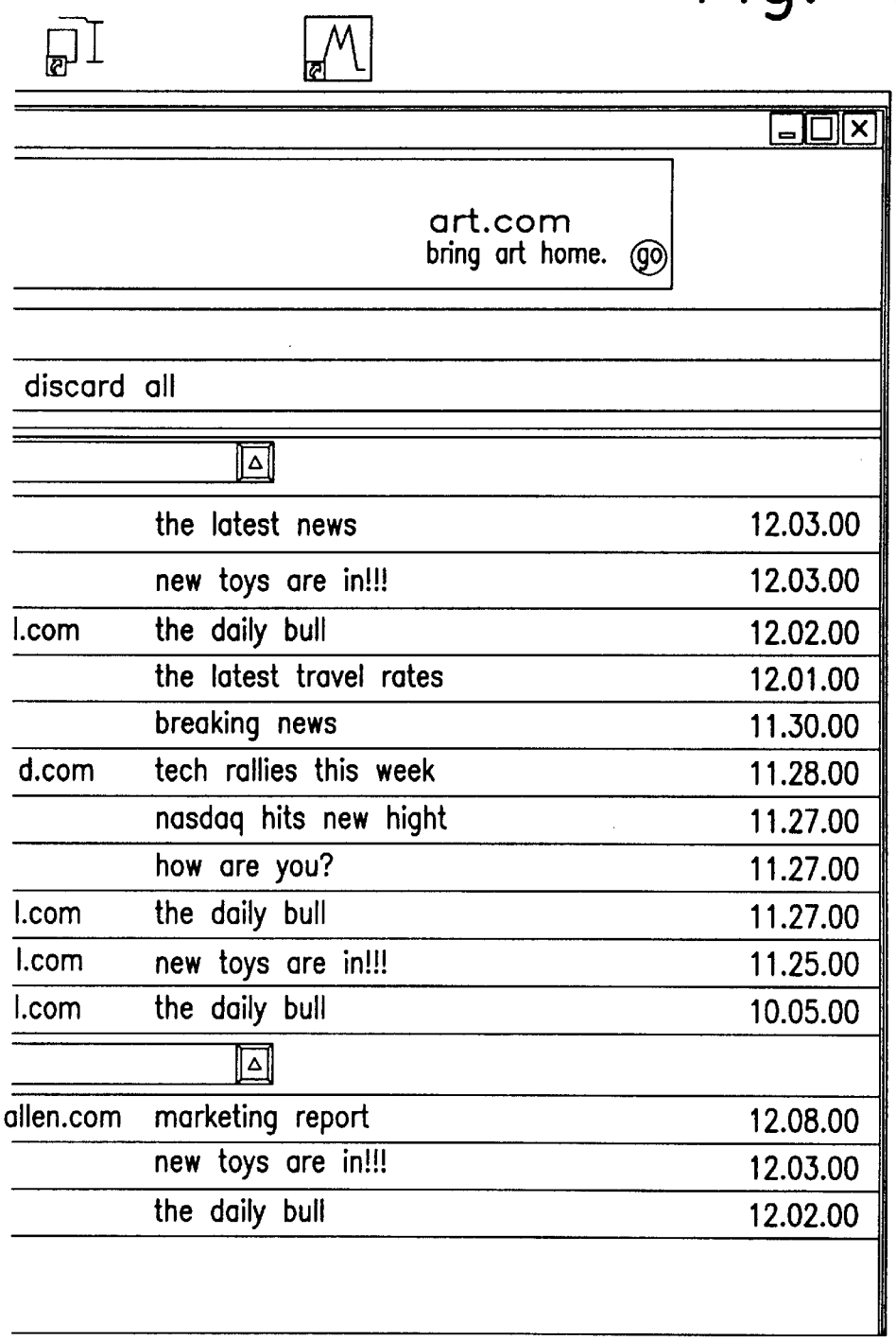

FIG. 16 illustrates the user interface with the "deleted" directory button in the directory window 30 selected. The body window of FIG. 16 includes a respective section for the root/username directory and for each suffix directory for which there are deleted e-mails. A select box is provided for each e-mail message displayed. In addition, each section includes a move to drop down box for identifying a directory or sub-directory into which the selected e-mail(s) are to be moved. Preferably, the "move to" drop down box only allows an e-mail to be moved to an appropriate sub-directory (e.g., received e-mails cannot be moved into the sent directory, and sent e-mails cannot be moved to the inbox). In certain embodiments, the mail icons in FIG. 16 can include attributes (e.g., color, blinking, spinning) which indicates whether the deleted e-mail is to or from a sender who has accepted, rejected, or hold/new sender status. The first action masthead 600 of FIG. 16 includes a "discard" button which, when selected, causes any selected e-mails in the deleted directory to be permanently deleted from the e-mail system and a "discard all" button which, when selected, causes all of the e-mails in the deleted directory to be permanently deleted from the e-mail system.

Figure 17A:
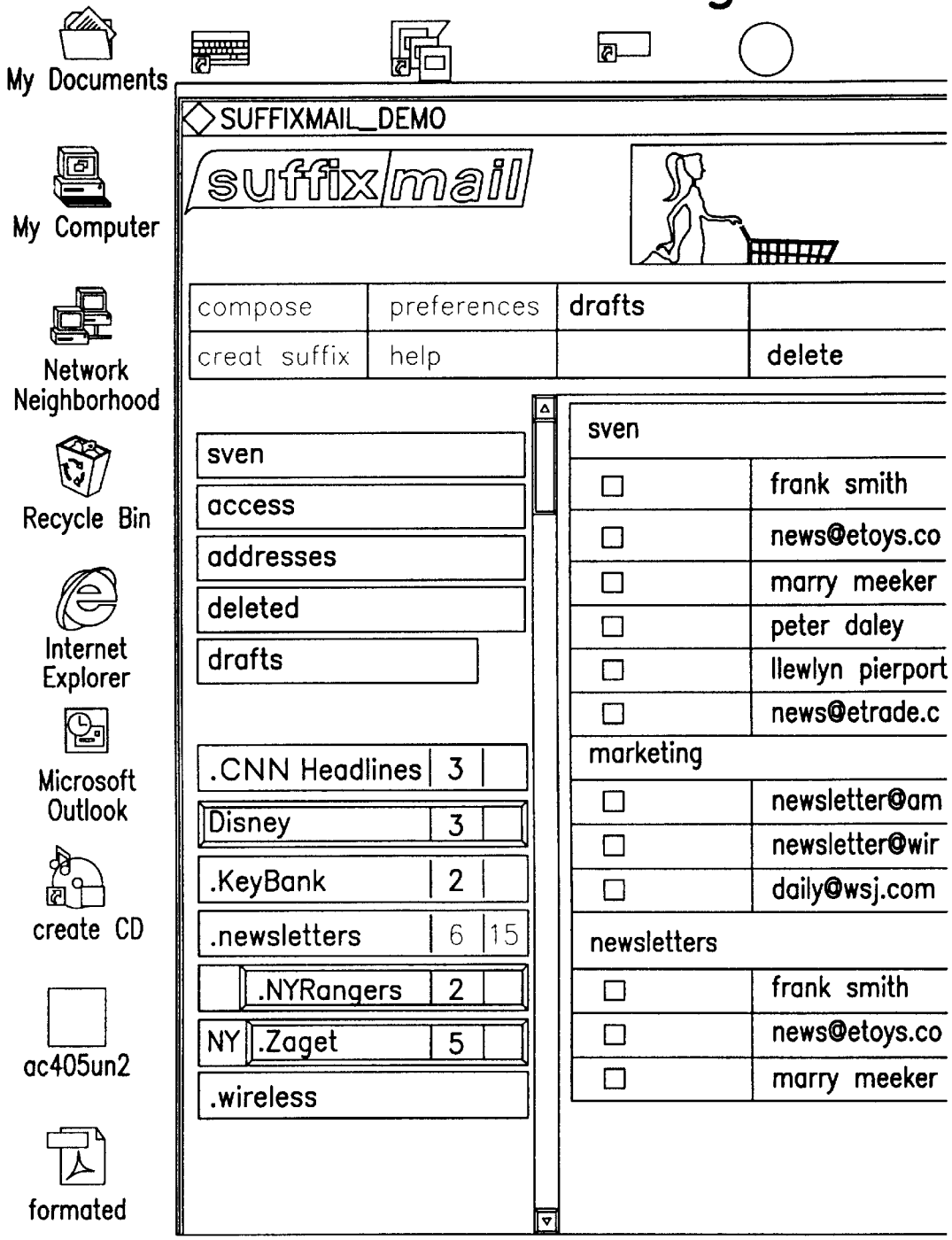
FIG. 17 illustrates the user interface with the "deleted" directory button in the directory window selected.
Figure 17B:
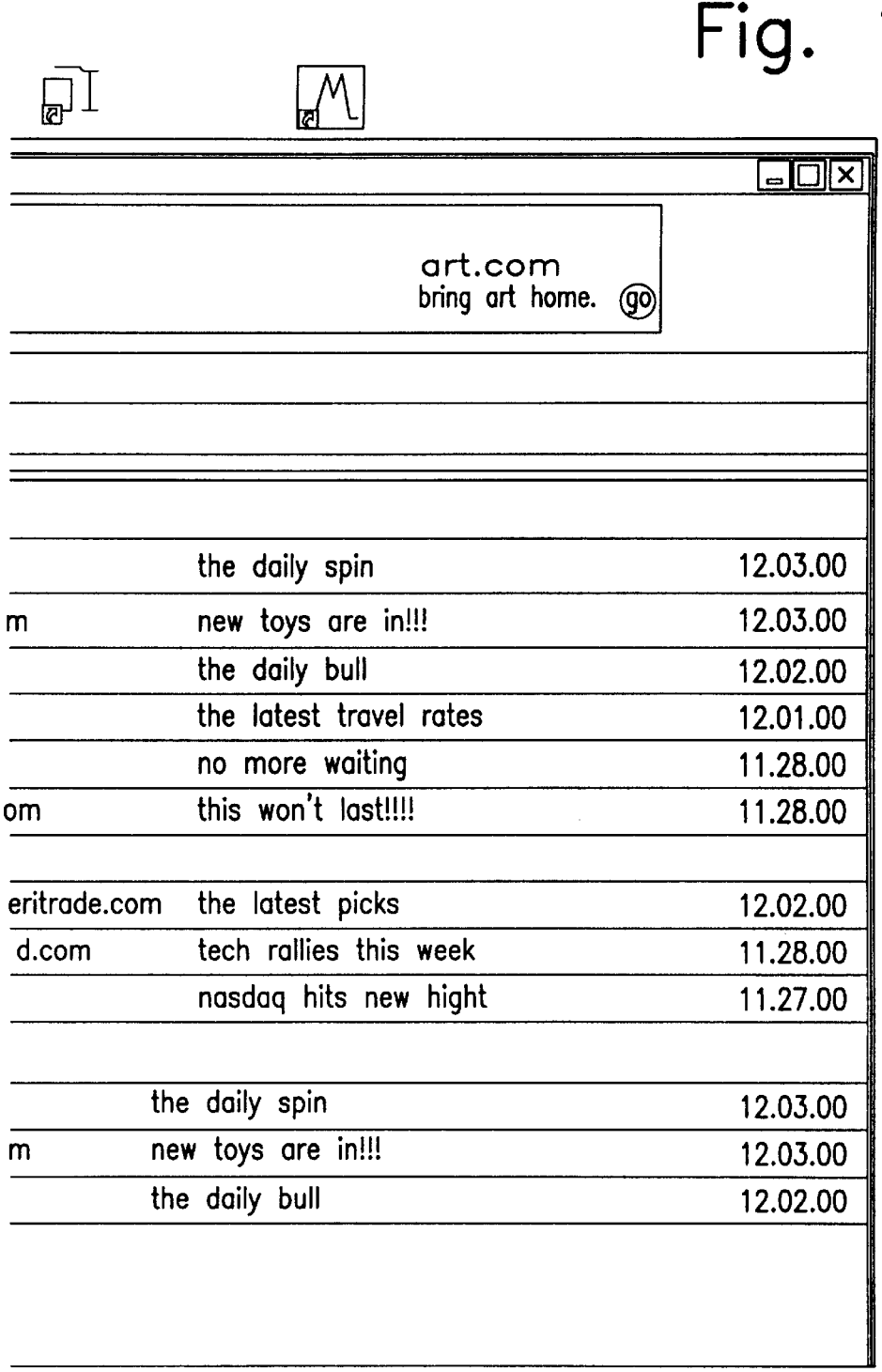

FIG. 17 illustrates the user interface with the "deleted" directory button in the directory window 30 selected. The body window of FIG. 17 includes a respective section for the root/username directory and for each suffix directory for which there are draft e-mails. A select box is provided for each e-mail message displayed. The first action masthead 600 of FIG. 17 includes a "delete" button which, when selected, causes any selected e-mails in the "draft" directory to be moved to the "deleted" directory. To send a message from the "draft" directory, the user selects the e-mail message by "clicking" on the mail icon or subject field of the e-mail, thereby causing the compose window of FIG. 13 to open with the current contents of the selected e-mail message including, for example, the "to", "cc", and "bcc" text boxes, the "subject" text box, and the e-mail message text box.

As mentioned above, the system maintains an address book (e.g., database) that allows the user to add/edit/delete contact information. The address book has two modes: edit mode and active mode. The edit mode is used to add/edit/delete contact information, whereas the active mode is used to address the e-mails to the contacts existing in the address book. The edit mode is accessed through the addresses button in the directory window (See FIG. 4), whereas the active mode is accessed via the "To", "CC", and "Bcc" buttons described above. By selecting a particular entry in the display of FIG. 4, full details for the entry can be viewed and edited, including, for example, name, address, telephone numbers, e-mail address, web page address, etc. As the address book can be implemented in any conventional manner, it will not be discussed in detail herein.

The access book which is accessible via the access directory in the directory window 30 will now be described in further detail. Referring again to FIG. 4, the access directory is divided into four sub-directories which provide four corresponding functions: Index, Blocked Senders, Blocked Domains and Block History.

Any new senders for any directory (either root directory or suffix directory) that is not declared to be private are given a default status of "hold" and are added to the address book and the access book. If the directory is declared to be private, all new senders are given "rejected" status.

FIG. 4 illustrates the "Index" sub-directory of the access directory. The first action masthead 600 of FIG. 4 displays the current directory ("access") and the current sub-directory ("index"). Since the access status of a sender can be configured on a per directory basis, the first action masthead includes a directory drop down menu which allows the user to select a root/username or suffix account (and corresponding directory) to view. In FIG. 4, the root/username account "sven" is selected, and the body window 10 displays the access status of senders for the sven@suffixmail.com. In any event, the list of senders for the selected account are sorted by their access status: Accepted, Hold, and Rejected. The access status of any sender can be modified by selecting the check box corresponding to the sender in the body window, and selecting the appropriate access status (e.g., accepted, hold, rejected, block sender, block domain) from the "change access" drop down box.

Specifically, if "accepted" is selected, the screen is refreshed and the selected contacts are placed in the "accepted" section of the directory identified in the directory drop down box. Subsequent e-mails received from the selected senders will also be placed in the "accepted" section of the Inbox of the directory. If "hold" is selected, the screen is refreshed and the selected contacts are placed in the "hold" section of the directory identified in the directory drop down box. Subsequent e-mails received from the selected senders will similarly be placed in the "hold" section of the Inbox of the directory. If "rejected" is selected, the screen is refreshed and the selected contacts are placed in the "rejected" section of the directory identified in the directory drop down box. Subsequent e-mails received from the selected senders will similarly be placed in the "rejected" section of the Inbox of the directory.

If "block sender" is selected, the page is refreshed and the selected senders are removed from the access index window. All subsequent e-mails from this address will be blocked and the sender is added to the "blocked senders" sub-directory. After making this selection, the user will be prompted to choose one of the following options: 1) delete all existing e-mails from the sender from the system; or 2) move all existing e-mails from the sender to the deleted directory.

If block domain is selected, the page is refreshed and the selected senders are eliminated from the access "index" sub-directory. All subsequent e-mails from e-mail addresses having these domains will be blocked. The addresses and domains will be added to the "blocked domains" sub-directory. If there are any future senders with same domain, they will also added to the "blocked domains" sub-directory. After making this selection, the user will be prompted to choose one of the following options: 1) delete all existing e-mails from the domain from the system; or 2) move all existing e-mails from the domain to the deleted directory.

The first action masthead also includes a "search" text box. By entering a name or e-mail address into the text box, the user can search the access book for senders with the name or e-mail address. Any matching senders will be displayed in the body window 10.

Figure 18A:
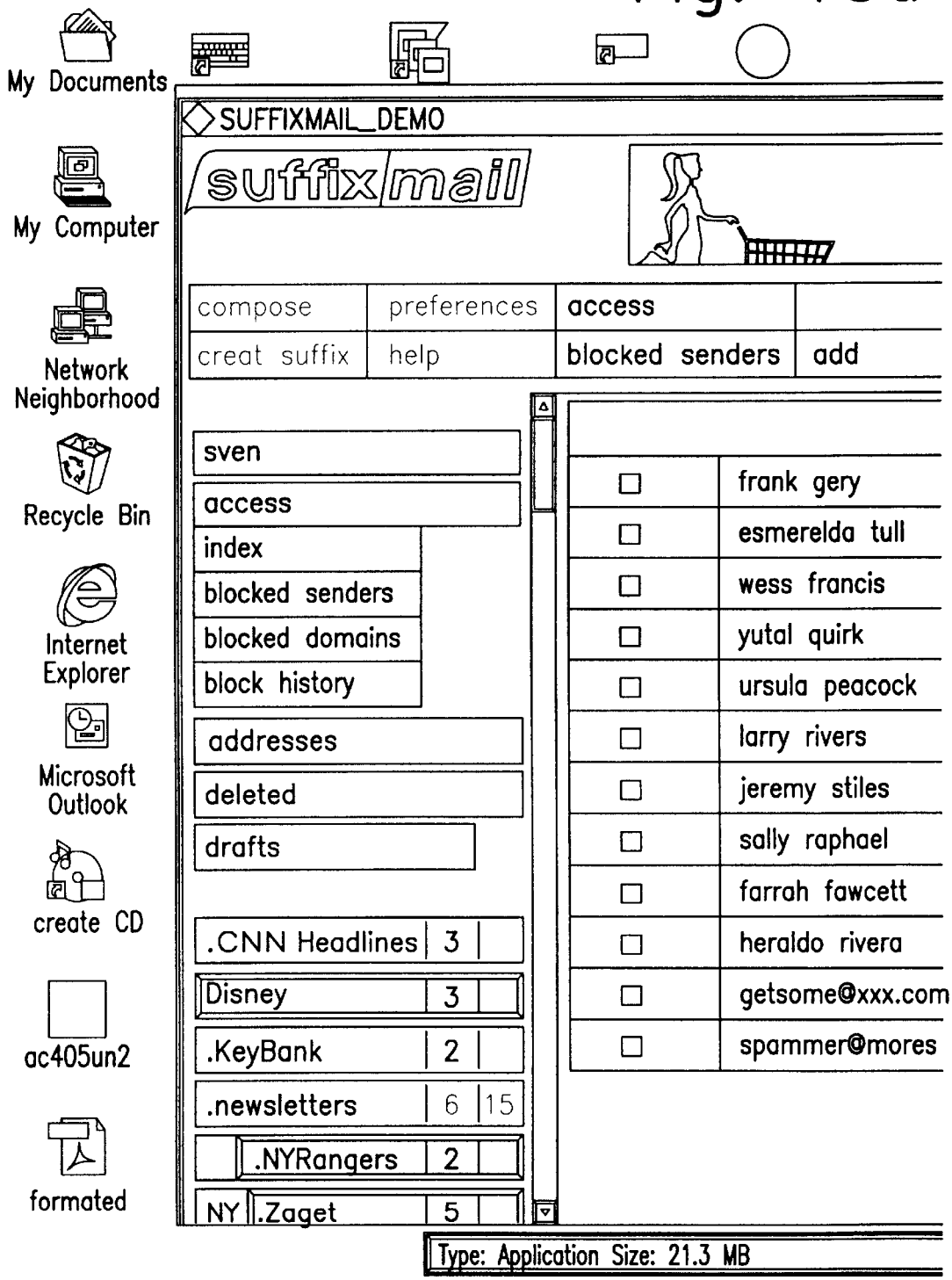
FIG. 18 illustrates the "blocked senders" sub-directory of the access directory.
Figure 18B:
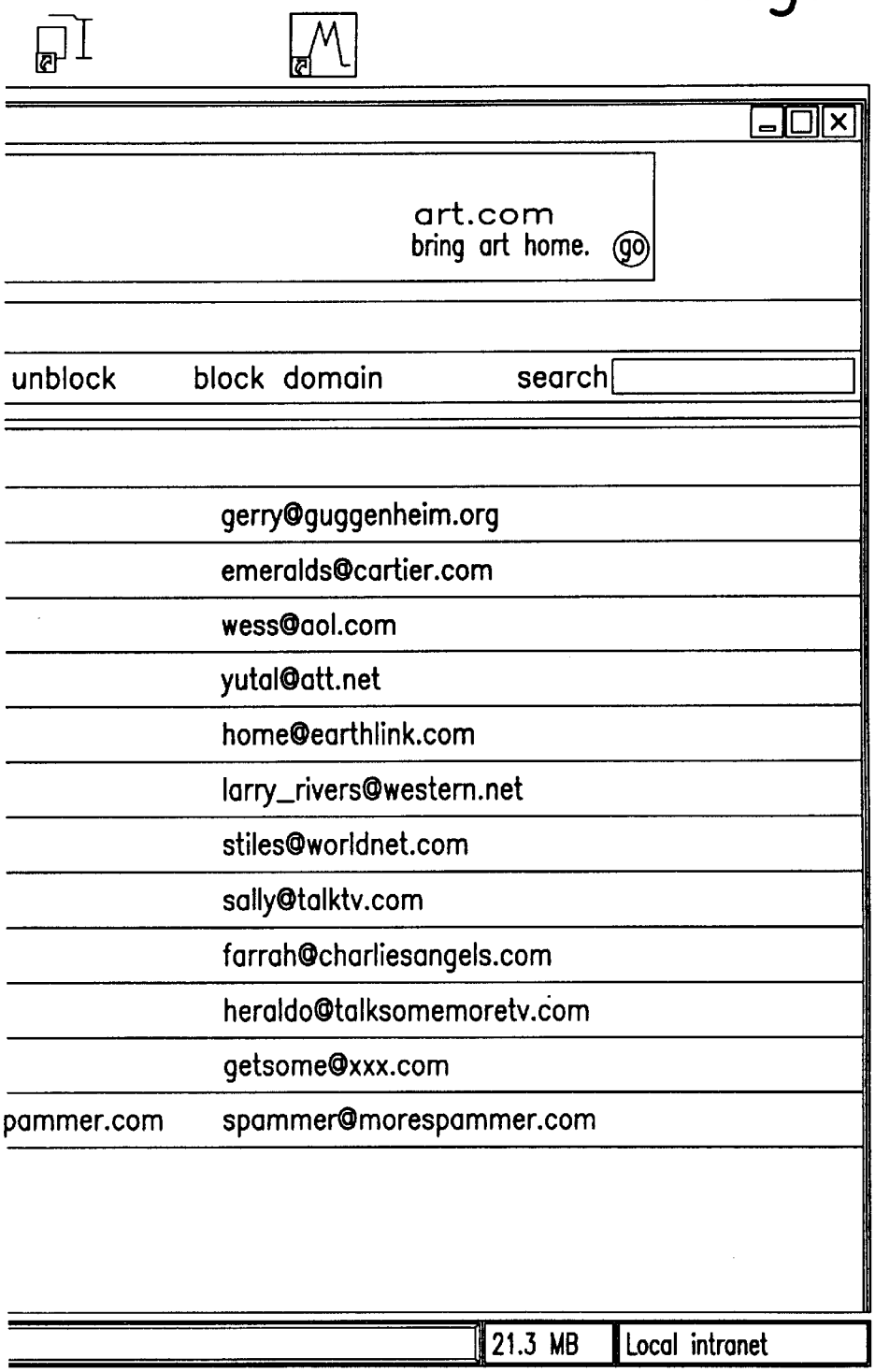

FIG. 18 illustrates the "blocked senders" sub-directory of the access directory. The first action masthead 600 of FIG. 18 displays the current directory ("access") and the current sub-directory ("block sender"). It also includes an "add" button, an "unblock" button, a "block domain" button, and a "search" text box. The "search" text box functions in the same manner as described above with regard to FIG. 4, except that it searches in the "blocked senders" sub-directory. The body window displays a list of blocked sender names and e-mail addresses, along with corresponding check boxes for selecting the listed senders.

Upon selecting the "add" button, a contact list window is displayed that containing all the senders in the Address Book. A select check box is provided for each sender, and a "block" button is also displayed. Only those contacts who have not been blocked are displayed. If the "block" button is selected, the selected senders are moved to blocked senders body window (FIG. 18), and the user is prompted to choose one of the following options: 1) delete all existing e-mails from the selected senders from the e-mail system; or 2).move all existing e-mails from the selected senders to the "deleted" directory.

Upon selecting the "unblock" button, the page is refreshed and any selected senders are removed from the blocked senders body window and the status of the sender is changed to "Hold" in the root/username and suffix directories.

Figure 19A:
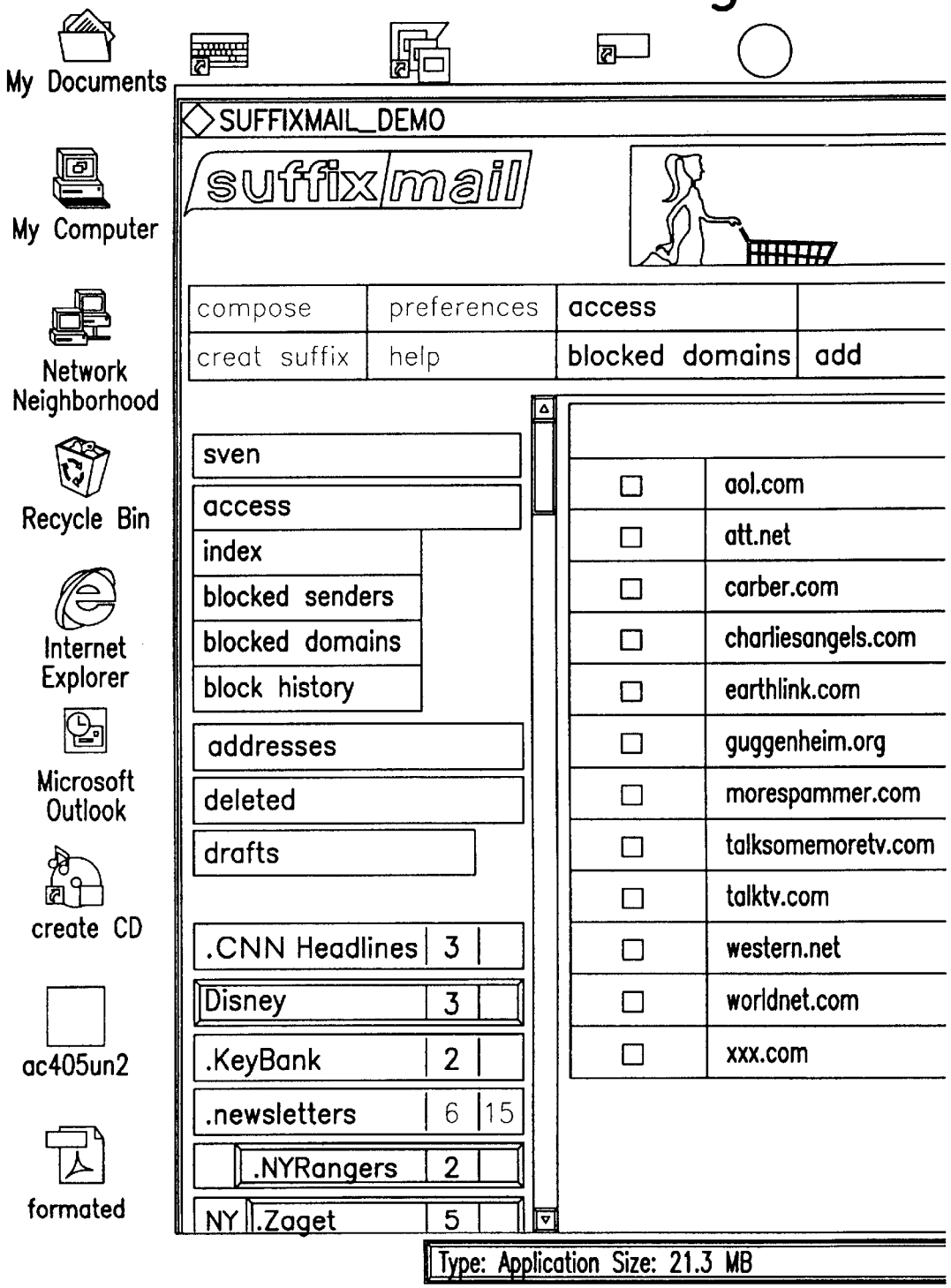
FIG. 19 illustrates the "blocked domains" sub-directory of the access directory.
Figure 19B:
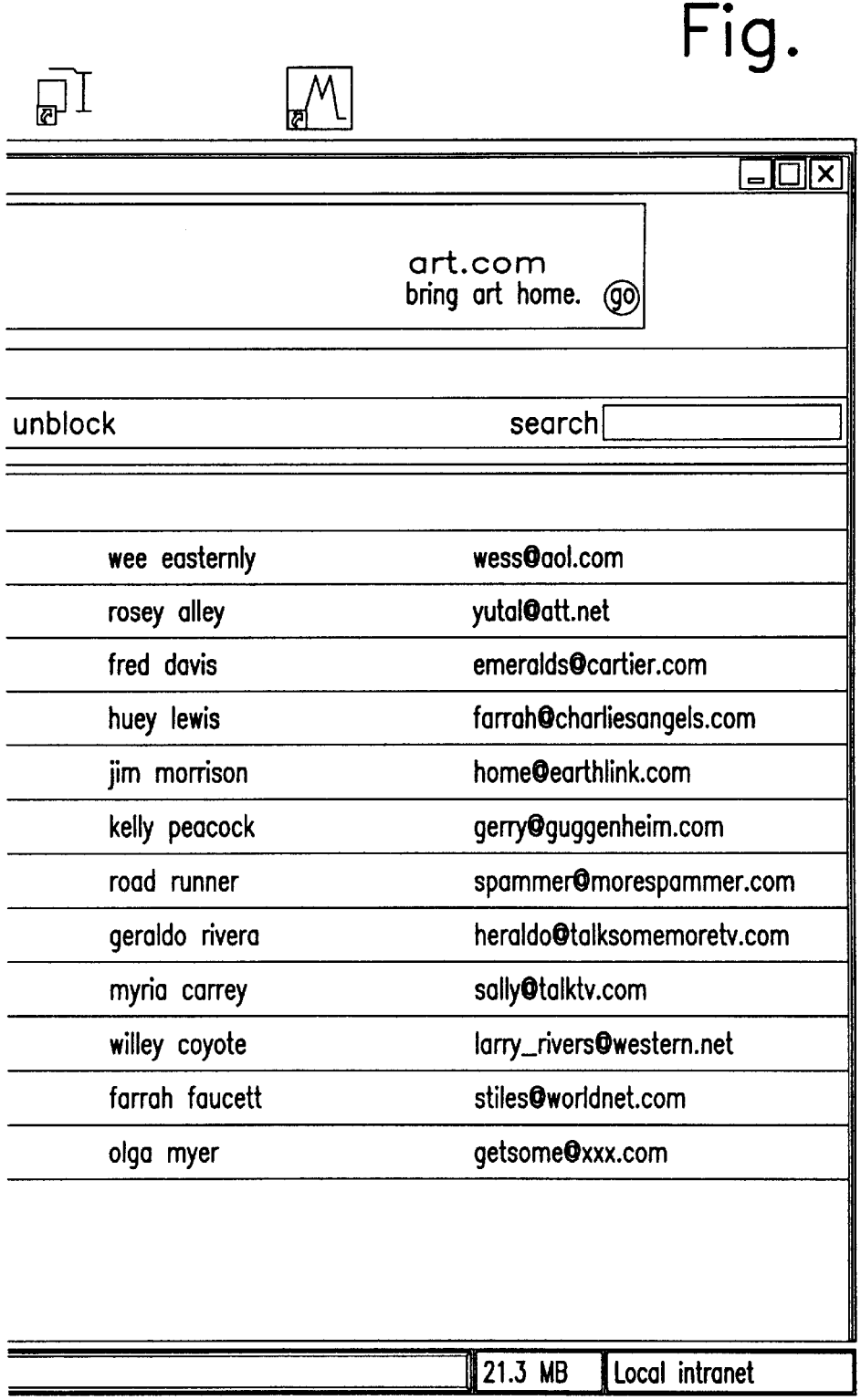

Upon selecting the "block domain" button, the page is refreshed, the selected senders are moved to, and displayed in, the blocked domains window of FIG. 19, the domain is blocked from the root/username and suffix directories, and the sender and domain are added to the "blocked domains" sub-directory. After making the selection, the user will be prompted to choose one of the following options: 1) delete all existing e-mails from the domain from the e-mail system; or 2) move all existing e-mails from the domain to the "deleted" directory.

FIG. 19 illustrates the "blocked domain" sub-directory of the "access" directory. This sub-directory may be entered by selecting the "blocked domain" button on the directory window, or via the "block domain" button on the first action masthead 600 of FIG. 18. The first action masthead 600 of FIG. 19 displays the current directory ("access") and the current sub-directory ("block domain"). It also includes an "add" button, an "unblock" button, a "block domain" button, and a "search" text box. The "search" text box functions in the same manner as described above with regard to FIG. 4, except that it searches in the "blocked domain" subdirectory; the "add" button functions in the same manner as described above with regard to FIG. 18, except that the domains of the added senders are blocked; and the "unblock" button functions in the same manner as described above with regard to FIG. 18, except that domains are unblocked. The body window displays a list of blocked domain names and e-mail addresses, along with corresponding check boxes for selecting the listed senders.

Figure 20A:
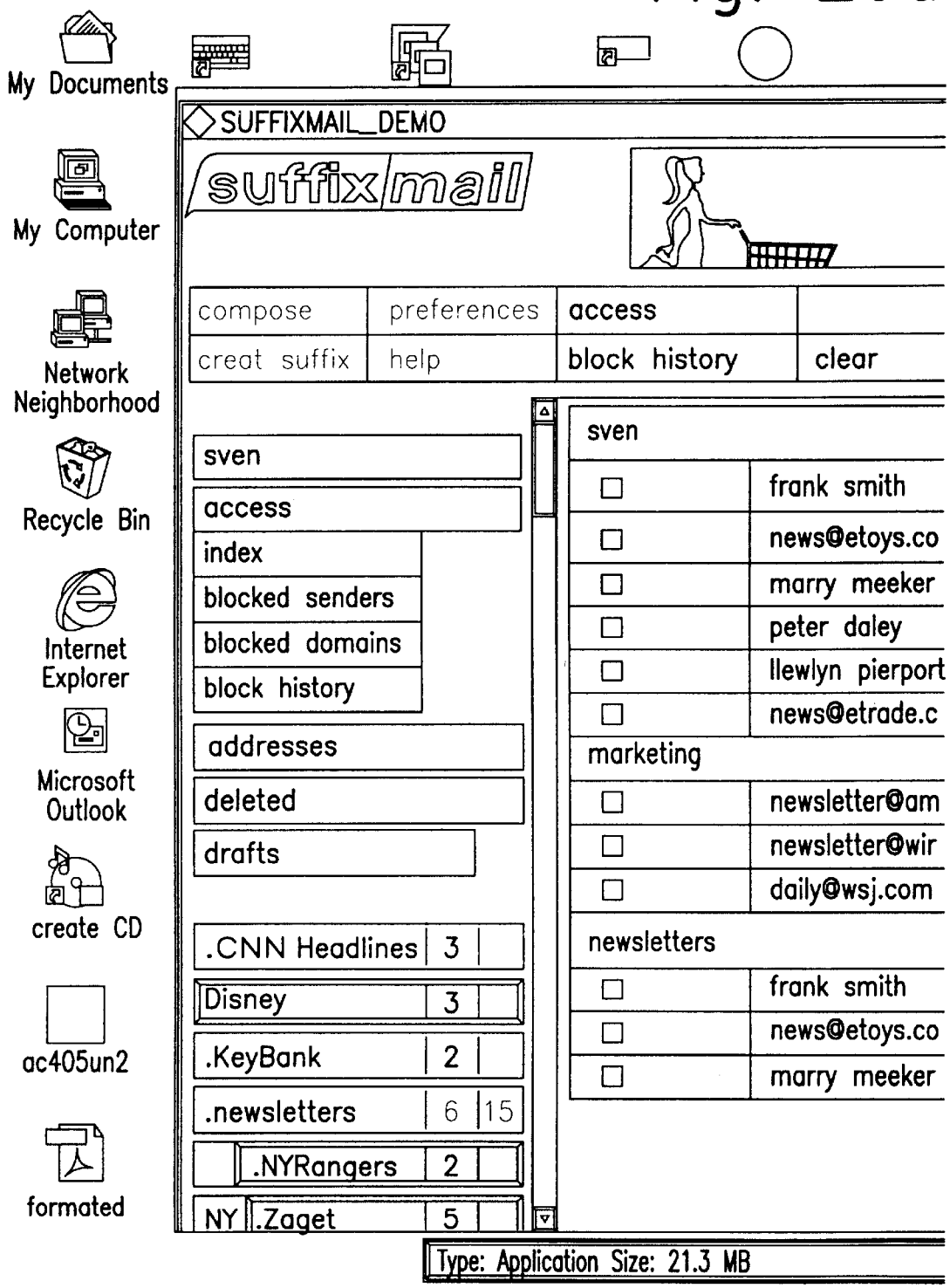
FIG. 20 illustrates the "block history" sub-directory of the access directory.
Figure 20B:
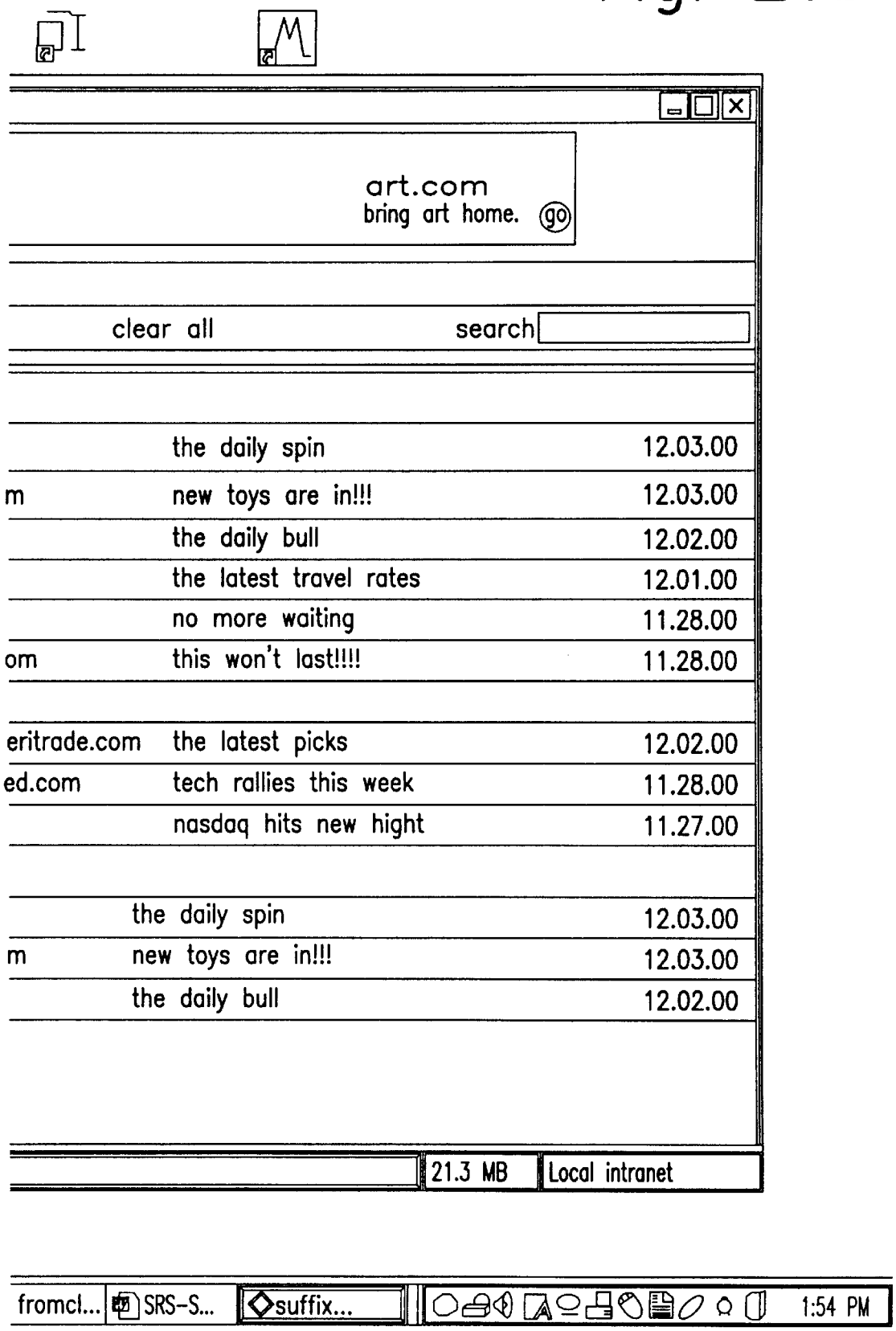

FIG. 20 illustrates the "block history" sub-directory of the access directory. The first action masthead 600 of FIG. 20 displays the current directory ("access") and the current sub-directory ("block history"). The body window displays a list of blocked senders (with their names and e-mail addresses), along with corresponding check boxes for selecting the listed senders. The body window 20 includes a respective section for the root/username directory and for each suffix directory for which there are blocked senders. Each section includes a display bar indicating the corresponding directory name for the section, the number of e-mails that have been recently blocked (i.e. in the current calendar month), and the total number of e-mails that have been blocked since the creation of the directory along with the date of creation. The body window 10 includes a "from" column, an e-mail "address" column, a "subject" column, and a sorted by icon, which have the same characteristics as described above with regard to the body windows of FIGS. 5, 7, 11, 12, 18, and 19. In addition, the body window includes a "date blocked" column that indicates date the e-mail was rejected by the system. This is a sortable column and each section is sorted separately.

In the system described above, an individual can freely create multiple, distinct, e-mail addresses, and manage them through a single user interface. Each suffix e-mail address can be viewed as having a hierarchal relationship to the root e-mail address, e.g., sven.newsletters@suffixmail is a child of the root sven@suffix mail. Moreover, the individual suffix e-mail addresses may also be in a hierarchal relationship to other suffix e-mail addresses through the use of subdirecories, e.g., sven.cnn.newsletters@suffixmail would be a child of sven.cnn@suffixmail if the "newsletters" directory was created as a sub-directory within "cnn."

The system described above may use a variety of methods to parse an incoming e-mail to determine which directory (and in the case of a networked e-mail system such as Microsoft Exchange Server, which user account) to route the e-mail to.

The most straightforward solution would be to parse the entire string prior to the "@" delimeter against each suffix mail account until a match is found. With this solution, the parser does not attempt to consider the relationship between different suffixes, and therefore, treats "sven.cnn.newsletters" as completely unrelated to both shirly@suffixmail and sven@suffixmail.

A preferred method of parsing incoming e-mail would be to parse the string prior to the "@" first by the username in order to identify the root account, and then by the remainder of the string to identify the directory to route the e-mail to. In the example above, the parser would first parse for the username "sven", and then attempt to match the remainder of the string to the child accounts of "sven", without searching "shirly" or its child accounts, and thereby reducing the processing time necessary for routing of the e-mail.

Further reductions in processing time can be achieved in embodiments wherein the hierarchal relationship between accounts is reflected in the order in which each name appears in the string preceding the "@" delimeter. Assume, for example, that the system is configured to place the root username at the beginning (e.g. leftmost position) of the string, with each successive suffix name to the right of the root username being a child of the suffix name immediately preceding it. In this example, sven.cnn.newsletters@suffixmail would indicate that cnn is subdirectory of sven and newsletters is a subdirectory of cnn, whereas sven.newsletters.cnn@suffixmail would indicate that newsletters is subdirectory of sven and cnn is a subdirectory of newsletters. In alternative embodiments, the order could naturally be reversed, e.g., cnn.newsletters.sven@suffixmail, with newsletters being subdirectory of sven and cnn being a subdirectory of newsletters.

In any event, in embodiments wherein the hierarchal relatioship between accounts is reflected in the order in which each name appears in the string preceding the "@" delimeter, the system can be configured to parse the string prior to the "@" first by the username in order to identify the root account, and then by each successive suffix name in the remainder of the string to identify the directory to route the e-mail to. For example, when parsing an e-mail addressed to sven.cnn.newsletters@suffixmail (and assuming that the system is configured to place the root username first), the parser would first parse sven, then parse for a subdirectory within "sven" named "cnn", and then parse for a subdirectory within "cnn" named "newsletters."

In accordance with other embodiments of the present invention, knowledge management features can be implemented. Specifically, users can create suffix directories that can be shared amongst a group of users. For example, a manager in a company could create a shared suffix directory to be used to organize a group project. She would create a user list comprised of co-workers for the shared suffix directory. Either an invitation would be sent to the people on the list to have the shared suffix directory added to their accounts, or the shared suffix directory could be automatically added to their account. Messages sent to the shared suffix directory could be accessed by everyone in the group without having to duplicate messages etc. In other words, a single directory is created in memory, which is accessed by all of the members of the group. Sub-directories of the suffix might include file repositories of related documents or important website links, calendaring etc.

In the embodiments described above, the inbox sub-directories include an "Accepted" section and a "Hold/New Sender" section. In accordance with further embodiments of the present invention, an inbox (or other sub-directory) may include other sub-sections. For example, a company using the system might want to create a category of an inbox called "Best Customers" which would be the top section of the inbox. Simiarly, a commercial suffix directory including an "ecommerce" inbox might have a category called "confirmations" for e-mail confirmations of purchases, as shown in FIG. 21. The messages are placed in the corresponding section based upon selection criteria. Examples of selection criteria may include the sender's e-mail address (e.g., for Best Customers), a term in the subject line of the e-mail, or a portion of the destination address (for example, using category identifiers as decribed below).

In accordance with another aspect of the present invention, the system may support e-mail categorization by the sender. In accordance with this feature, the system (or the users) can create a list of category identifiers such as music, photographs, humor, news article, etc. When sending out an e-mail, the sender can specify what category the e-mail falls into by using a drop down menu to select a category identifier. When the recipient's system receives the message, it reads any category identifiers, and either files the message in the manner the user has designated for that category, or further processes the message. The category list could be system wide, or specific to a shared suffix. For example, a shared suffix administrator might create a category list for project documents, such as legal, interface, contractors, news, status report, etc.

The system could also support the receipt of category information from users outside of the system (e.g., a user sending a message from a conventional Microsoft Hotmail account) through the use, for example, of a category delimeter. For example, someone could send an e-mail about a news story to a friend using SuffixMail by addressing the e-mail to: john.friends-newsarticle@suffixmail.com, wherein the delimeter "-" is recognized by the system as preceding a category identifier. When the system received this message, the message would be processed in the manner "john" had designated all news article messages should be processed.

In accordance with certain embodiments of the present invention, suffix directories can be configured to pull-down e-mail messages from 3rd party e-mail accounts. For example, a suffix directory could be created in an account called ".hotmail", and be configured in such a manner that a process would access a particular hotmail account (or any other e-mail account (POP, IMAP or the like)) and place the e-mails sent to the Hotmail account into the new ".hotmail" suffix directory.

Certain embodiments of the present invention may include privacy filters for the suffix directory inboxes. In accordance with this embodiment, a suffix directory inbox may have an "access setting" that provides a top level filtering process. A "high" setting, for example, could result in the inbox receiving e-mails only from people specified on the "accepted" list, with all other e-mails being discarded or returned. A "medium" setting could result in displaying e-mails from senders on the "accepted" list in the accepted section of the inbox, with unknown senders e-mail being displayed in the "hold/new sender" section of the inbox. Sender's on the "unaccepted" list would be discarded or returned. A "low" setting could result in e-mails being displayed in the inbox, regardless of whether the sender is on the "accepted" or is unknown. Sender's on the "unaccepted" list would be discarded or returned. Preferably, the privacy filters may be implemented locally (i.e., separately for each suffix directory) or globally (i.e., a single setting that is applied to all of the directories).

Treatment of mail directed to an invalid suffix of a valid root address (e.g., a message directed to sven.cars@suffixmail.com, wherein the root sven@suffixmail.com exists, but the suffix directory cars does not exist) can be handled in a number of ways. For example, the system can prompt the user (the owner of the root address) to create a corresponding suffix directory for the invalid suffix (e.g., dialog box with "A message was received for suffix " ", would you like to create a " " suffix directory? Yes or No"). Alternatively, the system can be configured to automatically 1) create a new suffix directory for the invalid suffix, 2) place the message into the root direcory, or 3) reject (i.e. block) the message. If the message is rejected, an explanatory e-mail may be automatically sent to the sender of the e-mail with the invalid suffix, explaining that the suffix does not exist. The treatment of invalid suffixes could be hard coded into the system, or can be configurable by a system administrator, or can be configured by each individual user for his or her respective account.

A preferred implementation of the "commercial suffix" embodiment will now be described in more detail. The "commercial suffix" embodiment can provide an e-mail-based commercial framework through which businesses can engage in one-to-one relationship with their customers via "private" channels that live directly in the e-mail environment of each customer. The "private channels" (e.g., Commercial Suffix directories) can act as portals, and enable businesses to provide and procure the services that reflect the level of support and functionality that they want to offer to their customers. The system allows for a user to be simultaneously logged on to all channels within their account. Preferably, the commercial suffix directories include a "Mail" directory for permission-based, targeted e-mail exchanges; a "Catalog/Product" directory through which customers can engage in e-commerce; and a "Customer Service" directory that offers a myriad of customer support options and services. Banner or other advertizements may be targeted with respect to the activity that has ocurred in a given suffix directory. For example, if promotional material was sent to a suffix directory, banner advertizements could be displayed on the e-mail interface reminding the user of an upcoming deadline for participation in the promotion.

With commercial suffixes, businesses can create branded, custom-built directories that users can add to their e-mail environment. Moreover, commercial suffix directories can be HTML-based, thereby allowing for easy access to existing web data structures and any functionality currently supported by web browsers can be extended through the commercial suffix directories. For example, links can be provided in the commercial suffix sub-directories which, when selected, display content (which may be customized to the user) on the user's display screen. The content could be framed (e.g., the content is formatted by the commercial suffix provider and displayed in a frame on the interface) or integrated (e.g, the commercial suffix provider provides the system with access to the raw data, and the system formats and displays the content on the interface).

In accordance with one aspect of this embodiment, commercial suffix directories are integrated with the businesses existing web sites data sources. As a result, the functionality expressed through the commercial suffix directory can also be expressed through the business' web site.

In accordance with other aspects of this embodiment, its more complex and comprehensive form, commercial suffix directories can incorporate other data sources, integrating the front and back office applications. For example, the commerical suffix directory could be used to extend the CRM systems (Customer Relations Management systems) of the commercial suffix provider which track customer transactions and the like. Selected information from the CRM systems could be made available to the user via the commercial suffix directory. Moreover, information from the commercial suffix directory could be made available for use by the CRM systems.

In accordance with other aspects of this embodiment, a commercial suffix directory may include the following functionality:

a) a Mailbox, supporting HTML, text and rich-text format-based e-mail messaging where all communications take place through a branded, In and Sent boxes for permission-based, targeted e-mail exchanges.

b) a Personalized e-Commerce store, that is accessed through the single sign-on mechanism of the e-mail authentication process. Preferably, the e-Commerce store i) allows customers to buy goods directly (preferably via a "one click" mechanism), ii) provides product offering that are personalized and targeted to the particular user; iii) provides an online product configuration functionality that allows the user to design and configure a product to meet their unique requirements.

c) Personalized Customer Service, including Web SelfHelp, Product registration, Literature fulfillment and Customer Profile management. As an example, a web self-help function could provide customers self-help problem solving solutions using online knowledge base. The online service would allow customers to submit and track service and support incidents directly from the Commercial Suffix. The product registration section would allow customers to quickly and easily register recently purchased products. The profile management section would allow customers to update profile information themselves.

The Commercial Suffix directories provide a number of benefits to businesses. For example, the commercial suffix directories provide:

a) Brand awareness, value and reinforcement: Through the creation of a branded commercial suffix directory that is visible at all times and lives directly within the e-mail client of each customer, businesses will be able to increase brand awareness by unifying their corporate presence, correspondance and communication with the same corporate feel and look. They will also be able to increase brand value by providing a level of service that will allow them to differentiate themselves in the marketplace.

b) Attention messaging: In today's "information overload" environment, it is increasingly difficult for companies to win the battle for attention. With the use of branded commerical suffixes, companies can break through the clutter as they will have a dedicated, branded Inbox for correspondence with customers.

c) Enhanced direct marketing effectiveness: Businesses will be able to directly target market products and services to an audience that has explicitly requested their information. Additionally, by better understanding their customers needs through the interaction that the commercial suffix directory will facilitate, businesses will be able to develop even better business rules and processes, which in turn will fuel personalization engines, drive customer contact strategies and ultimately maximize marketing effectiveness.

d) Direct sales and e-commerce: Customers can directly purchase products through the commercial suffix directory without having to leave their e-mail client. As the knowledge about each customer through the interaction of the commercial suffix interaction increases, businesses will be given the perfect tool to offer improved opportunities for superior product and services offerings, which will in turn generate increased sales through higher sales volume, cross and up-selling.

e) Lower costs through improved efficencies: The knowledge acquired about customers will enable businesses to streamline their operations and improve customer lifecycle management. Additionally, businesses will receive better feedback from customers which in turn will lead to better product configuration and proposition.

f) Precise data metrics: The system can provide companies with significant psycho-graphic data by recording user usage and the kinds of suffix directories that users have added to their accounts. This type of information is much more specific than cookie data or other current forms of consumer profiling.

In accordance with other embodiments of the present invention, the system may support the creation of knowledge management capabilities and report creation. Unlike current e-mail systems which provide no method for retaining and organizing information communicated via e-mail for a business or personal use other than transcribing it electronically or by hand, the system in accordance with this embodiment can be used to extract information from e-mails received in user defined suffix directories and commercial suffix directories. A user, an administrator (e.g., a company administrator) or commercial suffix provider can describe information that can be found in particular types of e-mail communication, and this information can be extracted into reports either on demand, or automatically on a scheduled basis, for export into third party program formats. Information can be described by detailing parsing instructions for standardized or semi-standardized e-mails, such as receipts, confirmations, notifications, and other regular communications. The report can then be formatted to export into standard formats or into commercial programs, such as Excel® or Quickbooks®, other financial programs, contact managers, or other software tools.

For example, either a user or a travel company could define a report based on travel receipts. In this situation, the user could define a "Travel Expenses" report to be extracted from the username.travel@company.com suffix address. All communications with the subject line, "CONFIRMATION: miscellaneous text" would be within the scope of the report. The user could then request a report, which would extract predefined information from these e-mails based on the identified subject line, organize it, and offer it for export into common file formats such as for spreadsheets, accounting packages, databases, and the like. In this case, after defining the parsing for the "Travel Expenses" report, the report could be generated detailing Destination, Cost, Airline, Date, and other pertinent information for export into Excel as an expense report. Additionally, the system might use other criteria other than the subject line to identify specified e-mails. For example, the system might know how receipts from Expedia are structured and how other e-mail receipts are structured and they may use the domain name of the sender as a trigger for processing the extractor.

Reports can either be created by a user for a user created suffix, for an administrator on behalf of a set of users (e.g., a company administrator setting up standardized reports for employee users) or created by a commercial suffix provider for use by users who subscribe to the commercial suffix.

An example of a user created report might be a lawyer who creates suffixes based on client case codes. (i.e, lawyer.client@lawfirm.com) The lawyer could create a report to list all e-mailed attachments and the dates which they were sent or received for a client. In this case, the report would be created with the fields Sender, Recipient, Date, Subject, Attachment Name, and could be used to create a record of correspondence for the attorney and/or client.

An example of a commercial suffix provider report that could be made available might be a report offered by Expedia to subscribers to its commercial suffix directory (or channel). As a travel provider, Expedia could create reports summarizing travel related expenses much as an individual user could create their own as mentioned above. Since Expedia controls the nature of the communications sent to the commercial suffix directories, however, it could also make changes and create reports based on Confirmations, Travel Summaries, various client codes, etc., and make all of these available for export.

An example of an administratror created report might be a report created across multiple user accounts in a company to summarize organization wide activity in a suffix directory (which could be a commercial suffix directory). As an example, an administrator could create a travel expense report for export to common accounting formats across all subscribed employee accounts, for example summarizing the activities of a traveling sales staff of eight salespersons on a monthly basis. This could also be integrated into a commercial suffix environment. If a company's sales team were all using its travel suffix directory, Expedia could generate reports across their multiple subscribed suffixes. In this case, the same travel report as above could be generated, but in this case by one user but covering many user accounts to create an organization wide summary. This could be implemented at the commercial suffix provider (e.g, by an Expedia administrator) or at the client company level (e.g., by an administrator of the company' e-mail system).

Data that is extracted to a report can be subjected to user defined rules for treatment after extraction. For example, users can detail that all e-mails extracted for a report are to be deleted; or, simply marked as reported; or, copied to an archive. Additional instructions can include automatic 'cc' e-mails of reports to third parties, (ie, administrators) for their own use. Additionally, users or mangers could set up extraction rules such as, "after an e-mail receipt has been read" automatically extract the data and add it to this months expense report immediately."

Figure 22A:
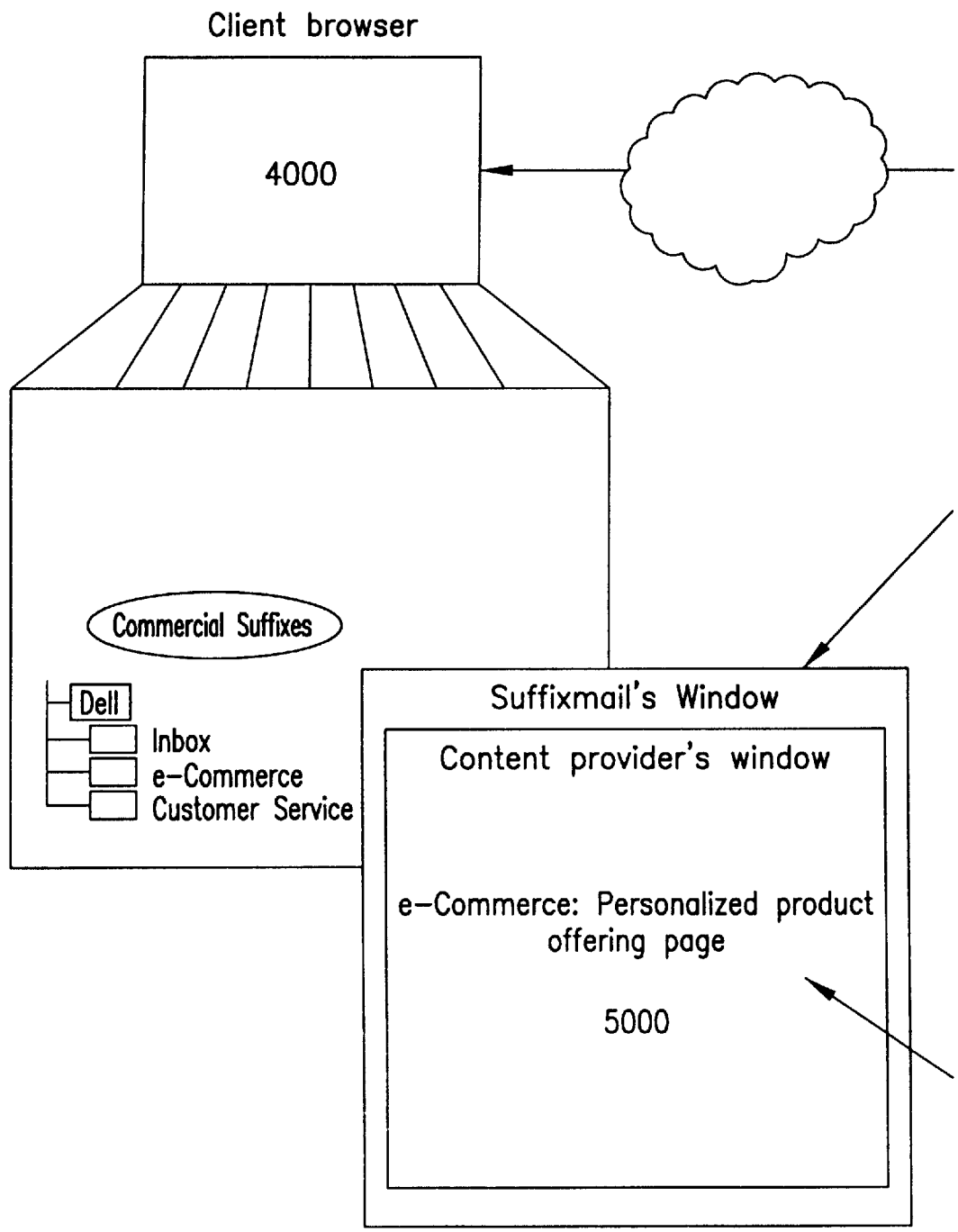
FIG. 22 shows an illustrative platform for implementing commercial suffix directories.
Figure 22B:
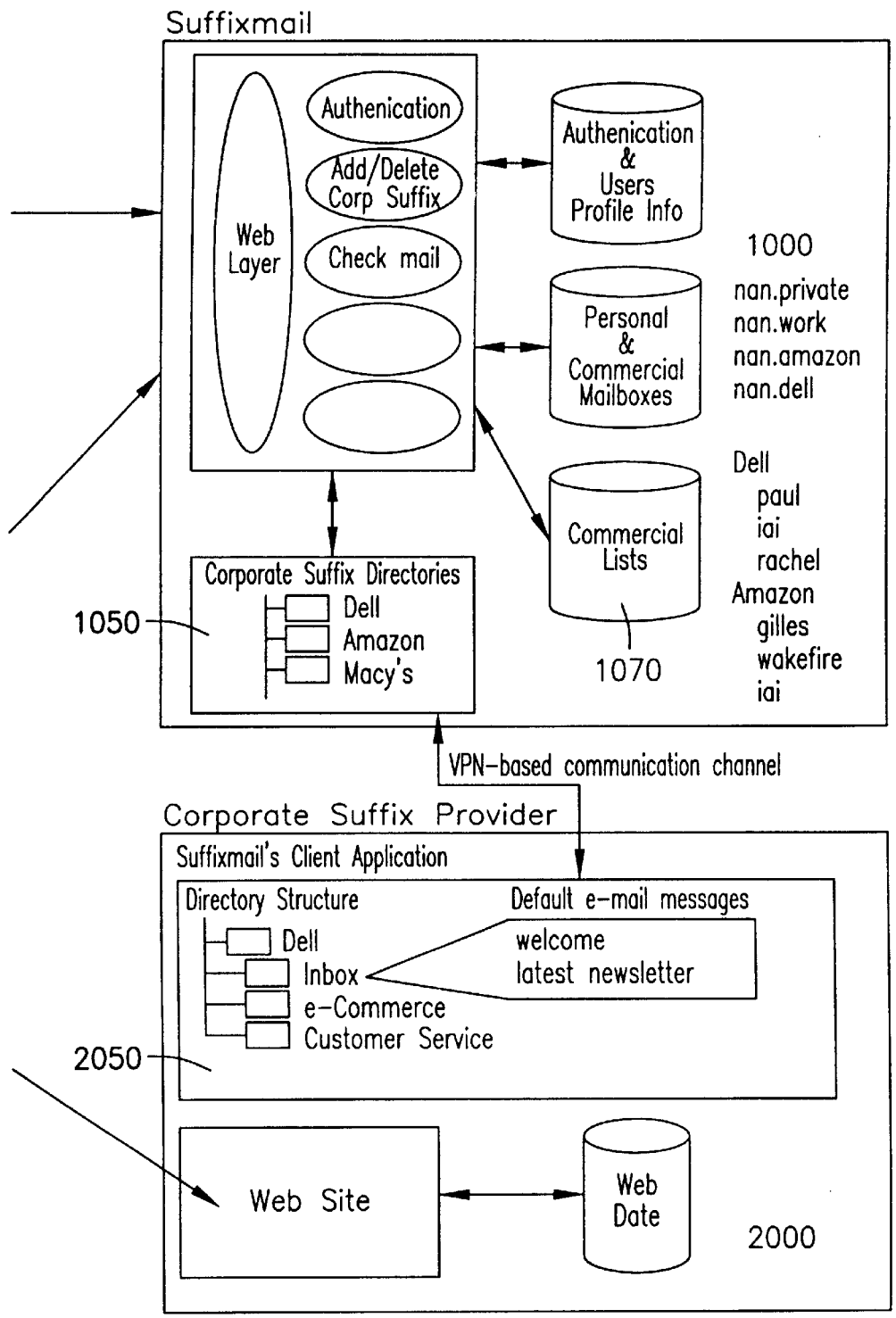

FIG. 22 shows an illustrative architecture for allowing a business to manage suffix mail directories of a variety of users. A business sponsoring a commerical suffix creates HTML based commerical suffix directories using a conventional HTML editor. When completed, the directories are imported into a "quality control" application executing on the businesses computer 2000. The quality control application is an application that checks the completed directories for any compatibility or formating issues with the requirements and functionality of the e-mail messaging system. Once the directories pass these quality control tests, they can be exported onto the system server 1000 where they will be made available for access to users on user browsers 4000.

In the illustrated embodiment, the business exports the directories via a VPN-based private channel that is supported by the quality control application. Each suffix provider (i.e., each business sponsoring a commerical suffix directory) is preferably given an unique ID and will be required to comply with the server security requirements of the system server (e.g., firewalls, etc.). It should be appreciated, however, that the use of a VPN-based private channel is illustrative, and that other known technologies for providing data transfer can alternatively be used.

In certain embodiments, the quality control application will provide the following functionality:

a) a Private, secure communication channel: All communication between the system server 1000 and commercial suffix provider 2000 will take place through a secure channel where data transfers, directory updates and publishing requirements will be facilitated.

b) Version control: The application can track the various iterations of the commercial suffix directories. Metrics can be associated as well to help corrolate the effectiveness of specific designs with specific results. For example, the application could track usage patterns, adoption rates, and/or rate mailing campaigns.

c) Quality assurance and Testing: The program will confirm that the proposed suffix directories are compatible, in terms of browsers, platform, formatting, page size, etc with the e-mail messaging system.

d) Publishing requirements control: As specific events and information need to be triggered and propagated at specific times, commercial suffix providers can specify and control when these events take place. The events may include, for example, checking meta-tags, graphic weight, color, browser compatibility, XML compatibility, timing of feature releases, timing of marketing campaigns, etc.

E) Report viewing: The program can map and graph the results of interactions between consumers and a corporte suffix, e.g., number of e-mails opened by a user over a specified time period, frequency of user visits to suffix directory, purchasing behavior of user, etc.

F) Templates: The program can support directory templates to facilitate the creation of suffix directories, including, for example, preferred directory structures.

After authenticating (e.g., via a username/password) to the system server 1000 via a browser 4000, users will be able to access any commercial suffix providers pages without having to reauthenticate. All requests to commerical suffix providers web pages (e.g., by clicking on a hyperlink in the corresponding commercial suffix directory) will be made through the system server 1000 which will embed the commercial suffix providers' pages within its own window (e.g., in a manner similar to Microsoft Corp.'s Hotmail e-mail system). Since the system server 1000 knows which user the request is originating from, it can format the request accordingly and pass it on to the commercial suffix provider's computer 2000.

Preferably, the system 1000 encapsulates the user's identity with each user's request when accessing specific commercial suffix information. In this manner, the commercial suffix provider knows which user is making what request, and can easily return personalized links to appropriate users for each request made. Alternatively, communication could be session-based. For example, a session could be initiated when the commercial suffix directory is entered, and terminated when i) the commercial suffix directory is exited; ii) the user requests termination; or iii) after a predetermined period of inactivity.

Exemplary process steps for enabling a user to interact with a commercial suffix provider and for enabling a commercial suffix provider to interact with subscribers to its commercial suffix directories will now be described.

In accordance with certain aspects of the commercial suffix embodiment, a user can add a commercial suffix to his or her e-mail account in the following manner:

a) the user authenticates to system 1000 (e.g., by entering a username/password)

b) the user submits a request to the system 1000 to add a commercial suffix (e.g., by selecting a commercial suffix from a menu of available commercial suffixes).

c) the system 1000 checks the user against a list of current users for the requested commercial suffix and, if the user is not a current user, he/she is added to the list of current users, subject to any business rules of the commercial suffix provider. Examples of such business rules might be a total number of permissible users, or exclusions of certain individuals or domains.

d) the system 1000 adds a commercial suffix directory for the requested commercial suffix to the user's e-mail account;

e) preferably, a customized 'welcome' e-mail is copied from the commercial suffix provider's data@structure on the system 1000 to the user's newly created inbox for the commercial suffix.

If a user already has a personal profile with a commercial entity (e.g., on-line banking) and wants to add the commercial suffix of that commercial entity, the system 1000 and the computer 2000 can be configured to allow the system 1000 to access the personal profile, and use that information in conjunction with the creation of the commercial suffix directory.

In accordance with other aspects of the commercial suffix embodiment, a commercial suffix provider can update the suffix mail directories of the users of its commercial suffix in the following manner:

a) provider modifies HTML page;

b) provider imports the updated content 2050 into the quality control application for quality control verification;

c) provider connects to the system server 1000 using the appropriate authentication protocol (e.g., via username/password)

d) provider uploads updated content pages into provider's own commercial suffix directory 1050 on the system server 1000.

e) provider logs off and terminates session

In accordance with other aspects of the commercial suffix embodiment, a commercial suffix provider can send newsletters to the suffix mail directories of the users of its commercial suffix in the following manner:

a) provider drafts HTML-based newsletter b) provider imports the newsleter into the quality control application for quality control verification;

c) provider connects to the system server 1000 using the appropriate authentication protocol (e.g., via username/password)

d) provider uploads the newsletter into the Mailbox section of its commercial suffix direcotry 1050.

e) provider sets publishing requirements for the newsletter (e.g., time of distribution)

f) provider logs off and terminates session g) The system 1000 is notified of the publishing requirements for newsletter via, for example, a software querying agent executing on the server.

h) the system places the newsletter and its publishing requirements in a publishing database where the precise time for newsletter distribution is reserved and activated i) at the requested time, the publishing database queries the commercial list database 1070 for the complete list of the subscribers to the commercial suffix and adds a copy of the newsletter into each subscriber's mailbox. Alternatively, the system could simply add a link to the newsletter residing in the publishing database in each subscriber's mailbox.

In accordance with certain aspects of the commercial suffix embodiment, a user can send an e-mail to the commercial suffix provider in the following manner:

a) User logs onto the system server 1000 and authenticates b) User accesses the Compose environment and sends an e-mail to the commercial suffix provider using the commercial suffix directory (e.g., sven.amazon@suffixmail).

While FIG. 21 illustrates an implementation of commercial suffixes in a web-based e-mail system wherein users log onto a central server(s) (e.g., a Hotmail or AOL type architecture), it should be appreciated that the users could alternatively be using a LAN based e-mail system or a stand-alone e-mail system, with the commercial suffix directories being updated on the user's computer when the user accesses the server 1000 via their e-mail program.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for providing e-mail communication, comprising the steps of:

generating an e-mail user interface on a display device, the e-mail user interface implementing e-mail messaging for a root e-mail address, the root e-mail address including a domain name and a username;

upon receiving a request from a user, generating a first suffix e-mail address and creating a first directory on the e-mail user interface for the first suffix e-mail address, the first suffix e-mail address including the domain name, the username, and a first suffix name; and upon receiving an e-mail message having a destination address including the domain name and username, storing the e-mail message in the first directory if the destination address includes the first suffix.

2. The method of claim 1, further comprising the steps of upon receiving a request from a user, generating a second suffix e-mail address and creating a second directory on the e-mail user interface for the second suffix e-mail address, the second suffix e-mail address including the domain name, the username, and a second suffix name; and upon receiving an e-mail message having a destination address including the domain name and username, storing the e-mail message in the second folder if the destination address includes the second suffix.

3. The method of claim 1, further comprising the steps of:

upon receiving a request from a user, designating a sender's address from a received e-mail as one of an accepted address designation and a rejected address designation;

upon receiving an e-mail message from the sender's address, storing the e-mail message in an inbox if the sender's address has the accepted address designation, and deleting the e-mail if the sender's address has the rejected address designation.

4. A method for providing e-mail communication, comprising the steps of:

generating an e-mail user interface on a display device, the e-mail user interface implementing e-mail messaging for a root e-mail address, the root e-mail address including a domain name and a username;

upon receiving a request from a user, generating a first suffix e-mail address and creating a first directory on the e-mail user interface for the first suffix e-mail address, the first suffix e-mail address including the domain name, the username, and a first suffix name;

maintaining a list of accepted e-mail addresses and a list of rejected e-mail addresses; and upon receiving an e-mail message having a destination address including the domain name and username, storing the e-mail message in an accepted section of the first directory if the destination address includes the first suffix and the sender's e-mail address corresponds to an e-mail address on the list of accepted e-mail addresses, and storing e-mail message in an hold/new sender section of the first directory if the destination address includes the first suffix and the sender's e-mail address does not correspond to an e-mail address on the list of accepted e-mail addresses and does not correspond to an e-mail address on the list of rejected e-mail addresses.

5. The method of claim 4, further comprising:
upon receiving an e-mail message having a destination address including the domain name and username, storing the e-mail message in a directory designated for deleted e-mails if the destination address includes the first suffix and the sender's e-mail address corresponds to an e-mail address on the list of rejected e-mail addresses.

6. The method of claim 4, further comprising:
upon receiving an e-mail message having a destination address including the domain name and username, deleting the e-mail message if the destination address includes the first suffix and the sender's e-mail address corresponds to an e-mail address on the list of rejected e-mail addresses.

7. The method of claim 1, further comprising:
upon receiving a request from a user, generating another suffix e-mail address and creating a directory on the e-mail user interface for the another suffix e-mail address, the another suffix e-mail address including the domain name, the username, the first suffix name and another suffix name; and
upon receiving an e-mail message having a destination address including the domain name and username, storing the e-mail message in the first directory if the destination address includes the first suffix name and not the another suffix name, and storing the e-mail message in the another directory if the destination address includes the first suffix name and the another suffix name.

8. The method of claim 1, further comprising:
associating the first suffix name with a device; and
upon receiving an e-mail message having a destination address including the domain name and username, sending the e-mail message to the device if the destination address includes the first suffix name.

9. The method of claim 8, wherein the device is a printer.

10. The method of claim 8, wherein the device is a telephone.

11. The method of claim 8, wherein the device is a PDA.

12. The method of claim 8, wherein the device is a pager.

13. The method of claim 8, further comprising converting the message to an audio signal prior to sending the message to the telephone.

14. The method of claim 1, wherein the first suffix name is a commercial suffix name, the commercial suffix name being associated with a third party e-mail address, the commercial suffix name being used by a plurality of users having a plurality of username and domain name combinations.

15. The method of claim 14, further comprising the step of providing authenticated communication between the first suffix e-mail address and the third party e-mail address.

16. The method of claim 14, further comprising the step of providing encrypted communication between the first suffix e-mail address and the third party e-mail address.

17. The method of claim 14, further comprising the step of providing authenticated and encrypted communication between the first suffix e-mail address and the third party e-mail address, said authenticated and encrypted communication including credit card transactions.

18. A method for providing e-mail communication, comprising the steps of:
generating an e-mail user interface on a display device, the e-mail user interface implementing e-mail messaging for a root e-mail address, the root e-mail address including a domain name and a username;
upon receiving a request from a user, generating a first suffix e-mail address and creating a first directory on the e-mail user interface for the first suffix e-mail address, the first suffix e-mail address including the domain name, the username, and a first suffix name;
maintaining a list of accepted e-mail addresses associated with the first suffix name, a list of accepted e-mail addresses associated with the second suffix name, a list of rejected e-mail addresses associated with the first suffix name, and a list of rejected e-mail addresses associated with the second suffix name;
upon receiving an e-mail message having a destination address including the domain name and username;
storing the e-mail message in an accepted section of the first directory if the destination address includes the first suffix and the sender's e-mail address corresponds to an e-mail address on the list of accepted e-mail addresses associated with the first suffix name,
and storing the e-mail message in an hold/new sender section of the first directory if the destination address includes the first suffix name and the sender's e-mail address does not correspond to an e-mail address on the list of accepted e-mail addresses associated with the first suffix name and does not correspond to an e-mail address on the list of rejected e-mail addresses associated with the first suffix name; and
upon receiving an e-mail message having a destination address including the domain name and username,
storing the e-mail message in an accepted section of the second directory if the destination address includes the second suffix and the sender's e-mail address corresponds to an e-mail address on the list of accepted e-mail addresses associated with the second suffix name,
and storing e-mail message in an hold/new sender section of the first directory if the destination address includes the second suffix name and the sender's e-mail address does not correspond to an e-mail address on the list of accepted e-mail addresses associated with the second suffix name and does not correspond to an e-mail address on the list of rejected e-mail addresses associated with the second suffix name.

19. The method of claim 1, wherein the display device is a computer display screen for a desktop computer.

20. The method of claim 1, wherein the display device is a computer display screen for a laptop computer.

21. The method of claim 1, wherein the display device is a display screen for a PDA.

22. The method of claim 1, wherein the display device is a display screen for a telephone.

23. The method of claim 1, wherein the display device is a televison.

24. The method of claim 1, wherein the display device is a set top box.

25. The method of claim 2, wherein at least one of the first and second suffix e-mail addresses includes a delimeter.

26. The method of claim 25, comprising, upon receiving an e-mail message with the delimeter, further processing the e-mail message as a function of the delimeter.

27. The method of claim 26, wherein the further processing comprises forwarding the e-mail message to another e-mail address.

28. The method of claim 2, wherein the e-mail message includes a delimeter in one of the subject field and the body of the e-mail message.

29. The method of claim 28, comprising, upon receiving the e-mail message with the delimeter, further processing the e-mail message as a function of the delimeter.

30. The method of claim 28, wherein the further processing comprises forwarding the e-mail message to another e-mail address.

31. The method of claim 8, wherein the message is in a first language, and wherein the method further comprising translating the message from the first language to a second language.

32. The method of claim 31, wherein the first and second languages are selected from the group consisting of Afrikaans, Albanian, Algerian Dardja, Amharic, Anishinaabe, Arabic, Armenian, Avestan, Azerbaijani, Balinese, Bashkir, Basque, Belarusan, Bengali, Bisayan, Brahui, Breton, Buhi Bicol, Bulgarian, Burmese, Catalan, Cebuano, Chechen, Cherokee-Tsalagi, Cheyenne, Chinese, Czech, Danish, Dutch, English, Esperanto, Estonian, Etruscan, Farsi, Finnish, French, Frisian, Gaelic, Galician, German, Gilbertese, Greek, Guarani, Hakka, Hawaiian, Hebrew, Hindi, Hmong, Hungarian, Icelandic, Igbo, Indonesian, Ingush, Inuktitut, Italian, Japanese, Kamilaroi, Kapampangan, Kendô, Khowar, Korean, Kurdish, Kyrgyz, Lakhota, Latin, Latvian, Lithuanian, Malay, Maltese, Maori, Mapudungun, Marathi, Mayan, Mayangna, Miskitu, Mohawk, Mongolian, Nauruan, Norwegian, Occitan, Ojibwe, Oriya, Pahlavi, Pali, Panamahka, Pashto, Passamaquoddy-Maliseet, Piraha, Polish, Portuguese, Potawatomi, Prussian, Punjabi, Rasta Patois, Romanian, Romany, Russian, Sami, Sanskrit, Sardinian, Serbo-Croatian, Sioux, Slovak, Slovene, Somali, Sorbian, Spanish, Sranan, Sudovian, Sumerian, Swabian, Swahili, Swedish, Tagalog, Taino, Taiwanese, Tamil, Tarahumara, Tatar, Thai, Tibetan, Tok Pisin, Tongan, Tsalagi, Turkish, Turkmen, Ukrainian, Ulwa, Urdu, Uyghur, Uzbek, Vietnamese, Visayan, Votic, Warlpiri, Welsh, Wolof, Xhosa, Yiddish, and Yotvingian.

33. The method of claim 14, wherein the third party e-mail address is associated with an entity, and wherein the entity pays for the commercial suffix name.

34. The method of claim 1, further comprising:
prompting a user to select a further suffix e-mail address from a list of suffix e-mail addresses, and upon receiving said selection, creating a directory on the e-mail user interface for the further suffix e-mail address, the further suffix e-mail address including the domain name, the username, and the further suffix name.

35. The method of claim 1, further comprising:
upon receiving a request from a user, creating a sub-directory within the directory on the e-mail user interface, the subdirectory including one or more of a file, an HTML page, and a hyperlink.

36. The method of claim 14, wherein the third party e-mail address is associated with an entity, and wherein the method further comprises, upon receiving a request from the entity, creating a sub-directory within the first directory on e-mail user interfaces associated with each of the plurality of users, the subdirectory including one or more of a file, an HTML page, and a hyperlink.

37. The method of claim 1, further comprising sending an e-mail message from the first suffix e-mail address.

38. The method of claim 2, further comprising the steps of:
upon receiving a request from a user, generating deleting the second suffix e-mail address and the second directory.

39. The method of claim 2, further comprising the steps of:
upon receiving a request from a user, generating a third suffix e-mail address and creating a third directory on the e-mail user interface for the third suffix e-mail address, the third suffix e-mail address including the domain name, the username, the second suffix name, and a third suffix name.

40. The method of claim 2, further comprising the steps of
upon receiving a request from a user, generating a further suffix e-mail address and creating a further directory on the e-mail user interface for the further suffix e-mail address, the further suffix e-mail address including the domain name, the username, and a plurality of suffix names.

41. The method of claim 1, wherein the upon receiving an e-mail message step further comprises parsing the destination address first by the username, and then by the first suffix name.

42. The method of claim 8, wherein the device is a televison.

43. The method of claim 8, wherein the device is an appliance.

44. The method of claim 8, wherein the device is an MP3 player.

45. The method of claim 14, wherein the commercial suffix is associated with a plurality of third party e-mail addresses.

46. The method of claim 1, wherein the first directory includes a plurality of sections, and wherein
upon receiving an e-mail message having a destination address including the domain name and username, storing the e-mail message in a selected one of the plurality of sections of the first directory if the destination address includes the first suffix, said selected one of the plurality of sections being determined based upon selection criteria.

47. The method of claim 46, wherein the plurality of sections includes an accepted section and a hold/new sender section, and wherein the selection criteria is whether the sender's e-mail address corresponds to an e-mail address on a list of accepted e-mail addresses.

48. The method of claim 46, wherein the selection criteria is a portion of the destination address.

49. The method of claim 48, wherein the portion of the e-mail address includes a category delimeter followed by a category identifier.

50. The method of claim 46, wherein the selection criteria is the sender's e-mail address.

51. A method for providing e-mail communication, comprising the steps of:
generating an e-mail user interface on a display device, the e-mail user interface implementing e-mail messaging for a root e-mail address, the root e-mail address including a domain name and a username;
upon receiving a request from a user, generating a plurality of commerical suffix e-mail addresses and creating a directory on the e-mail user interface for each commercial suffix e-mail address, each commercial suffix e-mail address including the domain name, the username, and a commercial suffix name, each commercial suffix name being associated with a third party e-mail address, the commercial suffix name being used by a plurality of users having a plurality of username and domain name combinations;

logging on to a plurality of web-sites, each web-site corresponding to one of the plurality of commercial suffix names; and upon receiving an e-mail message having a destination address including the domain name and username, if the destination address includes one of the commerical suffix names, storing the e-mail message in the one of the the directories corresponding to the commercial suffix name.

52. The method of claim 1, further comprising:

searching the e-mail message for predetermined information; and exporting at least a portion of the e-mail message to a file if the predetermined information is in the e-mail message.

53. The method of claim 52, wherein the file is a spreadsheet.

54. The method of claim 52, wherein the predetermined information is in a subject field of the e-mail message and a portion of the body of the e-mail message is exported to the program.

55. The method of claim 52, wherein the predetermined information is specified by the user.

56. The method of claim 52, wherein the predetermined information is specified by an administrator.

57. The method of claim 36, further comprising searching the e-mail message for predetermined information; and exporting at least a portion of the e-mail message to a file if the predetermined information is in the e-mail message.

58. The method fo claim 57, wherein the file is a spreadsheet.

59. The method of claim 57, wherein the predetermined information is in a subject field of the e-mail message and a portion of the body of the e-mail message is exported to the program.

60. The method of claim 57, wherein the predetermined information is specified by the user.

61. The method of claim 57, wherein the predetermined information is specified by an administrator.

62. The method of claim 57, wherein the predetermined information is specified by the entity.

63. Computer readable media, having stored thereon, computer executable process steps operable to control a computer to perform the steps of:

generating an e-mail user interface on a display device, the e-mail user interface implementing e-mail messaging for a root e-mail address, the root e-mail address including a domain name and a username;

upon receiving a request from a user, generating a first suffix e-mail address and creating a first directory on the e-mail user interface for the first suffix e-mail address, the first suffix e-mail address including the domain name, the username, and a first suffix name; and upon receiving an e-mail message having a destination address including the domain name and username, storing the e-mail message in the first directory if the destination address includes the first suffix.

64. The computer readable media of claim 63, further comprising the steps of upon receiving a request from a user, generating a second suffix e-mail address and creating a second directory on the e-mail user interface for the second suffix e-mail address, the second suffix e-mail address including the domain name, the username, and a second suffix name; and upon receiving an e-mail message having a destination address including the domain name and username, storing the e-mail message in the second folder if the destination address includes the second suffix.

65. The computer readable media of claim 63, further comprising the steps of:

upon receiving a request from a user, designating a sender's address from a received e-mail as one of an accepted address designation and a rejected address designation;

upon receiving an e-mail message from the sender's address, storing the e-mail message in an inbox if the sender's address has the accepted address designation, and deleting the e-mail if the sender's address has the rejected address designation.

66. The computer readable media of claim 63, further comprising:

maintaining a list of accepted e-mail addresses and a list of rejected e-mail addresses;

upon receiving an e-mail message having a destination address including the domain name and username, storing the e-mail message in an accepted section of the first directory if the destination address includes the first suffix and the sender's e-mail address corresponds to an e-mail address on the list of accepted e-mail addresses, and storing e-mail message in an hold/new sender section of the first directory if the destination address includes the first suffix and the sender's e-mail address does not correspond to an e-mail address on the list of accepted e-mail addresses and does not correspond to an e-mail address on the list of rejected e-mail addresses.

67. The computer readable media of claim 63, further comprising:

upon receiving a request from a user, generating another suffix e-mail address and creating a directory on the e-mail user interface for the another suffix e-mail address, the another suffix e-mail address including the domain name, the username, the first suffix name and another suffix name; and upon receiving an e-mail message having a destination address including the domain name and username, storing the e-mail message in the first directory if the destination address includes the first suffix name and not the another suffix name, and storing the e-mail message in the another directory if the destination address includes the first suffix name and the another suffix name.

68. The computer readable media of claim 63, further comprising:

associating the first suffix name with a device; and upon receiving an e-mail message having a destination address including the domain name and username, sending the e-mail message to the device if the destination address includes the first suffix name.

69. The computer readable media of claim 63, wherein the first suffix name is a commercial suffix name, the commercial suffix name being associated with a third party e-mail address, the commercial suffix name being used by a plurality of users having a plurality of username and domain name combinations.

70. The computer readable media of claim 64, further comprising maintaining a list of accepted e-mail addresses associated with the first suffix name, a list of accepted e-mail addresses associated with the second suffix name, a list of rejected e-mail addresses associated with the first suffix name, and a list of rejected e-mail addresses associated with the second suffix name;

upon receiving an e-mail message having a destination address including the domain name and username;

storing the e-mail message in an accepted section of the first directory if the destination address includes the first suffix and the sender's e-mail address corresponds to an e-mail address on the list of accepted e-mail addresses associated with the first suffix name, and storing the e-mail message in an hold/new sender section of the first directory if the destination address includes the first suffix name and the sender's e-mail address does not correspond to an e-mail address on the list of accepted e-mail addresses associated with the first suffix name and does not correspond to an e-mail address on the list of rejected e-mail addresses associated with the first suffix name; and upon receiving an e-mail message having a destination address including the domain name and username, storing the e-mail message in an accepted section of the second directory if the destination address includes the second suffix and the sender's e-mail address corresponds to an e-mail address on the list of accepted e-mail addresses associated with the second suffix name, and storing e-mail message in an hold/new sender section of the first directory if the destination address includes the second suffix name and the sender's e-mail address does not correspond to an e-mail address on the list of accepted e-mail addresses associated with the second suffix name and does not correspond to an e-mail address on the list of rejected e-mail addresses associated with the second suffix name.

71. The computer readable media of claim 64, wherein at least one of the first and second suffix e-mail addresses includes a delimeter.

72. The computer readable media of claim 71, comprising, upon receiving an e-mail message with the delimeter, further processing the e-mail message as a function of the delimeter.

73. The computer readable media of claim 69, wherein the third party e-mail address is associated with an entity, and wherein the computer readable media further comprises, upon receiving a request from the entity, creating a subdirectory within the directory on e-mail user interfaces associated each of the plurality of users, the subdirectory including one or more of a file, an HTML page, and a hyperlink.

74. Computer readable media, having stored thereon, computer executable process steps operable to control a computer to perform the steps of:

generating an e-mail user interface on a display device, the e-mail user interface implementing e-mail messaging for a root e-mail address, the root e-mail address including a domain name and a username;

upon receiving a request from a user, generating a plurality of commerical suffix e-mail address and creating a directory on the e-mail user interface for each commercial suffix e-mail address, each commercial suffix e-mail address including the domain name, the username, and a commercial suffix name, each commercial suffix name being associated with a third party e-mail address, the commercial suffix name being used by a plurality of users having a plurality of username and domain name combinations;

logging on to a plurality of web-sites, each web-site corresponding to one of the plurality of commercial suffix names; and upon receiving an e-mail message having a destination address including the domain name and username, if the destination address includes one of the commerical suffix names, storing the e-mail message in the one of the the directories corresponding to the commercial suffix name.

* * * * *